(12) United States Patent
Palangie et al.

(10) Patent No.: US 12,321,563 B2
(45) Date of Patent: Jun. 3, 2025

(54) METHOD OF GROUPING USER INTERFACES IN AN ENVIRONMENT

(71) Applicant: Apple Inc., Cupertino, CA (US)

(72) Inventors: Alexis H. Palangie, Palo Alto, CA (US); Aaron M. Burns, Sunnyvale, CA (US); Benjamin Hylak, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/515,188

(22) Filed: Nov. 20, 2023

(65) Prior Publication Data

US 2024/0086031 A1    Mar. 14, 2024

Related U.S. Application Data

(63) Continuation of application No. 18/260,022, filed as application No. PCT/US2021/065240 on Dec. 27, 2021, now abandoned.

(Continued)

(51) Int. Cl.
*G06F 3/04815* (2022.01)
*G06F 3/01* (2006.01)
(Continued)

(52) U.S. Cl.
CPC .......... *G06F 3/04815* (2013.01); *G06F 3/013* (2013.01); *G06F 3/0484* (2013.01);
(Continued)

(58) Field of Classification Search
CPC .... G06F 3/04815; G06F 3/013; G06F 3/0484; G06F 3/0488; G06T 13/20
See application file for complete search history.

(56) References Cited

U.S. PATENT DOCUMENTS 1,173,824 A    2/1916 Mckee
5,515,488 A    5/1996 Hoppe et al.
(Continued)

FOREIGN PATENT DOCUMENTS

CA    3033344 A1    2/2018
CN    104714771 A    6/2015
(Continued)

OTHER PUBLICATIONS

AquaSnap Window Manager: dock, snap, tile, organize [online], Nurgo Software, Available online at: <https://www.nurgo-software.com/products/aquasnap>, [retrieved on Jun. 27, 2023], 5 pages.
(Continued)

*Primary Examiner* — Sardis F Azongha
(74) *Attorney, Agent, or Firm* — Kubota & Basol LLP

(57) ABSTRACT

Methods for displaying and organizing user interfaces in a computer-generated environment provide for an efficient and intuitive user experience. In some embodiments, user interfaces can be grouped together into a container. In some embodiments, user interfaces can be added to a container, removed from a container, or moved from one location in the container to another location. In some embodiments, a visual indication is displayed before a user interface is added to a container. In some embodiments, a user interface can replace an existing user interface in a container. In some embodiments, when moving a user interface in a computer-generated environment, the transparency of a user interface that is obscured can be modified.

30 Claims, 21 Drawing Sheets

Related U.S. Application Data

(60) Provisional application No. 63/132,956, filed on Dec. 31, 2020.

(51) Int. Cl.
  *G06F 3/0484* (2022.01)
  *G06F 3/0488* (2022.01)
  *G06T 13/20* (2011.01)

(52) U.S. Cl.
  CPC ............ *G06F 3/0488* (2013.01); *G06T 13/20* (2013.01); *G06T 2200/24* (2013.01); *G06T 2210/12* (2013.01)

(56) References Cited

U.S. PATENT DOCUMENTS

| | | |
|---|---|---|
| 5,524,195 A | 6/1996 | Clanton et al. |
| 5,610,828 A | 3/1997 | Kodosky et al. |
| 5,737,553 A | 4/1998 | Bartok |
| 5,740,440 A | 4/1998 | West |
| 5,751,287 A | 5/1998 | Hahn et al. |
| 5,758,122 A | 5/1998 | Corda et al. |
| 5,794,178 A | 8/1998 | Caid et al. |
| 5,877,766 A | 3/1999 | Bates et al. |
| 5,900,849 A | 5/1999 | Gallery |
| 5,933,143 A | 8/1999 | Kobayashi |
| 5,990,886 A | 11/1999 | Serdy et al. |
| 6,061,060 A | 5/2000 | Berry et al. |
| 6,078,310 A | 6/2000 | Tognazzini |
| 6,108,004 A | 8/2000 | Medl |
| 6,112,015 A | 8/2000 | Planas et al. |
| 6,154,559 A | 11/2000 | Beardsley |
| 6,456,296 B1 | 9/2002 | Cataudella et al. |
| 6,584,465 B1 | 6/2003 | Zhu et al. |
| 6,756,997 B1 | 6/2004 | Ward et al. |
| 7,035,903 B1 | 4/2006 | Baldonado |
| 7,134,130 B1 | 11/2006 | Thomas |
| 7,137,074 B1 | 11/2006 | Newton et al. |
| 7,230,629 B2 | 6/2007 | Reynolds et al. |
| 7,706,579 B2 | 4/2010 | Oijer |
| 8,341,541 B2 | 12/2012 | Holecek et al. |
| 8,593,558 B2 | 11/2013 | Gardiner et al. |
| 8,724,856 B1 | 5/2014 | King |
| 8,793,620 B2 | 7/2014 | Stafford |
| 8,793,729 B2 | 7/2014 | Adimatyam et al. |
| 8,803,873 B2 | 8/2014 | Yoo et al. |
| 8,805,690 B1 | 8/2014 | Lebeau et al. |
| 8,866,880 B2 | 10/2014 | Tan et al. |
| 8,896,632 B2 | 11/2014 | Macdougall et al. |
| 8,947,323 B1 | 2/2015 | Raffle et al. |
| 8,970,478 B2 | 3/2015 | Johansson |
| 8,970,629 B2 | 3/2015 | Kim et al. |
| 8,994,718 B2 | 3/2015 | Latta et al. |
| 9,007,301 B1 | 4/2015 | Raffle et al. |
| 9,108,109 B2 | 8/2015 | Pare et al. |
| 9,185,062 B1 | 11/2015 | Yang et al. |
| 9,189,611 B2 | 11/2015 | Wssingbo |
| 9,201,500 B2 | 12/2015 | Srinivasan et al. |
| 9,256,785 B2 | 2/2016 | Qvarfordt |
| 9,293,118 B2 | 3/2016 | Matsui |
| 9,316,827 B2 | 4/2016 | Lindley et al. |
| 9,400,559 B2 | 7/2016 | Latta et al. |
| 9,448,635 B2 | 9/2016 | Macdougall et al. |
| 9,448,687 B1 | 9/2016 | Mckenzie et al. |
| 9,465,479 B2 | 10/2016 | Cho et al. |
| 9,526,127 B1 | 12/2016 | Taubman et al. |
| 9,544,257 B2 | 1/2017 | Ogundokun et al. |
| 9,563,331 B2 | 2/2017 | Poulos et al. |
| 9,575,559 B2 | 2/2017 | Andrysco |
| 9,619,519 B1 | 4/2017 | Dorner |
| 9,672,588 B1 | 6/2017 | Doucette et al. |
| 9,681,112 B2 | 6/2017 | Son |
| 9,684,372 B2 | 6/2017 | Xun et al. |
| 9,734,402 B2 | 8/2017 | Jang et al. |
| 9,778,814 B2 | 10/2017 | Ambrus et al. |
| 9,829,708 B1 | 11/2017 | Asada |
| 9,851,866 B2 | 12/2017 | Goossens et al. |
| 9,864,498 B2 | 1/2018 | Olsson et al. |
| 9,886,087 B1 | 2/2018 | Wald et al. |
| 9,933,833 B2 | 4/2018 | Tu et al. |
| 9,934,614 B2 | 4/2018 | Ramsby et al. |
| 9,952,042 B2 | 4/2018 | Abovitz et al. |
| 10,049,460 B2 | 8/2018 | Romano et al. |
| 10,101,803 B2 | 10/2018 | Faaborg et al. |
| 10,203,764 B2 | 2/2019 | Katz et al. |
| 10,307,671 B2 | 6/2019 | Barney et al. |
| 10,353,532 B1 | 7/2019 | Holz et al. |
| 10,394,320 B2 | 8/2019 | George-svahn et al. |
| 10,431,216 B1 | 10/2019 | Lemon et al. |
| 10,530,731 B1 | 1/2020 | Wu et al. |
| 10,534,439 B2 | 1/2020 | Raffa et al. |
| 10,565,448 B2 | 2/2020 | Bell et al. |
| 10,664,048 B2 | 5/2020 | Cieplinski et al. |
| 10,664,050 B2 | 5/2020 | Alcaide et al. |
| 10,678,403 B2 | 6/2020 | Duarte et al. |
| 10,699,488 B1 | 6/2020 | Terrano |
| 10,732,721 B1 | 8/2020 | Clements |
| 10,754,434 B2 | 8/2020 | Hall et al. |
| 10,768,693 B2 | 9/2020 | Powderly et al. |
| 10,861,242 B2 | 12/2020 | Lacey et al. |
| 10,890,967 B2 | 1/2021 | Stellmach et al. |
| 10,956,724 B1 | 3/2021 | Terrano |
| 10,983,663 B2 | 4/2021 | Iglesias |
| 11,055,920 B1 | 7/2021 | Bramwell et al. |
| 11,079,995 B1 | 8/2021 | Hulbert et al. |
| 11,082,463 B2 | 8/2021 | Felman |
| 11,112,875 B1 | 9/2021 | Zhou et al. |
| 11,175,791 B1 * | 11/2021 | Patnaikuni ............... G06F 3/017 |
| 11,199,898 B2 | 12/2021 | Blume et al. |
| 11,200,742 B1 | 12/2021 | Post et al. |
| 11,232,643 B1 | 1/2022 | Stevens et al. |
| 11,294,472 B2 | 4/2022 | Tang et al. |
| 11,294,475 B1 | 4/2022 | Pinchon et al. |
| 11,307,653 B1 | 4/2022 | Qian et al. |
| 11,340,756 B2 | 5/2022 | Faulkner et al. |
| 11,348,300 B2 | 5/2022 | Zimmermann et al. |
| 11,461,973 B2 | 10/2022 | Pinchon |
| 11,496,571 B2 | 11/2022 | Berliner et al. |
| 11,567,625 B2 | 1/2023 | Faulkner et al. |
| 11,573,363 B2 | 2/2023 | Zou et al. |
| 11,574,452 B2 | 2/2023 | Berliner et al. |
| 11,599,239 B2 | 3/2023 | Rockel et al. |
| 11,720,171 B2 | 8/2023 | Pastrana Vicente et al. |
| 11,726,577 B2 | 8/2023 | Katz |
| 11,733,824 B2 | 8/2023 | Iskandar et al. |
| 11,762,457 B1 | 9/2023 | Ikkai et al. |
| 11,875,013 B2 | 1/2024 | Lemay et al. |
| 12,032,803 B2 | 7/2024 | Pastrana Vicente et al. |
| 12,099,653 B2 | 9/2024 | Chawda et al. |
| 12,099,695 B1 | 9/2024 | Smith et al. |
| 12,113,948 B1 | 10/2024 | Smith et al. |
| 12,118,200 B1 | 10/2024 | Shutzberg et al. |
| 2001/0047250 A1 | 11/2001 | Schuller et al. |
| 2002/0044152 A1 | 4/2002 | Abbott et al. |
| 2002/0065778 A1 | 5/2002 | Bouet et al. |
| 2003/0038754 A1 | 2/2003 | Goldstein et al. |
| 2003/0151611 A1 | 8/2003 | Turpin et al. |
| 2003/0222924 A1 | 12/2003 | Baron |
| 2004/0059784 A1 | 3/2004 | Caughey |
| 2004/0104806 A1 | 6/2004 | Yui et al. |
| 2004/0243926 A1 | 12/2004 | Trenbeath et al. |
| 2005/0044510 A1 | 2/2005 | Yi |
| 2005/0100210 A1 | 5/2005 | Rice et al. |
| 2005/0138572 A1 | 6/2005 | Good et al. |
| 2005/0144570 A1 | 6/2005 | Loverin et al. |
| 2005/0144571 A1 | 6/2005 | Loverin et al. |
| 2005/0175218 A1 | 8/2005 | Vertegaal et al. |
| 2005/0198143 A1 | 9/2005 | Moody et al. |
| 2005/0216866 A1 | 9/2005 | Rosen et al. |
| 2006/0028400 A1 | 2/2006 | Lapstun et al. |
| 2006/0080702 A1 | 4/2006 | Diez et al. |
| 2006/0156228 A1 | 7/2006 | Gallo et al. |
| 2006/0256083 A1 | 11/2006 | Rosenberg |
| 2006/0283214 A1 | 12/2006 | Donadon et al. |

(56) References Cited

U.S. PATENT DOCUMENTS

| | | |
|---|---|---|
| 2007/0259716 A1 | 11/2007 | Mattice et al. |
| 2008/0181502 A1 | 7/2008 | Yang |
| 2008/0211771 A1 | 9/2008 | Richardson |
| 2009/0064035 A1 | 3/2009 | Shibata et al. |
| 2009/0146779 A1 | 6/2009 | Kumar et al. |
| 2009/0164219 A1 | 6/2009 | Yeung et al. |
| 2009/0231356 A1 | 9/2009 | Barnes et al. |
| 2010/0097375 A1 | 4/2010 | Tadaishi et al. |
| 2010/0150526 A1 | 6/2010 | Rose et al. |
| 2010/0177049 A1 | 7/2010 | Levy et al. |
| 2010/0188503 A1 | 7/2010 | Tsai et al. |
| 2010/0269145 A1 | 10/2010 | Ingrassia et al. |
| 2011/0018895 A1 | 1/2011 | Buzyn et al. |
| 2011/0018896 A1 | 1/2011 | Buzyn et al. |
| 2011/0098029 A1 | 4/2011 | Rhoads et al. |
| 2011/0156879 A1 | 6/2011 | Matsushita et al. |
| 2011/0169927 A1 | 7/2011 | Mages et al. |
| 2011/0175932 A1 | 7/2011 | Yu et al. |
| 2011/0216060 A1 | 9/2011 | Weising et al. |
| 2011/0254865 A1 | 10/2011 | Yee et al. |
| 2011/0310001 A1 | 12/2011 | Madau et al. |
| 2012/0066638 A1 | 3/2012 | Ohri |
| 2012/0075496 A1 | 3/2012 | Akifusa et al. |
| 2012/0086624 A1 | 4/2012 | Thompson et al. |
| 2012/0113223 A1 | 5/2012 | Hilliges et al. |
| 2012/0124525 A1 | 5/2012 | Kang |
| 2012/0131631 A1 | 5/2012 | Bhogal et al. |
| 2012/0151416 A1 | 6/2012 | Bell et al. |
| 2012/0170840 A1 | 7/2012 | Caruso et al. |
| 2012/0184372 A1 | 7/2012 | Laarakkers et al. |
| 2012/0218395 A1 | 8/2012 | Andersen et al. |
| 2012/0256967 A1 | 10/2012 | Baldwin et al. |
| 2012/0257035 A1 | 10/2012 | Larsen |
| 2012/0272179 A1 | 10/2012 | Stafford |
| 2013/0027860 A1 | 1/2013 | Masaki et al. |
| 2013/0093727 A1 | 4/2013 | Eriksson et al. |
| 2013/0127850 A1 | 5/2013 | Bindon |
| 2013/0148850 A1 | 6/2013 | Matsuda et al. |
| 2013/0169533 A1 | 7/2013 | Jahnke |
| 2013/0190044 A1 | 7/2013 | Kulas |
| 2013/0211843 A1 | 8/2013 | Clarkson |
| 2013/0229345 A1 | 9/2013 | Day et al. |
| 2013/0265227 A1 | 10/2013 | Julian |
| 2013/0271397 A1 | 10/2013 | Hildreth et al. |
| 2013/0278501 A1 | 10/2013 | Bulzacki |
| 2013/0286004 A1 | 10/2013 | Mcculloch et al. |
| 2013/0293456 A1 | 11/2013 | Son et al. |
| 2013/0300648 A1 | 11/2013 | Kim et al. |
| 2013/0300654 A1 | 11/2013 | Seki |
| 2013/0326364 A1 | 12/2013 | Latta et al. |
| 2013/0328925 A1 | 12/2013 | Latta et al. |
| 2013/0342564 A1 | 12/2013 | Kinnebrew et al. |
| 2013/0342570 A1 | 12/2013 | Kinnebrew et al. |
| 2014/0002338 A1 | 1/2014 | Raffa et al. |
| 2014/0024324 A1 | 1/2014 | Mumick |
| 2014/0028548 A1 | 1/2014 | Bychkov et al. |
| 2014/0049462 A1 | 2/2014 | Weinberger et al. |
| 2014/0068692 A1 | 3/2014 | Archibong et al. |
| 2014/0075361 A1 | 3/2014 | Reynolds et al. |
| 2014/0108942 A1 | 4/2014 | Freeman et al. |
| 2014/0125584 A1 | 5/2014 | Xun et al. |
| 2014/0126782 A1 | 5/2014 | Takai et al. |
| 2014/0132499 A1 | 5/2014 | Schwesinger et al. |
| 2014/0139426 A1 | 5/2014 | Kryze et al. |
| 2014/0164928 A1 | 6/2014 | Kim |
| 2014/0168453 A1 | 6/2014 | Shoemake et al. |
| 2014/0198017 A1 | 7/2014 | Lamb et al. |
| 2014/0232639 A1 | 8/2014 | Hayashi et al. |
| 2014/0247210 A1 | 9/2014 | Henderek et al. |
| 2014/0258942 A1 | 9/2014 | Kutliroff et al. |
| 2014/0268054 A1 | 9/2014 | Olsson et al. |
| 2014/0282272 A1 | 9/2014 | Kies et al. |
| 2014/0285641 A1 | 9/2014 | Kato et al. |
| 2014/0304612 A1 | 10/2014 | Collin |
| 2014/0320404 A1 | 10/2014 | Kasahara |
| 2014/0331187 A1 | 11/2014 | Hicks et al. |
| 2014/0347391 A1 | 11/2014 | Keane et al. |
| 2014/0351753 A1 | 11/2014 | Shin et al. |
| 2014/0372957 A1 | 12/2014 | Keane et al. |
| 2015/0009118 A1 | 1/2015 | Thomas et al. |
| 2015/0035822 A1 | 2/2015 | Arsan et al. |
| 2015/0035832 A1 | 2/2015 | Sugden et al. |
| 2015/0042679 A1 | 2/2015 | Järvenpää |
| 2015/0067580 A1 | 3/2015 | Um et al. |
| 2015/0077335 A1 | 3/2015 | Taguchi et al. |
| 2015/0082180 A1 | 3/2015 | Ames et al. |
| 2015/0095844 A1 | 4/2015 | Cho et al. |
| 2015/0123890 A1 | 5/2015 | Kapur et al. |
| 2015/0128075 A1 | 5/2015 | Kempinski |
| 2015/0131850 A1 | 5/2015 | Qvarfordt |
| 2015/0135108 A1 | 5/2015 | Pope et al. |
| 2015/0145887 A1 | 5/2015 | Forutanpour et al. |
| 2015/0177937 A1 | 6/2015 | Poletto et al. |
| 2015/0187093 A1 | 7/2015 | Chu et al. |
| 2015/0205106 A1 | 7/2015 | Norden |
| 2015/0212576 A1 | 7/2015 | Ambrus et al. |
| 2015/0220152 A1 | 8/2015 | Tait et al. |
| 2015/0227285 A1 | 8/2015 | Lee et al. |
| 2015/0242095 A1 | 8/2015 | Sonnenberg |
| 2015/0255067 A1 | 9/2015 | White et al. |
| 2015/0287403 A1 | 10/2015 | Holzer Zaslansky et al. |
| 2015/0317832 A1 | 11/2015 | Ebstyne et al. |
| 2015/0331240 A1 | 11/2015 | Poulos et al. |
| 2015/0331576 A1 | 11/2015 | Piya et al. |
| 2015/0332091 A1 | 11/2015 | Kim et al. |
| 2015/0350141 A1 | 12/2015 | Yang et al. |
| 2015/0370323 A1 | 12/2015 | Cieplinski et al. |
| 2016/0015470 A1 | 1/2016 | Border |
| 2016/0018898 A1 | 1/2016 | Tu et al. |
| 2016/0018900 A1 | 1/2016 | Tu et al. |
| 2016/0026242 A1 | 1/2016 | Burns et al. |
| 2016/0026243 A1 | 1/2016 | Bertram et al. |
| 2016/0026253 A1 | 1/2016 | Bradski et al. |
| 2016/0062636 A1 | 3/2016 | Jung et al. |
| 2016/0093108 A1 | 3/2016 | Mao et al. |
| 2016/0098094 A1 | 4/2016 | Minkkinen |
| 2016/0133052 A1 | 5/2016 | Choi et al. |
| 2016/0171304 A1 | 6/2016 | Golding et al. |
| 2016/0179191 A1 | 6/2016 | Kim et al. |
| 2016/0179336 A1 | 6/2016 | Ambrus et al. |
| 2016/0196692 A1 | 7/2016 | Kjallstrom et al. |
| 2016/0216768 A1 | 7/2016 | Goetz et al. |
| 2016/0239165 A1 | 8/2016 | Chen et al. |
| 2016/0253063 A1 | 9/2016 | Critchlow |
| 2016/0253821 A1 | 9/2016 | Romano et al. |
| 2016/0275702 A1 | 9/2016 | Reynolds et al. |
| 2016/0306434 A1 | 10/2016 | Ferrin |
| 2016/0313890 A1 | 10/2016 | Walline et al. |
| 2016/0334940 A1 | 11/2016 | Kandadai et al. |
| 2016/0350973 A1 | 12/2016 | Shapira et al. |
| 2016/0357266 A1 | 12/2016 | Patel et al. |
| 2016/0379409 A1 | 12/2016 | Gavriliuc et al. |
| 2017/0038829 A1 | 2/2017 | Lanier et al. |
| 2017/0038837 A1 | 2/2017 | Faaborg et al. |
| 2017/0038849 A1 | 2/2017 | Hwang |
| 2017/0039770 A1 | 2/2017 | Lanier et al. |
| 2017/0046872 A1 | 2/2017 | Geselowitz et al. |
| 2017/0060230 A1 | 3/2017 | Faaborg et al. |
| 2017/0123487 A1 | 5/2017 | Hazra et al. |
| 2017/0131964 A1 | 5/2017 | Baek et al. |
| 2017/0132694 A1 | 5/2017 | Damy |
| 2017/0132822 A1 | 5/2017 | Marschke et al. |
| 2017/0153866 A1 | 6/2017 | Grinberg et al. |
| 2017/0206691 A1 | 7/2017 | Harrises et al. |
| 2017/0212583 A1 | 7/2017 | Krasadakis |
| 2017/0228130 A1 | 8/2017 | Palmaro |
| 2017/0236332 A1 | 8/2017 | Kipman et al. |
| 2017/0285737 A1 | 10/2017 | Khalid et al. |
| 2017/0308163 A1 | 10/2017 | Cieplinski et al. |
| 2017/0315715 A1 | 11/2017 | Fujita et al. |
| 2017/0344223 A1 | 11/2017 | Holzer et al. |
| 2017/0357389 A1 | 12/2017 | Fleizach et al. |
| 2017/0357390 A1 | 12/2017 | Alonso Ruiz et al. |
| 2017/0358141 A1 | 12/2017 | Stafford et al. |

(56) References Cited

U.S. PATENT DOCUMENTS

| | | |
|---|---|---|
| 2017/0364198 A1 | 12/2017 | Yoganandan et al. |
| 2018/0045963 A1 | 2/2018 | Hoover et al. |
| 2018/0075658 A1 | 3/2018 | Lanier et al. |
| 2018/0081519 A1 | 3/2018 | Kim |
| 2018/0095634 A1 | 4/2018 | Alexander |
| 2018/0095635 A1 | 4/2018 | Valdivia et al. |
| 2018/0095636 A1 | 4/2018 | Valdivia et al. |
| 2018/0101223 A1 | 4/2018 | Ishihara et al. |
| 2018/0114364 A1 | 4/2018 | Mcphee et al. |
| 2018/0150204 A1 | 5/2018 | Macgillivray |
| 2018/0150997 A1 | 5/2018 | Austin |
| 2018/0157332 A1 | 6/2018 | Nie |
| 2018/0158222 A1 | 6/2018 | Hayashi |
| 2018/0181199 A1 | 6/2018 | Harvey et al. |
| 2018/0181272 A1 | 6/2018 | Olsson et al. |
| 2018/0188802 A1 | 7/2018 | Okumura |
| 2018/0197336 A1 | 7/2018 | Rochford et al. |
| 2018/0210628 A1 | 7/2018 | Mcphee et al. |
| 2018/0239144 A1 | 8/2018 | Woods et al. |
| 2018/0275753 A1 | 9/2018 | Publicover et al. |
| 2018/0288206 A1 | 10/2018 | Stimpson et al. |
| 2018/0300023 A1 | 10/2018 | Hein |
| 2018/0315248 A1 | 11/2018 | Bastov et al. |
| 2018/0322701 A1 | 11/2018 | Pahud et al. |
| 2018/0348861 A1 | 12/2018 | Uscinski et al. |
| 2018/0350119 A1 | 12/2018 | Kocharlakota et al. |
| 2019/0018498 A1 | 1/2019 | West et al. |
| 2019/0034076 A1 | 1/2019 | Vinayak et al. |
| 2019/0043259 A1 | 2/2019 | Wang et al. |
| 2019/0050062 A1 | 2/2019 | Chen et al. |
| 2019/0065027 A1 | 2/2019 | Hauenstein et al. |
| 2019/0073109 A1 | 3/2019 | Zhang et al. |
| 2019/0080572 A1 | 3/2019 | Kim et al. |
| 2019/0088149 A1 | 3/2019 | Fink et al. |
| 2019/0094963 A1 | 3/2019 | Nijs |
| 2019/0094979 A1 | 3/2019 | Hall et al. |
| 2019/0101991 A1 | 4/2019 | Brennan |
| 2019/0130633 A1 | 5/2019 | Haddad et al. |
| 2019/0130733 A1 | 5/2019 | Hodge |
| 2019/0138183 A1 | 5/2019 | Rosas et al. |
| 2019/0146128 A1 | 5/2019 | Cao et al. |
| 2019/0172261 A1 | 6/2019 | Alt et al. |
| 2019/0172262 A1 | 6/2019 | Mchugh et al. |
| 2019/0188895 A1 | 6/2019 | Miller, IV et al. |
| 2019/0204906 A1 | 7/2019 | Ross et al. |
| 2019/0227763 A1 | 7/2019 | Kaufthal |
| 2019/0251884 A1 | 8/2019 | Burns et al. |
| 2019/0258365 A1 | 8/2019 | Zurmoehle et al. |
| 2019/0279407 A1 | 9/2019 | Mchugh et al. |
| 2019/0294312 A1 | 9/2019 | Rohrbacher |
| 2019/0310757 A1 | 10/2019 | Lee et al. |
| 2019/0324529 A1 | 10/2019 | Stellmach et al. |
| 2019/0332244 A1 | 10/2019 | Beszteri et al. |
| 2019/0339770 A1 | 11/2019 | Kurlethimar et al. |
| 2019/0340816 A1 | 11/2019 | Rogers |
| 2019/0346678 A1 | 11/2019 | Nocham |
| 2019/0346922 A1 | 11/2019 | Young et al. |
| 2019/0354259 A1 | 11/2019 | Park |
| 2019/0361521 A1 | 11/2019 | Stellmach et al. |
| 2019/0362557 A1 | 11/2019 | Lacey et al. |
| 2019/0370492 A1 | 12/2019 | Falchuk et al. |
| 2019/0371072 A1 | 12/2019 | Lindberg et al. |
| 2019/0377487 A1 | 12/2019 | Bailey et al. |
| 2019/0379765 A1 | 12/2019 | Fajt et al. |
| 2019/0384406 A1 | 12/2019 | Smith et al. |
| 2020/0004401 A1 | 1/2020 | Hwang et al. |
| 2020/0012341 A1 | 1/2020 | Stellmach et al. |
| 2020/0026349 A1 | 1/2020 | Fontanel et al. |
| 2020/0043243 A1 | 2/2020 | Bhushan et al. |
| 2020/0082602 A1 | 3/2020 | Jones |
| 2020/0089314 A1 | 3/2020 | Poupyrev et al. |
| 2020/0092537 A1 | 3/2020 | Sutter et al. |
| 2020/0098140 A1 | 3/2020 | Jagnow et al. |
| 2020/0098173 A1 | 3/2020 | Mccall |
| 2020/0117213 A1 | 4/2020 | Tian et al. |
| 2020/0128232 A1 | 4/2020 | Hwang et al. |
| 2020/0129850 A1 | 4/2020 | Ohashi |
| 2020/0159017 A1 | 5/2020 | Lin et al. |
| 2020/0225735 A1 | 7/2020 | Schwarz |
| 2020/0225746 A1 | 7/2020 | Bar-zeev et al. |
| 2020/0225747 A1 | 7/2020 | Bar-zeev et al. |
| 2020/0225830 A1 | 7/2020 | Tang et al. |
| 2020/0226814 A1 | 7/2020 | Tang et al. |
| 2020/0242844 A1 | 7/2020 | Bae et al. |
| 2020/0285314 A1 | 9/2020 | Cieplinski et al. |
| 2020/0356221 A1 | 11/2020 | Behzadi et al. |
| 2020/0357374 A1 | 11/2020 | Verweij et al. |
| 2020/0363867 A1 | 11/2020 | Azimi et al. |
| 2020/0371673 A1 | 11/2020 | Faulkner |
| 2020/0387214 A1 | 12/2020 | Ravasz et al. |
| 2020/0387228 A1 | 12/2020 | Ravasz et al. |
| 2020/0387287 A1 | 12/2020 | Ravasz et al. |
| 2021/0074062 A1 | 3/2021 | Madonna et al. |
| 2021/0090337 A1 | 3/2021 | Ravasz et al. |
| 2021/0096726 A1 | 4/2021 | Faulkner et al. |
| 2021/0097766 A1 | 4/2021 | Palangie et al. |
| 2021/0103333 A1 | 4/2021 | Cieplinski et al. |
| 2021/0125414 A1 | 4/2021 | Berkebile |
| 2021/0165484 A1 | 6/2021 | Suguhara et al. |
| 2021/0191600 A1 | 6/2021 | Lemay et al. |
| 2021/0295602 A1 | 9/2021 | Scapel et al. |
| 2021/0303074 A1 | 9/2021 | Vanblon et al. |
| 2021/0303107 A1 | 9/2021 | Pla I Conesa et al. |
| 2021/0319617 A1 | 10/2021 | Ahn et al. |
| 2021/0327140 A1 | 10/2021 | Rothkopf et al. |
| 2021/0339134 A1 | 11/2021 | Knoppert |
| 2021/0350564 A1 | 11/2021 | Peuhkurinen et al. |
| 2021/0350604 A1 | 11/2021 | Pejsa et al. |
| 2021/0352172 A1 | 11/2021 | Kim et al. |
| 2021/0368136 A1 | 11/2021 | Chalmers et al. |
| 2021/0375022 A1 | 12/2021 | Lee et al. |
| 2021/0402306 A1 | 12/2021 | Huang |
| 2022/0011577 A1 | 1/2022 | Lawver et al. |
| 2022/0011855 A1 | 1/2022 | Hazra et al. |
| 2022/0012002 A1 | 1/2022 | Bar-zeev et al. |
| 2022/0030197 A1 | 1/2022 | Ishimoto |
| 2022/0070241 A1 | 3/2022 | Yerli |
| 2022/0083197 A1 | 3/2022 | Rockel et al. |
| 2022/0091722 A1 | 3/2022 | Faulkner et al. |
| 2022/0091723 A1 | 3/2022 | Faulkner et al. |
| 2022/0092862 A1 | 3/2022 | Faulkner et al. |
| 2022/0100270 A1 | 3/2022 | Pastrana Vicente et al. |
| 2022/0101593 A1 | 3/2022 | Rockel et al. |
| 2022/0101612 A1 | 3/2022 | Palangie et al. |
| 2022/0104910 A1 | 4/2022 | Shelton et al. |
| 2022/0121344 A1 | 4/2022 | Pastrana Vicente et al. |
| 2022/0130107 A1 | 4/2022 | Lindh |
| 2022/0137701 A1 | 5/2022 | Bowman et al. |
| 2022/0137705 A1 | 5/2022 | Hashimoto et al. |
| 2022/0155909 A1 | 5/2022 | Kawashima et al. |
| 2022/0157083 A1 | 5/2022 | Jandhyala et al. |
| 2022/0165013 A1 | 5/2022 | Velez et al. |
| 2022/0187907 A1 | 6/2022 | Lee et al. |
| 2022/0191570 A1 | 6/2022 | Reid et al. |
| 2022/0197403 A1 | 6/2022 | Hughes et al. |
| 2022/0198755 A1 | 6/2022 | Pinchon |
| 2022/0214743 A1 | 7/2022 | Dascola et al. |
| 2022/0229524 A1 | 7/2022 | Mckenzie et al. |
| 2022/0229534 A1 | 7/2022 | Terre et al. |
| 2022/0232191 A1 | 7/2022 | Kawakami et al. |
| 2022/0244536 A1 | 8/2022 | Sha et al. |
| 2022/0245888 A1 | 8/2022 | Singh et al. |
| 2022/0253136 A1 | 8/2022 | Holder et al. |
| 2022/0253149 A1 | 8/2022 | Berliner et al. |
| 2022/0253194 A1 | 8/2022 | Berliner et al. |
| 2022/0255995 A1 | 8/2022 | Berliner et al. |
| 2022/0276720 A1 | 9/2022 | Yasui |
| 2022/0317776 A1 | 10/2022 | Sundstrom et al. |
| 2022/0326837 A1 | 10/2022 | Dessero et al. |
| 2022/0365595 A1 | 11/2022 | Cieplinski et al. |
| 2022/0365740 A1 | 11/2022 | Chang et al. |
| 2022/0374136 A1 | 11/2022 | Chang et al. |
| 2022/0413691 A1 | 12/2022 | Becker et al. |
| 2022/0414999 A1 | 12/2022 | Ravasz et al. |

(56) References Cited

U.S. PATENT DOCUMENTS

| | | |
|---|---|---|
| 2023/0004216 A1 | 1/2023 | Rodgers et al. |
| 2023/0008537 A1 | 1/2023 | Henderson et al. |
| 2023/0021861 A1 | 1/2023 | Fujiwara et al. |
| 2023/0032545 A1 | 2/2023 | Mindlin et al. |
| 2023/0068660 A1 | 3/2023 | Brent et al. |
| 2023/0069764 A1 | 3/2023 | Jonker et al. |
| 2023/0074080 A1 | 3/2023 | Miller et al. |
| 2023/0092282 A1 | 3/2023 | Boesel et al. |
| 2023/0093979 A1 | 3/2023 | Stauber et al. |
| 2023/0100689 A1 | 3/2023 | Chiu et al. |
| 2023/0133579 A1 | 5/2023 | Chang et al. |
| 2023/0152889 A1 | 5/2023 | Cieplinski et al. |
| 2023/0152935 A1 | 5/2023 | Mckenzie et al. |
| 2023/0154122 A1 | 5/2023 | Dascola et al. |
| 2023/0163987 A1 | 5/2023 | Young et al. |
| 2023/0168788 A1 | 6/2023 | Faulkner et al. |
| 2023/0185426 A1 | 6/2023 | Rockel et al. |
| 2023/0186577 A1 | 6/2023 | Rockel et al. |
| 2023/0206921 A1 | 6/2023 | Edelsburg et al. |
| 2023/0244857 A1 | 8/2023 | Weiss et al. |
| 2023/0259265 A1 | 8/2023 | Krivoruchko et al. |
| 2023/0273706 A1 | 8/2023 | Smith et al. |
| 2023/0274504 A1 | 8/2023 | Ren et al. |
| 2023/0308610 A1 | 9/2023 | Henderson et al. |
| 2023/0315385 A1 | 10/2023 | Akmal et al. |
| 2023/0316634 A1 | 10/2023 | Chiu et al. |
| 2023/0325004 A1 | 10/2023 | Burns et al. |
| 2023/0333646 A1 | 10/2023 | Pastrana Vicente et al. |
| 2023/0334808 A1 | 10/2023 | Sundstrom et al. |
| 2023/0350539 A1 | 11/2023 | Owen et al. |
| 2023/0359199 A1 | 11/2023 | Adachi et al. |
| 2023/0384907 A1 | 11/2023 | Boesel et al. |
| 2023/0388357 A1 | 11/2023 | Faulkner et al. |
| 2024/0086032 A1 | 3/2024 | Palangie et al. |
| 2024/0087256 A1 | 3/2024 | Hylak et al. |
| 2024/0094863 A1 | 3/2024 | Smith et al. |
| 2024/0094866 A1 | 3/2024 | Lemay et al. |
| 2024/0094882 A1 | 3/2024 | Brewer et al. |
| 2024/0095984 A1 | 3/2024 | Ren et al. |
| 2024/0103613 A1 | 3/2024 | Chawda et al. |
| 2024/0103676 A1 | 3/2024 | Pastrana Vicente et al. |
| 2024/0103684 A1 | 3/2024 | Yu et al. |
| 2024/0103687 A1 | 3/2024 | Pastrana Vicente et al. |
| 2024/0103701 A1 | 3/2024 | Pastrana Vicente et al. |
| 2024/0103704 A1 | 3/2024 | Pastrana Vicente et al. |
| 2024/0103707 A1 | 3/2024 | Henderson et al. |
| 2024/0103716 A1 | 3/2024 | Pastrana Vicente et al. |
| 2024/0103803 A1 | 3/2024 | Krivoruchko et al. |
| 2024/0104836 A1 | 3/2024 | Dessero et al. |
| 2024/0104873 A1 | 3/2024 | Pastrana Vicente et al. |
| 2024/0104877 A1 | 3/2024 | Henderson et al. |
| 2024/0111479 A1 | 4/2024 | Paul |
| 2024/0119682 A1 | 4/2024 | Rudman et al. |
| 2024/0192764 A1 | 6/2024 | Dascola et al. |
| 2024/0221291 A1 | 7/2024 | Henderson et al. |
| 2024/0272782 A1 | 8/2024 | Pastrana Vicente et al. |
| 2024/0291953 A1 | 8/2024 | Cerra et al. |
| 2024/0310971 A1 | 9/2024 | Kawashima et al. |
| 2024/0361835 A1 | 10/2024 | Hylak et al. |
| 2024/0393876 A1 | 11/2024 | Chawda et al. |
| 2024/0402800 A1 | 12/2024 | Shutzberg et al. |
| 2024/0402821 A1 | 12/2024 | Meyer et al. |
| 2024/0404206 A1 | 12/2024 | Chiu et al. |
| 2024/0411444 A1 | 12/2024 | Shutzberg et al. |
| 2024/0420435 A1 | 12/2024 | Gitter et al. |
| 2024/0428488 A1 | 12/2024 | Ren et al. |
| 2025/0008057 A1 | 1/2025 | Chiu et al. |
| 2025/0013343 A1 | 1/2025 | Smith et al. |
| 2025/0013344 A1 | 1/2025 | Smith et al. |
| 2025/0024008 A1 | 1/2025 | Cerra et al. |
| 2025/0028423 A1 | 1/2025 | Dessero et al. |
| 2025/0029319 A1 | 1/2025 | Boesel et al. |
| 2025/0029328 A1 | 1/2025 | Smith et al. |
| 2025/0036255 A1 | 1/2025 | Pastrana Vicente et al. |
| 2025/0078420 A1 | 3/2025 | Dessero et al. |
| 2025/0078429 A1 | 3/2025 | Dascola et al. |

FOREIGN PATENT DOCUMENTS

| | | |
|---|---|---|
| CN | 105264461 A | 1/2016 |
| CN | 105264478 A | 1/2016 |
| CN | 106575149 A | 4/2017 |
| CN | 108633307 A | 10/2018 |
| CN | 110476142 A | 11/2019 |
| CN | 110673718 A | 1/2020 |
| CN | 109491508 B | 8/2022 |
| EP | 0816983 A2 | 1/1998 |
| EP | 1530115 A2 | 5/2005 |
| EP | 2551763 A1 | 1/2013 |
| EP | 2741175 A2 | 6/2014 |
| EP | 2947545 A1 | 11/2015 |
| EP | 3088997 A1 | 11/2016 |
| EP | 3249497 A1 | 11/2017 |
| EP | 3316075 A1 | 5/2018 |
| EP | 3451135 A1 | 3/2019 |
| EP | 3503101 A1 | 6/2019 |
| EP | 3570144 A1 | 11/2019 |
| EP | 3588255 A1 | 1/2020 |
| EP | 3654147 A1 | 5/2020 |
| JP | H06-4596 A | 1/1994 |
| JP | H10-51711 A | 2/1998 |
| JP | H10-78845 A | 3/1998 |
| JP | 2005-215144 A | 8/2005 |
| JP | 2005-333524 A | 12/2005 |
| JP | 2006-4093 A | 1/2006 |
| JP | 2006-107048 A | 4/2006 |
| JP | 2006-146803 A | 6/2006 |
| JP | 2006-295236 A | 10/2006 |
| JP | 2011-203880 A | 10/2011 |
| JP | 2012-234550 A | 11/2012 |
| JP | 2013-178639 A | 9/2013 |
| JP | 2013-196158 A | 9/2013 |
| JP | 2013-254358 A | 12/2013 |
| JP | 2013-257716 A | 12/2013 |
| JP | 2014-021565 A | 2/2014 |
| JP | 2014-059840 A | 4/2014 |
| JP | 2014-071663 A | 4/2014 |
| JP | 2014-099184 A | 5/2014 |
| JP | 2014-514652 A | 6/2014 |
| JP | 2015-056173 A | 3/2015 |
| JP | 2015-515040 A | 5/2015 |
| JP | 2015-118332 A | 6/2015 |
| JP | 2016-096513 A | 5/2016 |
| JP | 2016-194744 A | 11/2016 |
| JP | 2017-027206 A | 2/2017 |
| JP | 2017-058528 A | 3/2017 |
| JP | 2017-531221 A | 10/2017 |
| JP | 2018-005516 A | 1/2018 |
| JP | 2018-005517 A | 1/2018 |
| JP | 2018-041477 A | 3/2018 |
| JP | 2018-514005 A | 5/2018 |
| JP | 2018-101019 A | 6/2018 |
| JP | 2018-106499 A | 7/2018 |
| JP | 2019-040333 A | 3/2019 |
| JP | 2019-169154 A | 10/2019 |
| JP | 2019-175449 A | 10/2019 |
| JP | 2019-536131 A | 12/2019 |
| JP | 2020-503595 A | 1/2020 |
| JP | 2022-053334 A | 4/2022 |
| KR | 10-2011-0017236 A | 2/2011 |
| KR | 10-2016-0012139 A | 2/2016 |
| KR | 10-2019-0100957 A | 8/2019 |
| KR | 10-2020-0010296 A | 1/2020 |
| KR | 10-2020-0035103 A | 4/2020 |
| WO | 2010/026519 A1 | 3/2010 |
| WO | 2011/008638 A1 | 1/2011 |
| WO | 2012/145180 A1 | 10/2012 |
| WO | 2014/203301 A1 | 12/2014 |
| WO | 2015/195216 A1 | 12/2015 |
| WO | 2017/088487 A1 | 6/2017 |
| WO | 2018/046957 A2 | 3/2018 |
| WO | 2018/175735 A1 | 9/2018 |

(56) References Cited

FOREIGN PATENT DOCUMENTS

| WO | 2019/142560 A1 | 7/2019 |
|---|---|---|
| WO | 2019/217163 A1 | 11/2019 |
| WO | 2020/066682 A1 | 4/2020 |
| WO | 2021/061351 A1 | 4/2021 |
| WO | 2021/173839 A1 | 9/2021 |
| WO | 2021/202783 A1 | 10/2021 |
| WO | 2022/046340 A1 | 3/2022 |
| WO | 2022/055822 A1 | 3/2022 |
| WO | 2022/066399 A1 | 3/2022 |
| WO | 2022/066535 A2 | 3/2022 |
| WO | 2022/146936 A1 | 7/2022 |
| WO | 2022/146938 A1 | 7/2022 |
| WO | 2022/147146 A1 | 7/2022 |
| WO | 2022/164881 A1 | 8/2022 |
| WO | 2023/096940 A2 | 6/2023 |
| WO | 2023/141535 A1 | 7/2023 |

OTHER PUBLICATIONS

Corrected Notice of Allowability received for U.S. Appl. No. 17/448,875, mailed on Apr. 24, 2024, 4 pages.
Corrected Notice of Allowability received for U.S. Appl. No. 17/479,791, mailed on May 19, 2023, 2 pages.
Corrected Notice of Allowability received for U.S. Appl. No. 17/659,147, mailed on Feb. 14, 2024, 6 pages.
Corrected Notice of Allowability received for U.S. Appl. No. 17/932,655, mailed on Oct. 12, 2023, 2 pages.
Corrected Notice of Allowability received for U.S. Appl. No. 18/154,757, mailed on Aug. 30, 2024, 2 pages.
Corrected Notice of Allowability received for U.S. Appl. No. 18/421,827, mailed on Aug. 29, 2024, 2 pages.
Corrected Notice of Allowability received for U.S. Appl. No. 18/463,739, mailed on Oct. 4, 2024, 2 pages.
Corrected Notice of Allowability received for U.S. Appl. No. 18/465,098, mailed on Mar. 13, 2024, 3 pages.
Corrected Notice of Allowability received for U.S. Appl. No. 17/935,095, mailed on Oct. 18, 2024, 3 Pages.
Corrected Notice of Allowance received for U.S. Appl. No. 17/478,593, mailed on Dec. 21, 2022, 2 pages.
European Search Report received for European Patent Application No. 21791153.6, mailed on Mar. 22, 2024, 5 pages.
European Search Report received for European Patent Application No. 21801378.7, mailed on Jul. 10, 2024, 5 pages.
Extended European Search Report received for European Patent Application No. 23158818.7, mailed on Jul. 3, 2023, 12 pages.
Extended European Search Report received for European Patent Application No. 23158929.2, mailed on Jun. 27, 2023, 12 pages.
Extended European Search Report received for European Patent Application No. 23197572.3, mailed on Feb. 19, 2024, 7 pages.
Extended European Search Report received for European Patent Application No. 24159868.9, mailed on Oct. 9, 2024, 13 pages.
Extended European Search Report received for European Patent Application No. 24179233.2, mailed on Oct. 2, 2024, 10 pages.
Extended European Search Report received for European Patent Application No. 24179830.5, mailed on Nov. 5, 2024, 11 pages.
Final Office Action received for U.S. Appl. No. 14/531,874, mailed on Nov. 4, 2016, 10 pages.
Final Office Action received for U.S. Appl. No. 15/644,639, mailed on Sep. 19, 2019, 12 pages.
Final Office Action received for U.S. Appl. No. 17/202,034, mailed on May 4, 2023, 41 pages.
Final Office Action received for U.S. Appl. No. 17/202,034, mailed on Nov. 4, 2024, 50 pages.
Final Office Action received for U.S. Appl. No. 17/448,875, mailed on Mar. 16, 2023, 24 pages.
Final Office Action received for U.S. Appl. No. 17/580,495, mailed on May 13, 2024, 29 pages.
Final Office Action received for U.S. Appl. No. 17/659,147, mailed on Oct. 4, 2023, 17 pages.
Final Office Action received for U.S. Appl. No. 17/816,314, mailed on Jan. 20, 2023, 11 pages.
Final Office Action received for U.S. Appl. No. 17/935,095, mailed on Dec. 29, 2023, 15 pages.
Final Office Action received for U.S. Appl. No. 18/182,300, mailed on Feb. 16, 2024, 32 pages.
Final Office Action received for U.S. Appl. No. 18/182,300, mailed on Oct. 31, 2024, 34 pages.
Final Office Action received for U.S. Appl. No. 18/375,280, mailed on Jul. 12, 2024, 19 pages.
Home | Virtual Desktop [online], Virtual Desktop, Available online at: <https://www.vrdesktop.net>, [retrieved on Jun. 29, 2023], 4 pages.
International Search Report received for PCT Application No. PCT/US2022/076603, mailed on Jan. 9, 2023, 4 pages.
International Search Report received for PCT Application No. PCT/US2023/017335, mailed on Aug. 22, 2023, 6 pages.
International Search Report received for PCT Application No. PCT/US2023/018213, mailed on Jul. 26, 2023, 6 pages.
International Search Report received for PCT Application No. PCT/US2023/019458, mailed on Aug. 8, 2023, 7 pages.
International Search Report received for PCT Application No. PCT/US2023/060052, mailed on May 24, 2023, 6 pages.
International Search Report received for PCT Application No. PCT/US2023/060943, mailed on Jun. 6, 2023, 7 pages.
International Search Report received for PCT Application No. PCT/US2023/074962, mailed on Jan. 19, 2024, 9 pages.
International Search Report received for PCT Application No. PCT/US2024/030107, mailed on Oct. 23, 2024, 9 pages.
International Search Report received for PCT Application No. PCT/US2024/032314, mailed on Nov. 11, 2024, 6 pages.
International Search Report received for PCT Patent Application No. PCT/US2015/029727, mailed on Nov. 2, 2015, 6 pages.
International Search Report received for PCT Patent Application No. PCT/US2021/022413, mailed on Aug. 13, 2021, 7 pages.
Yamada Yoshihiro, "How to Generate a Modal Window with ModalPopup Control", Available online at: <http://web.archive.org/web/20210920015801/https://atmarkit.itmedia.co.jp/fdotnet/dotnettips/580aspajaxmodalpoup/aspajaxmodalpopup.html>[Search Date Aug. 22, 2023], Sep. 20, 2021, 8 pages (1 page of English Abstract and 7 pages of Official Copy).
International Search Report received for PCT Patent Application No. PCT/US2021/050948, mailed on Mar. 4, 2022, 6 pages.
Simple Modal Window With Background Blur Effect, Available online at: <http://web.archive.org/web/20160313233427/https://www.cssscript.com/simple-modal-window-with-background-blur-effect/>, Mar. 13, 2016, 5 pages.
Schenk et al., "SPOCK: A Smooth Pursuit Oculomotor Control Kit", CHI'16 Extended Abstracts, San Jose, CA, USA, ACM, May 7-12, 2016, pp. 2681-2687.
International Search Report received for PCT Patent Application No. PCT/US2021/071518, mailed on Feb. 25, 2022, 7 pages.
International Search Report received for PCT Patent Application No. PCT/US2021/071595, mailed on Mar. 17, 2022, 7 pages.
International Search Report received for PCT Patent Application No. PCT/US2021/071596, mailed on Apr. 8, 2022, 7 pages.
International Search Report received for PCT Patent Application No. PCT/US2022/013208, mailed on Apr. 26, 2022, 7 pages.
International Search Report received for PCT Patent Application No. PCT/US2022/071704, mailed on Aug. 26, 2022, 6 pages.
International Search Report received for PCT Patent Application No. PCT/US2022/076985, mailed on Feb. 20, 2023, 5 pages.
International Search Report received for PCT Patent Application No. PCT/US2023/074257, mailed on Nov. 21, 2023, 5 pages.
International Search Report received for PCT Patent Application No. PCT/US2023/074793, mailed on Feb. 6, 2024, 6 pages.
International Search Report received for PCT Patent Application No. PCT/US2023/074950, mailed on Jan. 3, 2024, 9 pages.
International Search Report received for PCT Patent Application No. PCT/US2023/074979, mailed on Feb. 26, 2024, 6 pages.
International Search Report received for PCT Patent Application No. PCT/US2024/026102, mailed on Aug. 26, 2024, 5 pages.

(56) References Cited

OTHER PUBLICATIONS

Letter Restarting Period for Response received for U.S. Appl. No. 15/644,639, mailed on Sep. 28, 2018, 8 pages.
Non-Final Office Action received for U.S. Appl. No. 14/531,874, mailed on May 18, 2016, 11 pages.
Non-Final Office Action received for U.S. Appl. No. 15/644,639, mailed on Apr. 12, 2019, 11 pages.
Non-Final Office Action received for U.S. Appl. No. 15/644,639, mailed on Sep. 10, 2018, 9 pages.
Non-Final Office Action received for U.S. Appl. No. 16/881,599, mailed on Apr. 28, 2021, 8 pages.
Non-Final Office Action received for U.S. Appl. No. 17/123,000, mailed on Nov. 12, 2021, 8 pages.
Non-Final Office Action received for U.S. Appl. No. 17/202,034, mailed on Jan. 19, 2024, 44 pages.
Non-Final Office Action received for U.S. Appl. No. 17/202,034, mailed on Jul. 20, 2022, 38 pages.
Non-Final Office Action received for U.S. Appl. No. 17/448,875, mailed on Oct. 6, 2022, 25 pages.
Non-Final Office Action received for U.S. Appl. No. 17/448,875, mailed on Sep. 29, 2023, 30 pages.
Non-Final Office Action received for U.S. Appl. No. 17/479,791, mailed on May 11, 2022, 18 pages.
Non-Final Office Action received for U.S. Appl. No. 17/580,495, mailed on Aug. 15, 2024, 28 pages.
Non-Final Office Action received for U.S. Appl. No. 17/580,495, mailed on Dec. 11, 2023, 27 pages.
Non-Final Office Action received for U.S. Appl. No. 17/659,147, mailed on Mar. 16, 2023, 19 pages.
Non-Final Office Action received for U.S. Appl. No. 17/816,314, mailed on Jul. 6, 2023, 10 pages.
Non-Final Office Action received for U.S. Appl. No. 17/816,314, mailed on Sep. 23, 2022, 10 pages.
Non-Final Office Action received for U.S. Appl. No. 17/932,655, mailed on Apr. 20, 2023, 10 pages.
Non-Final Office Action received for U.S. Appl. No. 17/932,999, mailed on Feb. 23, 2024, 22 pages.
Non-Final Office Action received for U.S. Appl. No. 17/935,095, mailed on Jun. 22, 2023, 15 pages.
Non-Final Office Action received for U.S. Appl. No. 18/154,697, mailed on Nov. 24, 2023, 10 pages.
Non-Final Office Action received for U.S. Appl. No. 18/157,040, mailed on May 2, 2024, 25 pages.
Non-Final Office Action received for U.S. Appl. No. 18/182,300, mailed on May 29, 2024, 33 pages.
Non-Final Office Action received for U.S. Appl. No. 18/182,300, mailed on Oct. 26, 2023, 29 pages.
Non-Final Office Action received for U.S. Appl. No. 18/305,201, mailed on May 23, 2024, 11 pages.
Non-Final Office Action received for U.S. Appl. No. 18/322,469, mailed on Nov. 15, 2024, 34 pages.
Non-Final Office Action received for U.S. Appl. No. 18/327,318, mailed on Sep. 16, 2024, 13 pages.
Non-Final Office Action received for U.S. Appl. No. 18/336,770, mailed on Jun. 5, 2024, 12 pages.
Non-Final Office Action received for U.S. Appl. No. 18/473,196, mailed on Aug. 16, 2024, 21 pages.
Notice of Allowance received for U.S. Appl. No. 18/154,757, mailed on Aug. 26, 2024, 12 pages.
Notice of Allowance received for U.S. Appl. No. 14/531,874, mailed on Mar. 28, 2017, 9 pages.
Notice of Allowance received for U.S. Appl. No. 15/644,639, mailed on Jan. 16, 2020, 16 pages.
Notice of Allowance received for U.S. Appl. No. 16/881,599, mailed on Dec. 17, 2021, 7 pages.
Notice of Allowance received for U.S. Appl. No. 17/123,000, mailed on May 27, 2022, 8 pages.
Notice of Allowance received for U.S. Appl. No. 17/123,000, mailed on Sep. 19, 2022, 7 pages.
Notice of Allowance received for U.S. Appl. No. 17/448,875, mailed on Apr. 17, 2024, 8 pages.
Notice of Allowance received for U.S. Appl. No. 17/448,875, mailed on Jul. 12, 2024, 8 pages.
Notice of Allowance received for U.S. Appl. No. 17/448,876, mailed on Apr. 7, 2022, 9 pages.
Notice of Allowance received for U.S. Appl. No. 17/448,876, mailed on Jul. 20, 2022, 8 pages.
Notice of Allowance received for U.S. Appl. No. 17/478,593, mailed on Aug. 31, 2022, 10 pages.
Notice of Allowance received for U.S. Appl. No. 17/479,791, mailed on Mar. 13, 2023, 9 pages.
Notice of Allowance received for U.S. Appl. No. 17/479,791, mailed on Nov. 17, 2022, 9 pages.
Notice of Allowance received for U.S. Appl. No. 17/580,495, mailed on Jun. 6, 2023, 6 pages.
Notice of Allowance received for U.S. Appl. No. 17/580,495, mailed on Nov. 30, 2022, 12 pages.
Notice of Allowance received for U.S. Appl. No. 17/659,147, mailed on Jan. 26, 2024, 13 pages.
Notice of Allowance received for U.S. Appl. No. 17/659,147, mailed on May 29, 2024, 13 pages.
Notice of Allowance received for U.S. Appl. No. 17/816,314, mailed on Jan. 4, 2024, 6 pages.
Notice of Allowance received for U.S. Appl. No. 17/932,655, mailed on Jan. 24, 2024, 7 pages.
Notice of Allowance received for U.S. Appl. No. 17/932,655, mailed on Sep. 29, 2023, 7 pages.
Notice of Allowance received for U.S. Appl. No. 17/932,999, mailed on Sep. 12, 2024, 9 pages.
Notice of Allowance received for U.S. Appl. No. 17/935,095, mailed on Jul. 3, 2024, 9 pages.
Notice of Allowance received for U.S. Appl. No. 18/154,697, mailed on Aug. 6, 2024, 8 pages.
Notice of Allowance received for U.S. Appl. No. 18/154,757, mailed on Jan. 23, 2024, 10 pages.
Notice of Allowance received for U.S. Appl. No. 18/154,757, mailed on May 10, 2024, 12 pages.
Notice of Allowance received for U.S. Appl. No. 18/421,675, mailed on Apr. 11, 2024, 9 pages.
Notice of Allowance received for U.S. Appl. No. 18/421,675, mailed on Jul. 31, 2024, 8 pages.
Notice of Allowance received for U.S. Appl. No. 18/421,827, mailed on Aug. 14, 2024, 10 pages.
Notice of Allowance received for U.S. Appl. No. 18/423,187, mailed on Jun. 5, 2024, 9 pages.
Notice of Allowance received for U.S. Appl. No. 18/463,739, mailed on Feb. 1, 2024, 10 pages.
Notice of Allowance received for U.S. Appl. No. 18/463,739, mailed on Jun. 17, 2024, 9 pages.
Notice of Allowance received for U.S. Appl. No. 18/463,739, mailed on Oct. 30, 2023, 11 pages.
Notice of Allowance received for U.S. Appl. No. 18/465,098, mailed on Jun. 20, 2024, 8 pages.
Notice of Allowance received for U.S. Appl. No. 18/465,098, mailed on Mar. 4, 2024, 6 pages.
Notice of Allowance received for U.S. Appl. No. 18/465,098, mailed on Nov. 17, 2023, 8 pages.
Restriction Requirement received for U.S. Appl. No. 17/932,999, mailed on Oct. 3, 2023, 6 pages.
Search Report received for Chinese Patent Application No. 202310873465.7, mailed on Feb. 1, 2024, 5 pages (2 pages of English Translation and 3 pages of Official Copy).
Supplemental Notice of Allowance received for U.S. Appl. No. 14/531,874, mailed on Jul. 26, 2017, 5 pages.
Bhowmick Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.
Bohn Dieter, "Rebooting WebOS: How LG Rethought The Smart TV", The Verge, Available online at: <http://www.theverge.com/

(56) References Cited

OTHER PUBLICATIONS

2014/1/6/5279220/rebooting-webos-how-Ig-rethought-the-smart-tv>, [Retrieved Aug. 26, 2019], Jan. 6, 2014, 5 pages.
Bolt et al., "Two-Handed Gesture in Multi-Modal Natural Dialog", Uist '92, 5th Annual Symposium on User Interface Software And Technology. Proceedings Of the ACM Symposium on User Interface Software And Technology, Monterey, Nov. 15-18, 1992, pp. 7-14.
Brennan Dominic, "4 Virtual Reality Desktops for Vive, Rift, and Windows VR Compared", [online]. Road to VR, Available online at: <https://www.roadtovr.com/virtual-reality-desktop-compared-oculus-rift-htc-vive/>, [retrieved on Jun. 29, 2023], Jan. 3, 2018, 4 pages.
Camalich Sergio, "CSS Buttons with Pseudo-elements", Available online at: <https://tympanus.net/codrops/2012/01/11/css-buttons-with-pseudo-elements/>, [retrieved on Jul. 12, 2017], Jan. 11, 2012, 8 pages.
Chatterjee et al., "Gaze+Gesture: Expressive, Precise and Targeted Free-Space Interactions", ICMI '15, Nov. 9-13, 2015, 8 pages.
Fatima et al., "Eye Movement Based Human Computer Interaction", 3rd International Conference On Recent Advances In Information Technology (RAIT), Mar. 3, 2016, pp. 489-494.
Grey Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.
Lin et al., "Towards Naturally Grabbing and Moving Objects in VR", IS&T International Symposium on Electronic Imaging and The Engineering Reality of Virtual Reality, 2016, 6 pages.
Mcgill et al., "Expanding The Bounds Of Seated Virtual Workspaces", University of Glasgow, Available online at: <https://core.ac.uk/download/pdf/323988271.pdf>, [retrieved on Jun. 27, 2023], Jun. 5, 2020, 44 pages.
Pfeuffer et al., "Gaze + Pinch Interaction in Virtual Reality", In Proceedings of SUI '17, Brighton, United Kingdom, Oct. 16-17, 2017, pp. 99-108.
Pfeuffer et al., "Gaze and Touch Interaction on Tablets", UIST '16, Tokyo, Japan, ACM, Oct. 16-19, 2016, pp. 301-311.
Corrected Notice of Allowability received for U.S. Appl. No. 17/932,999, mailed on Feb. 20, 2025, 2 pages.
Corrected Notice of Allowability received for U.S. Appl. No. 17/932,999, mailed on Jan. 23, 2025, 9 pages.
Corrected Notice of Allowability received for U.S. Appl. No. 18/174,337, mailed on Jan. 15, 2025, 2 pages.
Extended European Search Report received for European Patent Application No. 24178730.8, mailed on Oct. 14, 2024, 8 pages.
Extended European Search Report received for European Patent Application No. 24178752.2, mailed on Oct. 4, 2024, 8 pages.
Extended European Search Report received for European Patent Application No. 24190323.6, mailed on Dec. 12, 2024, 9 pages.
Final Office Action received for U.S. Appl. No. 17/580,495, mailed on Feb. 12, 2025, 29 pages.
Final Office Action received for U.S. Appl. No. 18/157,040, mailed on Dec. 2, 2024, 25 pages.
Final Office Action received for U.S. Patent Application No. 18/473,196, mailed on Dec. 6, 2024, 22 pages.
International Search Report received for PCT Application No. PCT/US2024/032451, mailed on Nov. 15, 2024, 6 pages.
International Search Report received for PCT Application No. PCT/US2024/032456, mailed on Nov. 14, 2024, 6 pages.
Restriction Requirement received for U.S. Patent Application No. 18/473, 187, mailed on Dec. 30, 2024, 5 pages.
International Search Report received for PCT Patent Application No. PCT/US2024/039190, mailed on Nov. 22, 2024, 5 pages.
Non-Final Office Action received for U.S. Appl. No. 18/149,640, mailed on Jan. 15, 2025, 17 pages.
Non-Final Office Action received for U.S. Appl. No. 18/375,280, mailed on Nov. 27, 2024, 17 pages.
Non-Final Office Action received for U.S. Appl. No. 18/645,292, mailed on Feb. 21, 2025, 39 pages.
Notice of Allowance received for U.S. Appl. No. 18/154,697, mailed on Dec. 3, 2024, 7 pages.
Notice of Allowance received for U.S. Appl. No. 18/154,757, mailed on Jan. 23, 2025, 12 pages.
Notice of Allowance received for U.S. Patent Application No. 18/174, 337, mailed on Jan. 2, 2025, 8 pages.
Notice of Allowance received for U.S. Appl. No. 18/336,770, mailed on Nov. 29, 2024, 9 pages.
Notice of Allowance received for U.S. Appl. No. 18/671,936, mailed on Jan. 15, 2025, 9 pages.
European Search Report received for European Patent Application No. 22703771.0, mailed on Feb. 26, 2025, 4 pages.
Extended European Search Report received for European Patent Application No. 24217335.9, mailed on Feb. 24, 2025, 8 pages.
International Search Report received for PCT Patent Application No. PCT/US2023/060592, mailed on Jun. 14, 2023, 7 pages.
Non-Final Office Action received for U.S. Appl. No. 18/153,943, mailed on Dec. 31, 2024, 33 pages.
Non-Final Office Action received for U.S. Appl. No. 18/298,994, mailed on Mar. 7, 2025, 26 pages.
Non-Final Office Action received for U.S. Appl. No. 18/473,196, mailed on Feb. 28, 2025, 20 pages.
Non-Final Office Action received for U.S. Appl. No. 18/988,115, mailed on Feb. 24, 2025, 40 pages.
Notice of Allowance received for U.S. Appl. No. 18/671,936, mailed on Mar. 5, 2025, 7 pages.
Macmostvideo, "A Beginner's Guide to Selecting Items On Your Mac (#1566)", Bibliographic Information, Jan. 4, 2018, Retrieved from <URL:https://www.youtube.com/watch?v=a6MDAuh7MOQ&ab_channel=macmostvideo/>, [retrieved on Feb. 19, 2025], Most relevant passage of the video is 00:10 to 00:30, 2 pages.

* cited by examiner

METHOD OF GROUPING USER INTERFACES IN AN ENVIRONMENT

CROSS-REFERENCE TO RELATED APPLICATIONS

This application is continuation of U.S. application Ser. No. 18/260,022, filed Jun. 29, 2023, which is a National Phase application under 35 U.S.C. § 371 of International Application No. PCT/US2021/065240, filed Dec. 27, 2021, which claims the priority benefit of U.S. Provisional Application No. 63/132,956, filed Dec. 31, 2020, the contents of which are hereby incorporated by reference in their entireties for all intended purposes.

FIELD OF THE DISCLOSURE

This relates generally to systems and methods for grouping user interfaces in a computer-generated environment.

BACKGROUND OF THE DISCLOSURE

Computer-generated environments are environments where at least some objects displayed for a user's viewing are generated using a computer. Users may interact with a computer-generated environment, such as by instantiating user interfaces of applications and displaying the user interfaces in the computer-generated environment.

SUMMARY OF THE DISCLOSURE

Some embodiments described in this disclosure are directed to methods of grouping user interfaces in a three-dimensional environment into containers. Some embodiments described in this disclosure are directed to methods of adding user interfaces to containers, moving user interfaces within containers, and removing user interfaces from containers. These interactions provide a more efficient and intuitive user experience. The full descriptions of the embodiments are provided in the Drawings and the Detailed Description, and it is understood that this Summary does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1:
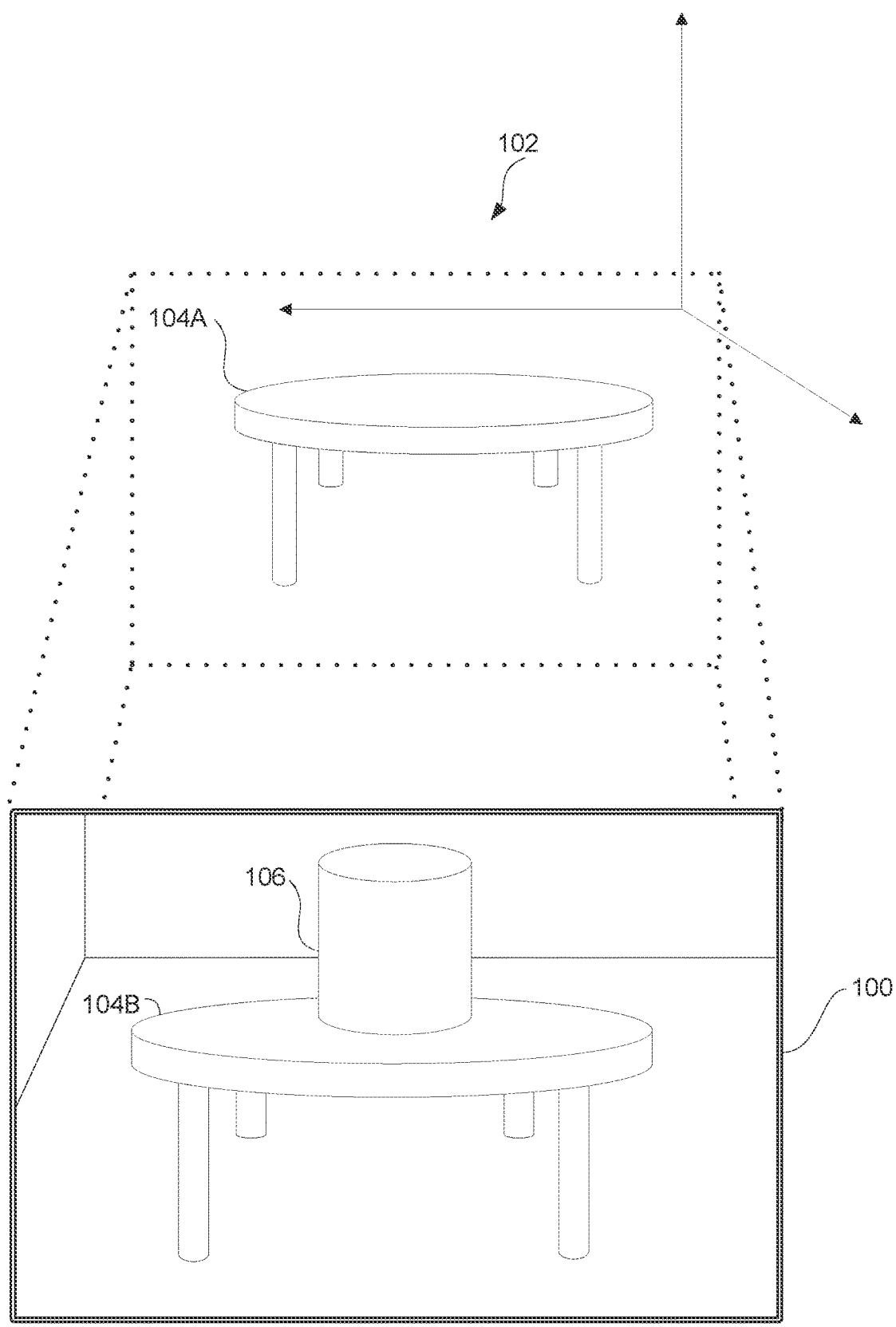
FIG. 1 illustrates an electronic device displaying a computer-generated environment according to some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments.

A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. An XR environment is often referred to herein as a computer-generated environment. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as μLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

FIG. 1 illustrates an electronic device 100 displaying a computer-generated environment (e.g., an XR environment) according to some embodiments of the disclosure. In some embodiments, electronic device 100 is a hand-held or mobile device, such as a tablet computer, laptop computer, smartphone, a wearable device, or head-mounted display. Examples of device 100 are described below with reference to the architecture block diagram of FIG. 2. As shown in FIG. 1, electronic device 100 and table 104A are located in the physical environment 102. In some embodiments, electronic device 100 may be configured to capture areas of physical environment 102 including table 104A (illustrated in the field of view of electronic device 100). In some embodiments, in response to a trigger, the electronic device 100 may be configured to display an object 106 in the computer-generated environment (e.g., represented by a cylinder illustrated in FIG. 1) that is not present in the physical environment 102 (e.g., a virtual object), but is displayed in the computer generated environment positioned on (e.g., anchored to) the top of a computer-generated representation 104B of real-world table 104A. For example, object 106 can be displayed on the surface of the computer-generated representation 104B of table 104A in the computer-generated environment displayed via device 100 in response to detecting the planar surface of table 104A in the physical environment 102. It should be understood that object 106 is a representative object and one or more different objects (e.g., of various dimensionality such as two-dimensional or three-dimensional objects) can be included and rendered in a three-dimensional computer-generated environment. For example, the object can represent an application or a user interface displayed in the computer-generated environment. In some examples, the application or user interface can include the display of selectable options for launching applications or for performing operations associated with applications. Additionally, it should be understood, that the three-dimensional (3D) environment (or 3D object) described herein may be a representation of a 3D environment (or three-dimensional object) displayed in a two dimensional (2D) context (e.g., displayed on a 2D screen).

Figure 2:
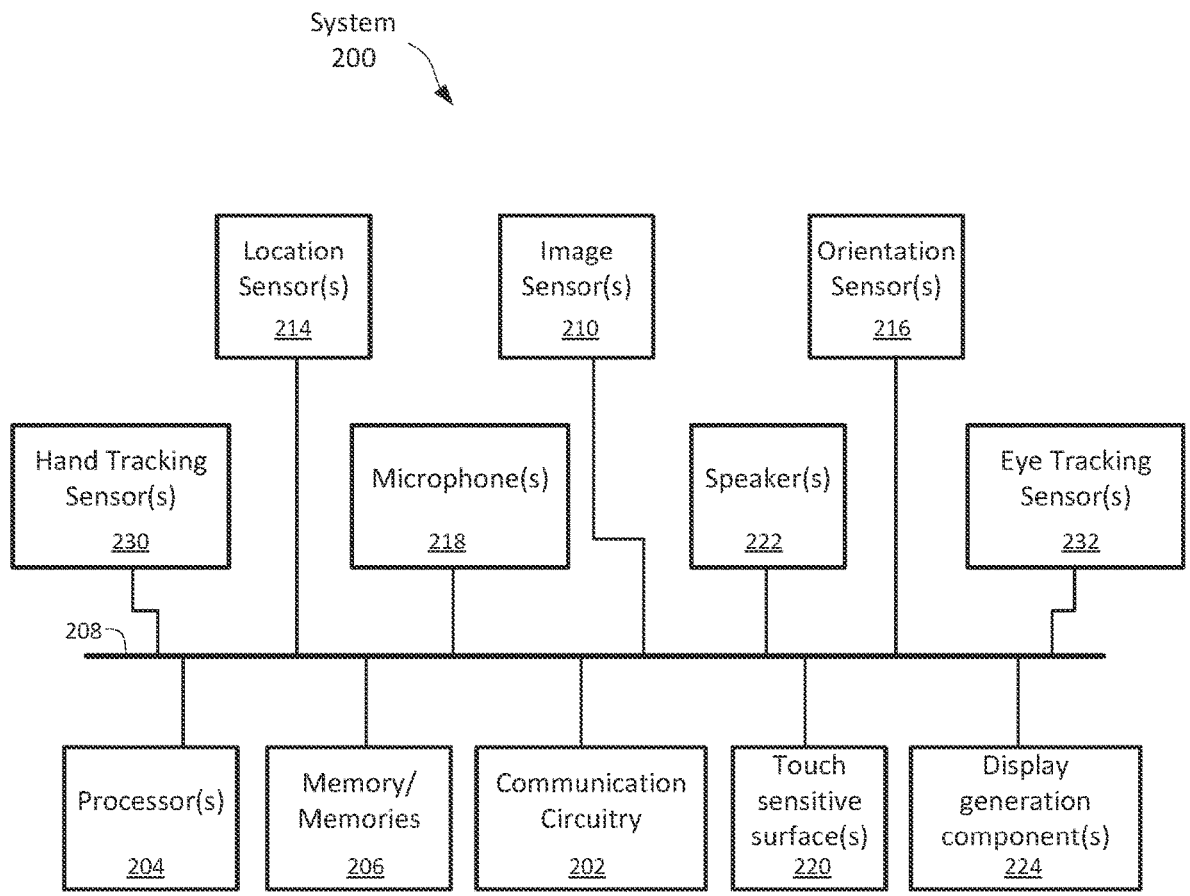
FIG. 2 illustrates a block diagram of an exemplary architecture for a system or device in accordance with some embodiments of the disclosure.

FIG. 2 illustrates a block diagram of an exemplary architecture for a system or device 200 in accordance with some embodiments of the disclosure. The blocks in FIG. 2 can represent an information processing apparatus for use in a device. It is understood that the components of system or device 200 are optionally distributed amongst two or more devices.

In some embodiments, device 200 is a mobile device, such as a mobile phone (e.g., smart phone or other portable communication device), a tablet computer, a laptop computer, a desktop computer, a television, a wearable device, a head-mounted display, an auxiliary device in communication with another device, etc. In some embodiments, device 200, as illustrated in FIG. 2, includes communication circuitry 202, processor(s) 204, memory 206, image sensor(s) 210, location sensor(s) 214, orientation sensor(s) 216, microphone(s) 218, touch-sensitive surface(s) 220, speaker(s) 222, display generation component(s) 224, hand tracking sensor(s) 230, and/or eye tracking sensor(s) 232, among other possible components. These components optionally communicate over communication bus(es) 208 of device 200.

Communication circuitry 202 optionally includes circuitry for communicating with electronic devices, networks, such as the Internet, intranets, a wired network and/or a wireless network, cellular networks and wireless local area networks (LANs). Communication circuitry 202 optionally includes circuitry for communicating using near-field communication (NFC) and/or short-range communication, such as Bluetooth®.

Processor(s) 204 optionally include one or more general processors, one or more graphics processors, and/or one or more digital signal processors. In some embodiments, memory 206 is a non-transitory computer-readable storage medium (e.g., flash memory, random access memory, or other volatile or non-volatile memory or storage) that stores one or more programs including instructions or computer-readable instructions configured to be executed by processor(s) 204 to perform the techniques, processes, and/or methods described below. In some embodiments, memory 206 can including more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some embodiments, the storage medium is a transitory computer-readable storage medium. In some embodiments, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

In some embodiments, display generation component(s) 224 include a single display (e.g., a liquid-crystal display (LCD), organic light-emitting diode (OLED), or other types of display). In some embodiments, display generation component(s) 224 includes multiple displays. In some embodiments, display generation component(s) 224 can include a display with touch capability (e.g., a touch screen), a projector, a holographic projector, a retinal projector, etc. In some embodiments, device 200 includes touch-sensitive surface(s) 220 for receiving user inputs, such as tap inputs and swipe inputs or other gestures. In some embodiments, display generation component(s) 224 and touch-sensitive surface(s) 220 form touch-sensitive display(s) (e.g., a touch screen integrated with device 200 or external to device 200 that is in communication with device 200).

Image sensors(s) 210 optionally include one or more visible light image sensor, such as charged coupled device (CCD) sensors, and/or complementary metal-oxide-semiconductor (CMOS) sensors operable to obtain images of physical objects from the real-world environment. Image sensor(s) 210 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 210 also optionally include one or more cameras configured to capture movement of physical objects in the real-world environment. Image sensor(s) 210 also optionally include one or more depth sensors configured to detect the distance of physical objects from device 200. In some embodiments, information from one or more depth sensors can allow the device to identify and differentiate objects in the real-world environment from other objects in the real-world environment. In some embodiments, one or more depth sensors can allow the device to determine the texture and/or topography of objects in the real-world environment. In some embodiments, device 200 uses CCD sensors, event cameras, and depth sensors in combination to detect the physical environment around device 200. In some embodiments, image sensor(s) 210 include a first image sensor and a second image sensor. The first image sensor and the second image sensor work in tandem and are optionally configured to capture different information of physical objects in the real-world environment. In some embodiments, the first image sensor is a visible light image sensor and the second image sensor is a depth sensor. In some embodiments, device 200 uses image sensor(s) 210 to detect the position and orientation of device 200 and/or display generation component(s) 224 in the real-world environment. For example, device 200 uses image sensor(s) 210 to track the position and orientation of display generation component(s) 224 relative to one or more fixed objects in the real-world environment.

Device 200 optionally uses microphone(s) 218 or other audio sensors to detect sound from the user and/or the real-world environment of the user. In some embodiments, microphone(s) 218 includes an array of microphones (a plurality of microphones) that optionally operate in tandem, such as to identify ambient noise or to locate the source of sound in space of the real-world environment. In some embodiments, audio or voice inputs can be used to interact with the user interface or computer-generated environment captured by one or more microphones (e.g., audio sensors).

Device 200 optionally includes location sensor(s) 214 for detecting a location of device 200 and/or display generation component(s) 224. For example, location sensor(s) 214 can include a GPS receiver that receives data from one or more satellites and allows device 200 to determine the device's absolute position in the physical world. Device 200 optionally includes orientation sensor(s) 216 for detecting orientation and/or movement of device 200 and/or display generation component(s) 224. For example, device 200 uses orientation sensor(s) 216 to track changes in the position and/or orientation of device 200 and/or display generation component(s) 224, such as with respect to physical objects in the real-world environment. Orientation sensor(s) 216 optionally include one or more gyroscopes and/or one or more accelerometers.

Device 200 includes hand tracking sensor(s) 230 and/or eye tracking sensor(s) 232, in some embodiments. Hand tracking sensor(s) 230 are configured to track the position/location of one or more portions of the user's hands, and/or motions of one or more portions of the user's hands with respect to the computer-generated environment, relative to the display generation component(s) 224, and/or relative to another defined coordinate system. Eye tracking sensor(s) 232 are configured to track the position and movement of a user's gaze (eyes, face, or head, more generally) with respect to the real-world or computer-generated environment and/or relative to the display generation component(s) 224. In some embodiments, hand tracking sensor(s) 230 and/or eye tracking sensor(s) 232 are implemented together with the display generation component(s) 224. In some embodiments, the hand tracking sensor(s) 230 can use image sensor(s) 210 (e.g., one or more IR cameras, 3D cameras, depth cameras, etc.) that capture three-dimensional information from the real-world including one or more hands (e.g., of a human user). In some examples, the hands can be resolved with sufficient resolution to distinguish fingers and their respective positions. In some embodiments, one or more image sensor(s) 210 are positioned relative to the user to define a field of view of the image sensor(s) and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures) can be advantageous in that it does not require the user to touch, hold or wear any sort of beacon, sensor, or other marker. In some embodiments, eye tracking sensor(s) 232 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some embodiments, both eyes are tracked separately by respective eye tracking cameras and illumination sources, and a focus/gaze can be determined from tracking both eyes. In some embodiments, one eye (e.g., a dominant eye) is tracked by a respective eye tracking camera/illumination source(s). In some embodiments, eye tracking sensor(s) 232 can use image sensor(s) 210 (e.g., one or more IR cameras, 3D cameras, depth cameras, etc.).

Device 200 is not limited to the components and configuration of FIG. 2, but can include fewer, other, or additional components in multiple configurations. A person using device 200 is optionally referred to herein as a user of the device.

As described herein, a computer-generated environment including various graphics user interfaces ("GUIs") may be displayed using an electronic device, such as electronic device 100 or device 200, including one or more display generation components. The computer-generated environment can include one or more GUIs associated with an application. Device 100 or device 200 may supports a variety of applications, such as productivity applications (e.g., a presentation application, a word processing application, a spreadsheet application, etc.), a gaming application, a telephone application, a video conferencing application, an e-mail application, an instant messaging application, a web browsing application, etc.

In some embodiments, locations in a computer-generated environment (e.g., a three-dimensional environment, an XR environment, etc.) optionally have corresponding locations in the physical environment. Thus, when a device is described as displaying a virtual object at a respective location with respect to a physical object (e.g., such as a location at or near the hand of the user, or at or near a physical table), the device displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment can interact with virtual objects that exist only in the three-dimensional environment. For example, a three-dimensional environment can include a table and a user interface located in front of the table, with the table being a view of (or a representation of) a physical table in the physical environment, and the user interface being a virtual object.

Similarly, a user is optionally able to interact with virtual objects in the three-dimensional environment (e.g., such as user interfaces of applications running on the device) using one or more hands as if the virtual objects were real objects in the physical environment. For example, as described above, one or more sensors of the device optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment (e.g., grabbing, moving, touching, pointing at virtual objects, etc.) as if they were real physical objects in the physical environment. In some embodiments, a user is able to move his or her hands to cause the representations of the hands in the three-dimensional environment to move in conjunction with the movement of the user's hand.

In some of the embodiments described below, the device is optionally able to determine the "effective" distance between physical objects in the physical world and virtual objects in the three-dimensional environment, for example, for the purpose of determining whether a physical object is interacting with a virtual object (e.g., whether a hand is touching, grabbing, holding, etc. a virtual object or within a threshold distance from a virtual object). For example, the device determines the distance between the hands of the user and virtual objects when determining whether the user is interacting with virtual objects and/or how the user is interacting with virtual objects. In some embodiments, the device determines the distance between the hands of the user and a virtual object by determining the distance between the location of the hands in the three-dimensional environment and the location of the virtual object of interest in the three-dimensional environment. For example, the one or more hands of the user can be located at a particular position in the physical world, which the device optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared against the position of the virtual object of interest in the three-dimensional environment to determine the distance between the one or more hands of the user and the virtual object. In some embodiments, the device optionally determines a distance between a physical object and a virtual object by comparing positions in the physical world (e.g., as opposed to comparing positions in the three-dimensional environment). For example, when determining the distance between one or more hands of the user and a virtual object, the device optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the device optionally performs any of the techniques described above to map the location of the physical object to the three-dimensional environment and/or map the location of the virtual object to the physical world.

In some embodiments, the same or similar technique is used to determine where and what the gaze of the user is directed to. For example, if the gaze of the user is directed to a particular position in the physical environment, the device optionally determines the corresponding position in the three-dimensional environment and if a virtual object is located at that corresponding virtual position, the device optionally determines that the gaze of the user is directed to that virtual object.

Similarly, the embodiments described herein may refer to the location of the user (e.g., the user of the device) and/or the location of the device in the three-dimensional environment. In some embodiments, the user of the device is holding, wearing, or otherwise located at or near the electronic device. Thus, in some embodiments, the location of the device is used as a proxy for the location of the user. In some embodiments, the location of the device and/or user in the physical environment corresponds to a respective location in the three-dimensional environment. In some embodiments, the respective location is the location from which the "camera" or "view" of the three-dimensional environment extends. For example, the location of the device would be the location in the physical environment (and its corresponding location in the three-dimensional environment) from which, if a user were to stand at that location facing the respective portion of the physical environment displayed by the display generation component, the user would see the objects in the physical environment in the same position, orientation, and/or size as they are displayed by the display generation component of the device (e.g., in absolute terms and/or relative to each other). Similarly, if the virtual objects displayed in the three-dimensional environment were physical objects in the physical environment (e.g., placed at the same location in the physical environment as they are in the three-dimensional environment, and having the same size and orientation in the physical environment as in the three-dimensional environment), the location of the device and/or user is the position at which the user would see the virtual objects in the physical environment in the same position, orientation, and/or size as they are displayed by the display generation component of the device (e.g., in absolute terms and/or relative to each other and the real world objects).

Some embodiments described herein may refer to selection inputs as either discrete inputs or as continuous inputs. For example, a selection input can correspond to a single selection input or a selection input can be held (e.g., maintained) while performing one or more other gestures or inputs. In some embodiments, a selection input can have an initiation stage, a holding stage, and a termination stage. For example, in some embodiments, a pinch gesture by a hand of the user can be interpreted as a selection input. In this example, the motion of the hand into a pinch position can be referred to as the initiation stage and the device is able to detect that the user has initiated a selection input. The holding stage refers to the stage at which the hand maintains the pinch position. Lastly, the termination stage refers to the motion of the hand terminating the pinch position (e.g., releasing the pinch). In some embodiments, if the holding stage is less than a predetermined threshold amount of time (e.g., less than 0.1 seconds, 0.3 seconds, 0.5 seconds, 1 second, 2 seconds, etc.), then the selection input is interpreted as a discrete selection input (e.g., a single event actuating a respective user interface element), such as a mouse click-and-release, a keyboard button press-and-release, etc. In such embodiments, the electronic device optionally reacts to the discrete selection event (e.g., optionally after detecting the termination). In some embodiments, if the holding stage is more than the predetermined threshold amount of time, then the selection input is interpreted as a select-and-hold input, such as a mouse click-and-hold, a keyboard button press-and-hold, etc. In such embodiments, the electronic device can react to not only the initiation of the selection input (e.g., initiation stage), but also to any gestures or events detected during the holding stage (e.g., such as the movement of the hand that is performing the selection gesture), and/or the termination of the selection input (e.g., termination stage).

Figure 3A:
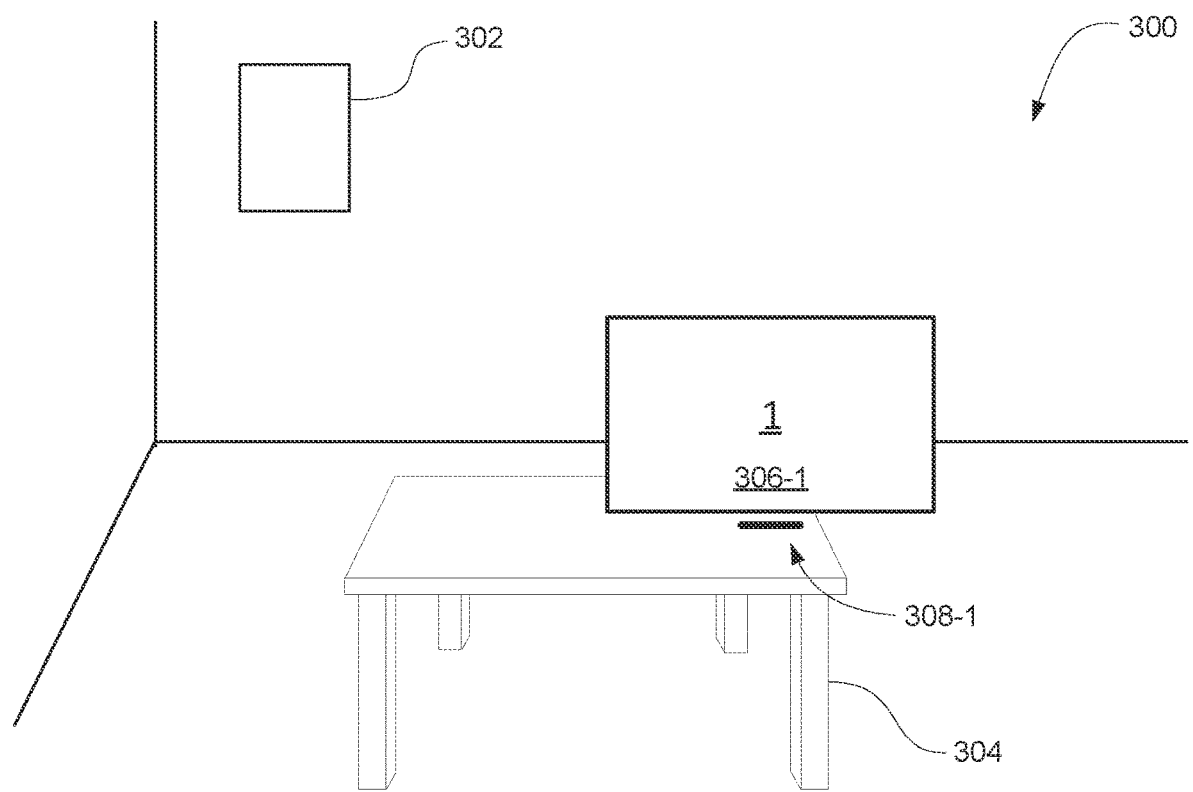
FIGS. 3A-3C illustrate a method of adding a user interface to a container in a three-dimensional environment according to some embodiments of the disclosure.
Figure 3B:
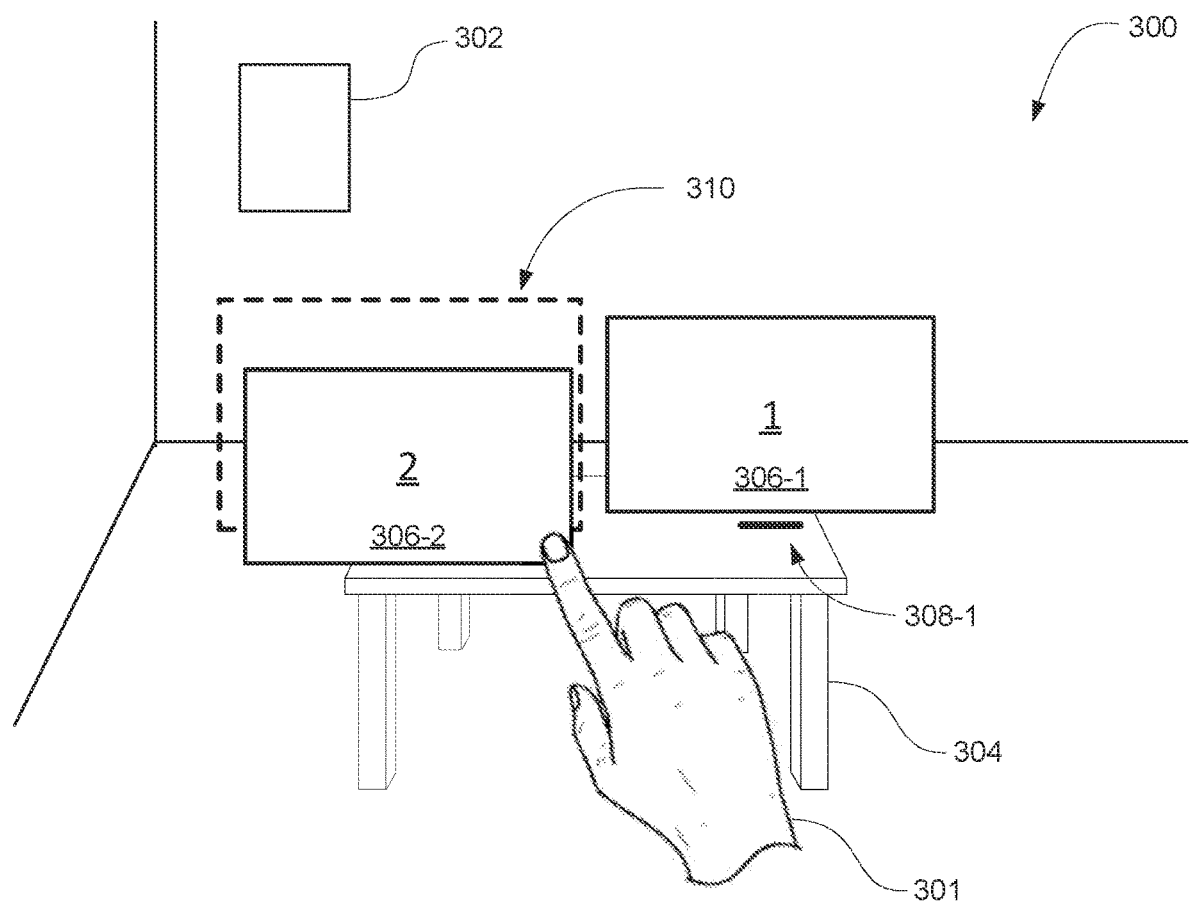
Figure 3C:
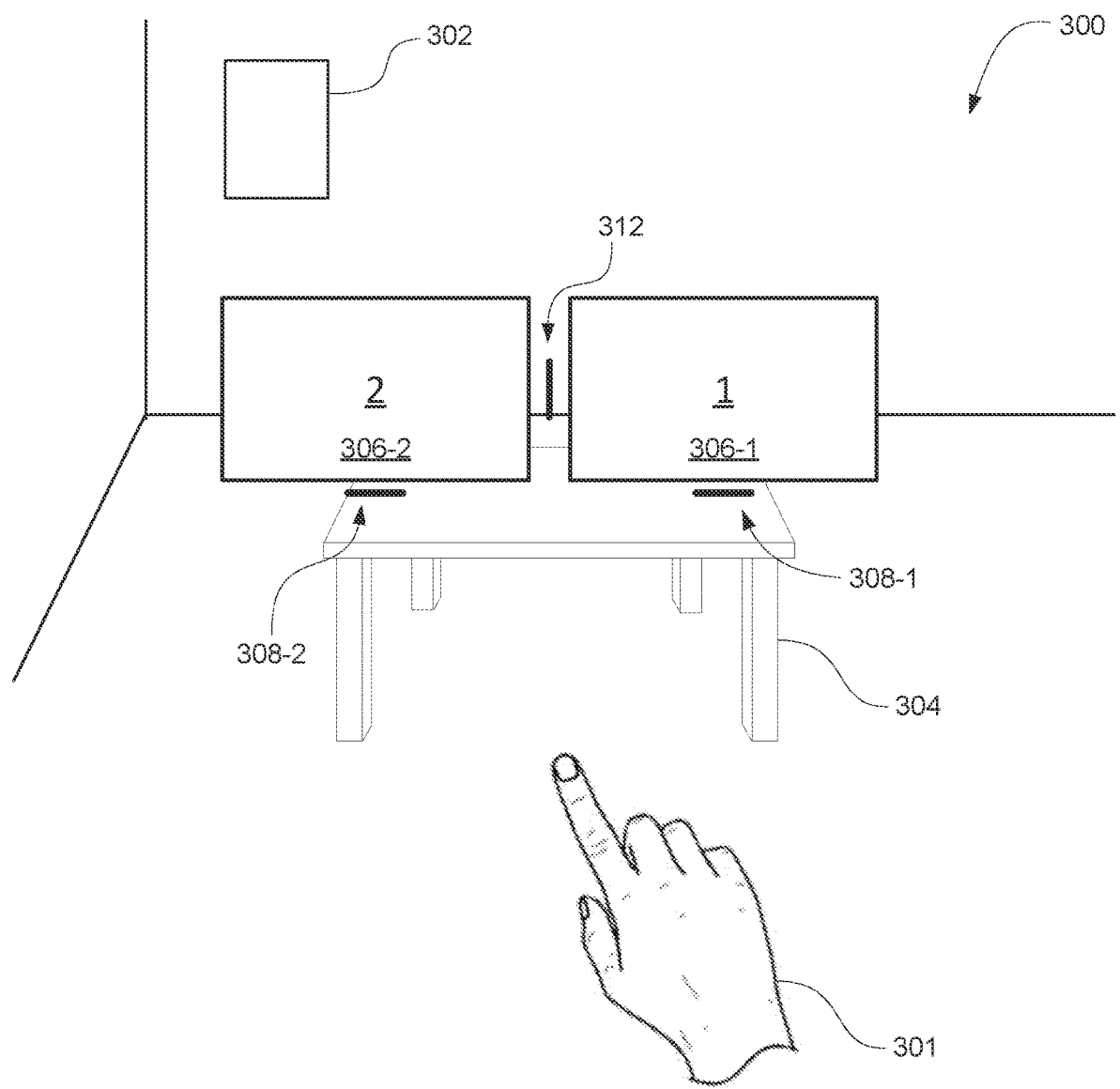

FIGS. 3A-3C illustrate a method of adding a user interface to a container in a three-dimensional environment 300 according to some embodiments of the disclosure. FIG. 3A illustrates three-dimensional environment 300 (e.g., a computer generated environment, an extended reality environment) that is being displayed by a display generation component of an electronic device (e.g., such as electronic device 100 and/or device 200 described above with respect to FIG. 1 and FIG. 2).

In some embodiments, three-dimensional environment 300 includes one or more real-world objects (e.g., representations of objects in the physical environment around the device) and/or one or more virtual objects (e.g., representations of objects generated and displayed by the device that are not necessarily based on real world objects in the physical environment around the device). For example, in FIG. 3A, table 304 and picture frame 302 can both be representations of real world objects in the physical environment around the device. In some embodiments, table 304 and picture frame 302 are displayed by the display generation component by capturing one or more images of table 304 and picture frame 302 (e.g., using one or more sensors of the electronic device) and displaying a representation of the table and picture frame (e.g., a photorealistic representation, a simplified representation, a caricature, etc.), respectively, in the three-dimensional environment. In some embodiments, table 304 and picture frame 302 are passively provided by the device via a transparent or translucent display (e.g., by not obscuring the user's view of table 304 and picture frame 302, thus allowing table 304 and picture frame 302 to be visible to the user through the transparent or translucent display).

In FIG. 3A, three-dimensional environment 300 includes user interface 306-1. In some embodiments, user interface 306-1 is a virtual object, for example, that exists in the three-dimensional environment but not in the real world environment around the device. In some embodiments, user interface 306 is a user interface for an application that is installed and running on the electronic device (e.g., a map application, a chat application, a browser application, etc.). In some embodiments, a respective application can have one user interface or a plurality of user interfaces in three-dimensional environment 300 (e.g., as opposed to only one user interface). In some embodiments, user interface 306-1 is planar (e.g., a flat surface). In some embodiments, user interface 306-1 is non-planar. For example, user interface 306-1 can be curved (e.g., curved along the horizontal axis, curved along the vertical axis), optionally with a curvature such that user interface 306-1 wraps around the user.

In some embodiments, user interfaces in a container have sizes and/or shapes based on the characteristics of the respective user interface and/or respective application. For example, if a first user interface in a container is associated with a first application and a second user interface in the container is associated with a second application, the size and shape of the first user interface is determined based on the design and requirements of the first application and the size and shape of the second user interface is determined based on the design and requirements of the second application. In some embodiments, whether a user interface is a member of a container (e.g., as opposed to not being a member of a container) does not affect the size and shape of a respective user interface. In some embodiments, a user is able to resize user interface in a container. In some embodiments, different user interfaces in three-dimensional environment 300 can have different sizes, shapes, and/or orientations (e.g., portrait vs. landscape).

In some embodiments, a container can impose size and shape restrictions on the user interfaces in the container, optionally to ensure a consistent look and feel. For example, a container can require that user interfaces in the container be less than a maximum height, be less than a maximum width, and/or have an aspect ratio within a predetermined range. It is understood that the sizes and shapes of the user interfaces illustrated herein are merely exemplary and not limiting.

In some embodiments, user interfaces in three-dimensional environment 300 are accompanied with one or more manipulation affordances. For example, in FIG. 3A, user interface 306-1 is displayed with affordance 308-1. In some embodiments, affordance 308-1 is a horizontal line that is displayed below and centered with user interface 306-1. It is understood that affordance 308-1 can be any size or shape and be located at any location in three-dimensional environment 300 associated with user interface 306-1. In some embodiments, affordance 308-1 is always displayed concurrently with user interface 306-1. In some embodiments, affordance 308-1 is hidden from display until or unless one or more criteria have been satisfied. For example, if the gaze of the user is directed at user interface 306-1 (or within a threshold distance from user interface 306-1, such as 1 inch, 3 inches, 6 inches, etc.) and/or if he gaze of the user is directed at the location of affordance 308-1 (or within a threshold distance from affordance 308-1, such as 1 inch, 3 inches, 6 inches, etc.), then affordance 308-1 is optionally displayed (e.g., no longer hidden). In some embodiments, if the user reaches out with a hand towards user interface 306-1 (e.g., reaches to within a threshold distance of user interface 306-1, such as 1 inch, 3 inches, 6 inches, etc.) and/or towards the location of affordance 308-1 (e.g., reaches to within a threshold distance of affordance 308-1, such as 1 inch, 3 inches, 6 inches, etc.) and/or reaches out and/or assumes a predetermined ready position while the gaze of the user is directed to user interface 306-1 and/or the location of affordance 308-1, then affordance 308-1 is optionally displayed. Thus, in some embodiments, affordance 308-1 is hidden from display until the user indicates an interest in user interface 306-1 and/or affordance 308-1 (e.g., indicates an interest in interacting with user interface 306-1 and/or affordance 308-1).

In some embodiments, affordance 308-1 is not displayed (e.g., is hidden) if the focus of the user is not directed at the user interface 306-1. In some embodiments, affordance 308-1 is always displayed (e.g., without regard to whether the focus is on user interface 306-1).

In some embodiments, affordance 308-1 can be manipulated by the user to perform one or more manipulation operations on user interface 306-1. For example, a user is able to use a hand to perform one or more gestures directed to affordance 308-1 to interact with affordance 308-1. In some embodiments, the user is able to perform a selection gesture with a hand (e.g., a pinch and release gesture, a tap gesture, etc.) to actuate affordance 308-1, which optionally causes display of one or more options to perform one or more functions with respect to user interface 306-1, such as to close, resize, move, etc. user interface 306-1. In some embodiments, the user is able to perform a selection gesture with a hand and while maintaining the selection gesture (e.g., a pinch-and-hold gesture, a pointing gesture with one or more fingers while maintaining the extended position of the one or more fingers, etc.), move the hand to cause affordance 308-1 and user interface 306-1 to move around in three-dimensional environment 300 in accordance with the movement of the hand (e.g., a drag-and-drop operation). In some embodiments, a selection gesture can include a forward pointing gesture with a finger of a hand pointing at affordance 308-1 (e.g., a forward and/or upward movement by the hand and/or an extension of one or more fingers towards affordance 308-1), a tap gesture with a finger of the hand (e.g., a forward movement by a finger of the hand towards affordance 308-1 such that the finger touches affordance 308-1 or approaches within a threshold distance of affordance 308-1), a pinch gesture by two or more fingers of the hand (e.g., a pinch by a thumb and forefinger of the hand at a location associated with affordance 308-1 such that it appears as if the user is pinching affordance 308-1), or any other suitable gesture indicative of the user's interest in affordance 308-1.

In FIG. 3B, a respective gesture is detected from hand 301 (e.g., a hand of the user of the device) causing user interface 306-2 to be displayed in three-dimensional environment 300. In some embodiments, hand 301 is a representation of a hand of the user that is optionally detected and/or captured by one or more sensors of the device and is displayed in three-dimensional environment 300 (e.g., a photorealistic depiction, a simplified representation, a caricature, etc.). In some embodiments, the position, orientation, and/or pose of hand 301 is based on the position, orientation, and/or pose of the hand of the user of which it is a representation. For example, in FIG. 3B, hand 301 is a representation of the right hand of the user of the device and hand 301 is performing a pointing gesture optionally because the right hand of the user is performing a similar pointing gesture.

In some embodiments, the detected gesture includes a selection gesture on a representation of an application (e.g., selection of an application icon from a buffet of applications that are installed on the device and able to be executed, launched and/or otherwise displayed in three-dimensional environment 300). In some embodiments, the gesture optionally includes a selection gesture and a movement by hand 301 moving a user interface associated with the application to be launched to the desired location in three-dimensional environment 300 (e.g., a drag-and-drop gesture). For example, in some embodiments, in response to selecting an application icon, a representation of a user interface associated with the selected application (e.g., such as user interface 306-2) is displayed at or near the location of the user's selection (e.g., the application icon turns into and/or morphs into a representation of a user interface), and while displaying the representation of the user interface, the user is able to move hand 301 while maintaining the selection gesture to move the representation of the user interface to different locations in three-dimensional environment 300 (e.g., dragging the representation of the user interface).

In some embodiments, in response to detecting the termination of the selection gesture, user interface 306-2 is displayed where the representation of user interface 306-2 was located when the termination of the selection gesture was detected, as will be described in further detail below with respect to FIG. 3C. In some embodiments, in response to detecting that user interface 306-2 has been moved to within a threshold distance (e.g., within 1 inch, 3 inches, 6 inches, 1 foot, etc.) of a respective location relative to user interface 306-1, the electronic device displays outline 310, as shown in FIG. 3B.

In some embodiments, three-dimensional environment 300 has one or more predetermined positions at which user interfaces can be displayed and/or placed. In such embodiments, when a user interface (or representation of a user interface, as the case may be) is moved to within the threshold distance of the one or more predetermined positions (e.g., within 1 inch, 3 inches, 6 inches, 1 foot, etc. from the predetermined position), an outline (e.g., such as outline 310) is displayed at the respective predetermined position to indicate that the user interface can be and/or will be placed at the respective predetermined position in response to the release of the selection input. In some embodiments, if the user interface is not within the threshold distance from the predetermined location, outline 310 is not displayed in three-dimensional environment 300.

In some embodiments, while outline 310 is displayed, if user interface 306-2 is moved to more than the threshold distance from the respective location (e.g., moved away from the respective location), then outline 310 is optionally ceased to be displayed. In some embodiments, the threshold distance at which outline 310 ceases to be displayed is more than (e.g., 1 inch more, 3 inches more, 6 inches more, etc.) the threshold distance at which 310 begins to be displayed (e.g., a hysteresis effect). Implementing a hysteresis effect prevents outline 310 from flickering in and out of display if, for example, user interface 306-2 is at or near the threshold distance at which outline 310 begins to be displayed.

In some embodiments, the one or more predetermined positions can be based on the location of objects in three-dimensional environment 300, such as tables, walls, and/or other user interfaces. For example, three-dimensional environment 300 can impose rules to prevent user interfaces from conflicting with other user interfaces by setting the predetermined positions based on distance from existing user interfaces (e.g., optionally taking into account the size and/or shape of the existing user interfaces and/or the user interface to be placed). For example, three-dimensional environment 300 can require a buffer between user interfaces (e.g., a 3 inch, 6 inch, 1 foot, 3 feet, etc. buffer). Thus, a respective predetermined position can be located to the left, right, above, or below an existing user interface, but optionally cannot be located at a location that causes the obscuring of either the existing user interface or the user interface being placed.

In some embodiments, the one or more predetermined positions can be based on acceptable locations and/or positions for user interfaces in a container (e.g., a set of user interfaces that move together in response to movement inputs). In some embodiments, a container is optionally an organizational element (e.g., a user interface element, a software element, a software construct, etc.) that includes a set of user interfaces (e.g., one or more, a plurality, etc.) that have been grouped together (e.g., a set of user interfaces, a workspace, etc.). In some embodiments, user interfaces that are grouped together in a container share certain characteristics, properties, and/or behaviors with each other. For example, user interfaces in a container optionally are automatically aligned with each other (e.g., aligned horizontally and/or aligned vertically, etc.), maintain a predetermined amount of separation from each other, and/or maintain the same distance from the user as the other user interfaces in the same container. For example, if a first user interface in a container is moved around in three-dimensional environment 300 (e.g., in response to a user input, for example), then the other user interfaces in the same container are optionally also moved around in three-dimensional environment 300 to maintain the same position relative to each other (e.g., the user interfaces move together as a single unit).

Thus, user interfaces in a container can be arranged according to a predetermined criteria. For example, user interfaces in a container can be aligned horizontally and have a fixed spacing between each user interface. Thus, acceptable locations for user interfaces in a container can be a location to the left of the left-most user interface in the container (e.g., separated from the left-most user interface by a predetermined spacing, such as 1 inch, 3 inches, 6 inches, 1 foot, etc.), a location to the right of the right-most user interface in the container (e.g., separated from the right-most user interface by a predetermined spacing, such as 1 inch, 3 inches, 6 inches, 1 foot, etc.), and/or a location between two user interfaces (e.g., separated from each adjacent user interface by a predetermined spacing, such as 1 inch, 3 inches, 6 inches, 1 foot, etc.). In some embodiments, the predetermined locations for a container are locations that, when a user interface is placed and/or snapped to a respective predetermined locations for the container, the user interface is added to the container at the respective predetermined location (optionally causing the existing user interfaces to adjust positions to allow the user interface being added to be added at the respective location), as will be discussed in further detail below. Thus, if a respective user interface is moved to within a threshold distance from these predetermined locations in a container (e.g., 1 inch, 3 inches, 6 inches, 1 foot, 3 feet, etc.), an outline can be displayed indicating that the respective user interface will be added to the container and placed at the location indicated by the outline. In some embodiments, the predetermined locations in a container are based on the size and/or shape of the user interface being added. For example, if user interface 306-2 has a width of 1 foot, then a respective predetermined location can be 6 inches to the left or right of user interface 306-1, optionally including a spacing margin (e.g., a predetermined spacing between user interfaces, such as 1 inch, 3 inches, 6 inches, etc.). Setting the respective predetermined location at least 6 inches to the left or right of user interface 306-1 prevents overlap between user interface 306-1 and user interface 306-2 (e.g., prevents one user interface from obscuring the other). Thus, in some embodiments, the predetermined locations in a container can dynamically be updated and/or adjusted based on the size and/or shape of the existing user interfaces and/or the size and/or shape of the user interfaces being added.

In some embodiments, outline 310 is only displayed for predetermined location associated with containers and not displayed for predetermined locations that are not associated with containers (e.g., locations that do not cause the user interface to be added to the container). In some embodiments, outline 310 is displayed for predetermined locations without regard to whether they are associated or not associated with containers.

In some embodiments, the threshold distance at which outline 310 is displayed can be the same threshold distance at which user interface 306-2 will snap to the location indicated by outline 310. For example, outline 310 is displayed when user interface 306-2 reaches a position such that the release of the selection gesture will cause user interface 306-2 to "snap" to the respective location indicated by outline 310.

In some embodiments, outline 310 is based on user interface 306-2 and has the same size and/or shape as user interface 306-2. In some embodiments, outline 310 has the same shape, but has a larger size than user interface 306-2 (e.g., 5% larger, 10% larger, 20% larger, etc.). In some embodiments, outline 310 provides a preview how user interface 306-2 will look once placed at the respective location (e.g., a preview of the boundary of user interface 306-2, a preview of the area which will be occupied by user interface 306-2, etc.).

In some embodiments, the display of outline 310 indicates that the release of the selection gesture will cause user interface 306-2 to be placed at (e.g., snapped to) the respective location indicated by outline 310. In some embodiment, outline 310 is displayed if the release of the selection gesture will cause user interface 306-2 to be added to a container that includes user interface 306-1 (as will be described in further detail below with respect to FIG. 3C) and the display of outline 310 indicates that the release of the selection gesture will cause user interface 306-2 to be added to a container that includes user interface 306-1. In some embodiments, if outline 310 was not displayed when the selection gesture was released, the device does not snap user interface 306-2 to the location indicated by outline 310 (e.g., and optionally does not cause user interface 306-2 to be added to a container that includes user interface 306-1) and optionally either places user interface 306-2 at the location where the user dragged it or ceases display of user interface 306-2 (e.g., cancels the launching of the application associated with user interface 306-2).

In some embodiments, if the user moves user interface 306-2 to a position such that outline 310 is displayed (e.g., as described above) and while outline 310 is displayed, if user interface 306-2 hovers at or near that respective location (e.g., user interface 306-2 moves by less than 1 inch, 3 inches, 6 inches, etc.) for more than a threshold amount of time (e.g., 1 second, 3 seconds, 5 seconds, etc.), then an animation is optionally displayed moving user interface 306-2 into the location indicated by outline 310 (e.g., the location that user interface 306-2 will be displayed upon detection of the release of the selection input) (e.g., without requiring a movement by hand 301 moving user interface 306-2 to that location). For example, an animation is displayed of user interface 306-2 sliding into position, thus providing a further visual indication that the release of the selection gesture will cause user interface 306-2 to be placed at the respective location indicated by outline 310.

In FIG. 3C, the device detects the termination of the selection gesture by hand 301 (e.g., the release of the selection gesture by hand 301) when user interface 306-2 is at the location shown in FIG. 3B and/or while outline 310 is displayed in three-dimensional environment 300. In some embodiments, a termination of a selection gesture by hand 301 can include the release of a pinch gesture performed by two or more fingers of hand 601, the retraction of a pointing gesture performed by a finger of hand 601, the retraction of hand 601, a gesture by hand 601 that includes the termination of the initial selection gesture, etc.

In some embodiments, in response to detecting the termination of the selection gesture by hand 301, the application associated with user interface 306-2 is launched (e.g., if the application was not already running) and user interface 306-2 is displayed (e.g., placed) at the respective location indicated by outline 310 (e.g., snapped to the location around which outline 310 was displayed), as shown in FIG. 3C. In some embodiments, outline 310 ceases to be displayed in response to user interface 306-2 snapping to the respective location (e.g., in response to detecting the termination of the selection gesture). In some embodiments, if the application associated with user interface 306-2 is already running (e.g., as an inactive process, a background process, a minimized application, etc.), then the application is optionally activated (e.g., made into an active process) when user interface 306-2 is displayed at the respective location indicated by outline 310 and/or a second instance of the application is launched.

In some embodiments, in response to detecting the termination of the selection gesture by hand 301, user interface 306-1 is added to a container that includes user interface 306-1. For example, in FIG. 3B, outline 310 optionally is associated with a container (e.g., is associated with a predetermined location for a container) and indicates that upon release of the selection gesture, user interface 306-2 will be added to a container that includes user interface 306-1. In some embodiments, user interface 306-1 is added to a container that includes user interface 306-1 if three-dimensional environment 300 includes an existing container that includes user interface 306-1. In some embodiments, user interface 306-1 is added to a container that includes user interface 306-1 even if three-dimensional environment 300 does not include an existing container and/or user interface 306-1 is not a member of a container.

In some embodiments, if three-dimensional environment 300 already includes a container and user interface 306-1 is already a member of that container, then in response to detecting the termination of the selection gesture by hand 301 when user interface 306-2 is within the threshold distance of the respective location to the left of user interface 306-1, user interface 306-2 is added to the existing container to the left of user interface 306-1, as shown in FIG. 3C. In some embodiments, if three-dimensional environment 300 does not already include a container and user interface 306-1 is not a member of any container, then in response to detecting the termination of the selection gesture by hand 301 when user interface 306-2 is within the threshold distance of the respective location to the left of user interface 306-1, a container is created and user interface 306-1 and user interface 306-2 are added to the newly created container as adjacent user interfaces, as shown in FIG. 3C.

In some embodiments, three-dimensional environment 300 can include one or more containers, each of which including one or more user interfaces. In some embodiments, three-dimensional environment 300 can include a maximum of one container. In some embodiments, three-dimensional environment 300 can include no containers. In some embodiments, a container can contain one or more user interfaces. In some embodiments, a container must include at least two or more user interfaces and a container cannot be created with just one user interface. In such embodiments, removing the second-to-last user interface from the container automatically disbands the container (e.g., while maintaining display of the last user interface, which is now no longer a member of a container). In some embodiments, three-dimensional environment 300 can include user interfaces that are part of containers (e.g., which optionally move as a group, in accordance with the behavioral rules of the container) and user interfaces that are not part of containers (e.g., which are able to move freely, without being constrained by the behavioral rules of the container). For example, not every user interface in three-dimensional environment 300 must be a member of a container if a container exists. In some embodiments, if a container exists in three-dimensional environment 300, all user interfaces in three-dimensional environment 300 must be a member of that container or another container (e.g., must be a member of some container). In some embodiments, a user interface cannot be a member of more than one container. In some embodiments, a respective user interface can be a member of multiple containers (e.g., which optionally causes the user interfaces in the multiple containers of which the respective user interface is a member to be indirectly associated with each other).

Thus, as described above, in response to detecting a user moving a user interface (e.g., either a representation of a user interface that was previously an icon of an application, or a user interface from another location in three-dimensional environment 300, as will be described in further detail below with respect to FIGS. 6A-6D) to within a threshold distance of a location at which the user interface would be added to a container with an existing user interface (e.g., to within a threshold of a position that is to the left, right, above, or below the existing user interface), the electronic device displays an outline (or any other suitable indication) that indicates that releasing the selection input (e.g., placing the user interface at that position) will cause the user interface to be added to a container that includes the existing user interface (e.g., either added to an existing container that includes the existing user interface and optionally other user interfaces, or a new container is created to include the existing user interface and the user interface being placed).

As shown in FIG. 3C, in some embodiments, if three-dimensional environment 300 includes a container that includes one or more user interfaces, such as user interface 306-1 and user interface 306-2, then three-dimensional environment 300 can include affordance 312 displayed between two user interfaces in the container. In some embodiments, affordance 312 is a vertical bar or any other suitable affordance. In some embodiments, affordance 312 is displayed between two adjacent user interfaces in a container. An affordance such as affordance 312 can be displayed between adjacent user interfaces in a container. In some embodiments, affordance 312 exhibits the same visibility features as affordance 308-1 (e.g., sometimes being hidden and sometimes being displayed).

In some embodiments, affordance 312 is associated with the container and optionally is manipulatable to manipulate the container (e.g., to manipulate the user interfaces in the container, to manipulate all user interfaces in the container, etc., such as to move the user interfaces in a horizontal, vertical directions and/or to change the distance of the user interfaces from the user (e.g., change the z depth), etc.). For example, a user is able to select affordance 312 with hand 301 and while maintaining the selection input, move hand 301 to move affordance 312 in accordance with the movement of hand 301. In some embodiments, moving affordance 312 causes one or more of the user interfaces in the container to move in accordance with the movement of hand 301 (e.g., the user interfaces adjacent to affordances 312, all user interfaces in the container, etc., optionally including the associated affordances). For example, if hand 301 moves rightwards, affordance 312 (e.g., and optionally affordances 308-1 and 308-2) and/or user interfaces 306-1 and 306-2 (e.g., the user interfaces in the container) move rightward, optionally with a speed and/or magnitude that is based on the speed and/or magnitude of the movement of hand 301. In some embodiments, as will be described in more detail below with respect to FIG. 6A, affordance 312 can be selected (e.g., a discrete selection input, as opposed to a select-and-hold input as described above) to remove one or more user interfaces from a container.

Thus, as described above, if a user interface is moved (e.g., via a drag-and-drop style interaction) to within a threshold distance of a respective location which can cause the user interface to be added to a container that includes one or more existing user interfaces, a target can be displayed at the respective location. In response to detecting the termination of the selection input (e.g., the "drop" of the drag-and-drop interaction), the user interact being moved is snapped to the respective location and added to a container that options one or more of the existing user interfaces.

In some embodiments, if the user interface is not brought to within the threshold distance from the respective location, then in response to detecting the termination of the selection input, the application associated with the user interface is not launched and/or the user interface being moved is not displayed or placed in three-dimensional environment 300 (e.g., the launch is canceled and the user interface being moved ceases to be displayed). In some embodiments, if a user interface is not within the threshold distance from the predetermined location, then in response to detecting the termination of the selection input, the user interface is placed at the location that the user interface was at when the termination of the selection input was received (e.g., the user interface is not snapped to one of the predetermined locations). Thus, the user is able to flexibly place user interfaces at any location in three-dimensional environment 300 by dragging and dropping the user interfaces (e.g., optionally via dragging and dropping an affordance, such as affordance 308-1 and/or optionally via dragging and dropping the user interface itself) at the desired location.

Figure 4A:
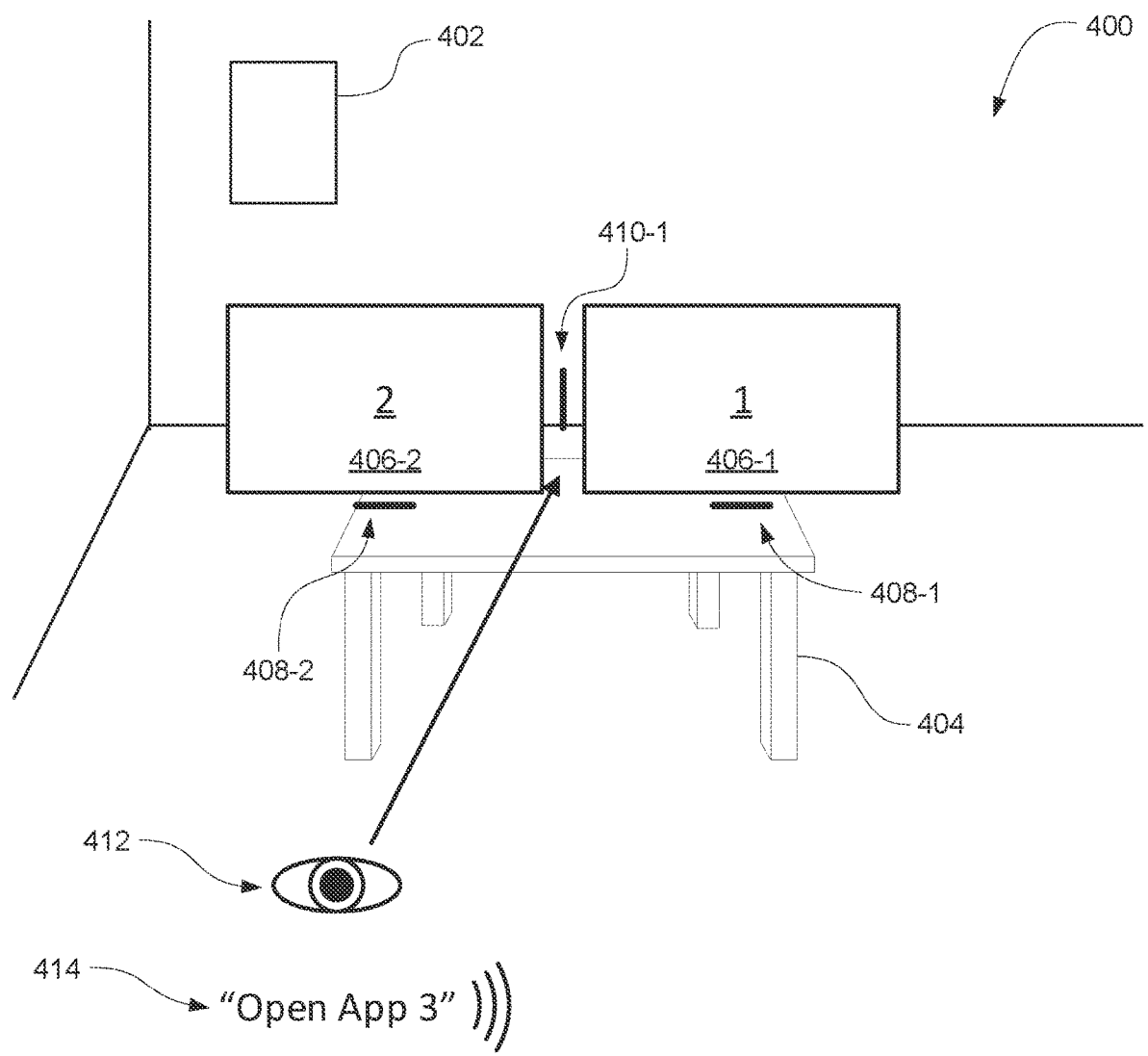
FIGS. 4A-4B illustrate a method of inserting a user interface into a container in a three-dimensional environment according to some embodiments of the disclosure.
Figure 4B:
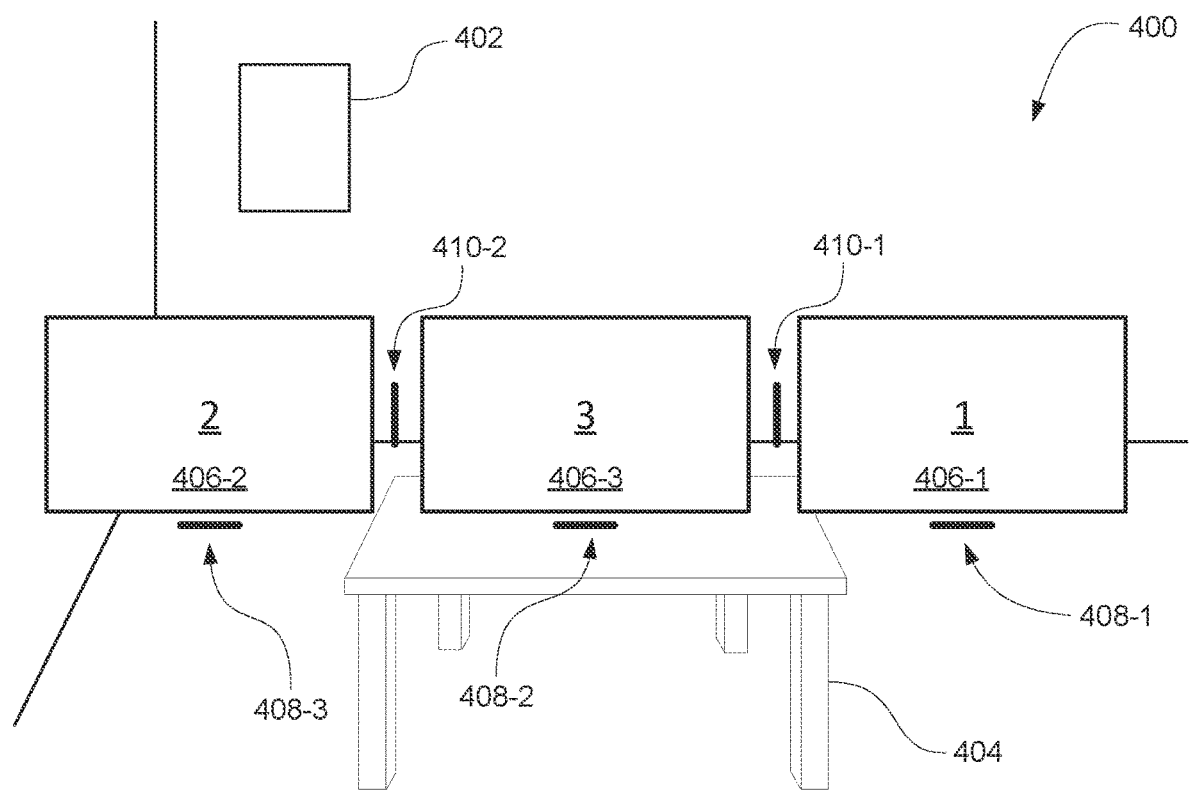

FIGS. 4A-4B illustrate a method of inserting a user interface into a container in a three-dimensional environment 400 according to embodiments of the disclosure. FIG. 4A illustrates three-dimensional environment 400 that includes elements similar to those described above with respect to FIG. 3A-3C, the details of which are not repeated here.

In FIG. 4A, while displaying user interface 406-1 and user interface 406-2 in three-dimensional environment 400, the device receives a voice command 414 to launch Application 3 (e.g., a voice command saying "Open App 3"). In some embodiments, the device detects that gaze 412 of the user is directed at a location in three-dimensional environment 400 between user interface 406-1 and user interface 406-2 when voice command 414 is received. In some embodiments, in response to receiving voice command 414 while gaze 412 is directed to the location between user interface 406-1 and user interface 406-2, the device launches Application 3 (or causes Application 3 to become an actively running application if, for example, Application 3 was inactive, running in the background, minimized, etc.) and displays user interface 406-3 associated with Application 3 at the location between user interface 406-1 and user interface 406-2, as shown in FIG. 4B. In some embodiments, user interface 406-3 is the user interface of Application 3 that is displayed when Application is launched (e.g., the Application 3 home page, the Application 3 landing page, etc.) and/or is the user interface of Application 3 that was previously displayed (e.g., during the previous runtime session of Application 3 and/or if Application 3 was inactive and/or running in the background, for example).

In some embodiments, user interfaces 406-1 and/or 406-2 move to the right and left, respectively, to make room for user interface 406-3 to be inserted between user interface 406-1 and user interface 406-2. For example, user interface 406-1 can move to the right and user interface 406-3 can be displayed at least partially where user interface 406-1 was previously located (e.g., centered on where user interface 406-1 was previously centered), user interface 406-2 can move to the left and user interface 406-3 can be displayed at least partially where user interface 406-2 was previously located (e.g., centered on where user interface 406-2 was previously centered), or both user interfaces 406-1 and 406-2 can move to the right and left, respectively, and user interface 406-3 can be displayed at least partially where user interfaces 406-1 and 406-2 were previously located (e.g., centered on a location between user interface 406-1 and user interface 406-2).

In some embodiments, if the workspace has multiple user interfaces to the left and/or right of the location at which the new user interface is inserted, then the multiple user interfaces are moved to the left or right, as the case may be, to make room for the new user interface to be inserted. For example, in FIG. 4A, if three-dimensional environment 400 includes user interface 406-1 and a third user interface to the right of the location at which gaze 412 is looking, then in FIG. 4B, user interface 406-1 and the third user interface can both be moved to the right to make room for user interface 406-3 to be inserted.

In some embodiments, an animation is displayed of the user interfaces moving to the left and/or right to make room for the new user interface to be inserted and/or an animation of the new user interface to be inserted appearing at the respective location during and/or after the user interfaces move to the left and/or right to make room.

Thus, as shown in FIGS. 4A-4B, in response to a user input to display a user interface and add the user interface to an existing container, the device can automatically adjust the spacing and/or location of the user interfaces in the container to make room for the user interface to be inserted. In some embodiments, the user interfaces automatically move and/or adjust if the user interface to be inserted is being inserted between existing user interfaces in the container, such as shown in FIGS. 4A-4B. In some embodiments, if the user interface to be inserted is being inserted at the edges of the container (e.g., to the left of the left-most user interface or to the right of the right-most user interface), then the existing user interfaces in the container optionally do not move and/or change locations and the user interface to be inserted is added to the left and/or right of the container, as the case may be. In such embodiments, the size of the container is expanded by at least the width of the user interface that is being inserted (e.g., optionally in addition to the amount of space between user interfaces, which is optionally a predetermined amount and/or determined based on the size of the user interfaces to the left and/or right of the respective spacing).

In some embodiments, the position and/or location where the new user interface is inserted is based at least on the location of the gaze of the user, such as gaze 412 illustrated in FIG. 4A. For example, if gaze 412 is looking at or toward the location between user interface 406-1 and user interface 406-2 (e.g., optionally including looking past the location between user interface 406-1 and user interface 406-2 at an object behind the location between user interface 406-1 and user interface 406-2), then in response to voice command 414, user interface 406-3 is added to the container and inserted between user interface 406-1 and user interface 406-2. If, on the other hand, gaze 412 is looking at a location to the right of user interface 406-1 (e.g., or within a threshold distance to the right of user interface 406-1, such as 1 inch, 6 inches, 1 foot, 3 feet, etc.), then user interface 406-3 is added to the container and attached to the right of user interface 406-1.

In some embodiments, if gaze 412 is directed at an existing user interface, then in response to voice command 414, the electronic device replaces the existing user interface at which gaze 412 is directed with the new user interface being displayed (e.g., optionally without displaying an outline such as outline 310). For example, in FIG. 4A, if gaze 412 is directed to user interface 406-1 (e.g., or within a threshold distance of user interface 406-1 (e.g., the "hit box" of user interface 406-1)), then in response to voice command 414, the device replaces user interface 406-1 with user interface 406-3 and adds user interface 406-3 to the container that previously included user interface 406-1 and user interface 406-2. In some embodiments, user interface 406-1 is removed from the container and/or ceases to be displayed.

It is understood that although FIGS. 4A-4B illustrate the request to display a user interface and add the user interface to an existing container as a voice command, other input methods are possible. For example, the method of displaying a user interface illustrated in FIGS. 4A-4B can be performed in response to a request that involve head gesture, eye gestures, face gestures, finger gestures, etc.

In some embodiments, if three-dimensional environment 400 does not include a container and/or includes at least one user interface that is not a member of a container (e.g., such as in FIG. 3A), then in response to voice command 414, the device optionally creates a container that optionally includes one or more of the existing user interfaces) and adds the user interface to be inserted to the newly created container (e.g., in a manner similar to described above with respect to FIGS. 3A-3C, optionally with or without displaying outline 310).

It is noted that FIGS. 4A-4B do not illustrate three-dimensional environment 400 displaying an outline (e.g., such as outline 310 described above in FIG. 3B) at the location where the user interface will be displayed. In some embodiments, an outline is not displayed in three-dimensional environment 400 if the command to launch the user interface does not include a "setup" stage and "confirmation" stage (e.g., or "execution" stage). For example, in FIGS. 3A-3C, during the "setup" stage, the user moved user interface 306-2 to the respective location, thus providing the device with an indication that the user is interested in placing user interface 306-2 at the respective location before the request to place user interface 306-2 is confirmed. Thus, the device displays outline 310 and provides a confirmation and/or indication of the location that the user interface will be placed (e.g., in response to the release of the selection input, optionally considered the "confirmation" and/or "execution" stage). On the other hand, in FIGS. 4A-4B, the command to cause display of user interface 406-2 is a voice command that does not include first portion that indicates a position and then a second portion that confirms the execution of the command. Thus, in some embodiments, the device determines the location to place user interface 406-2 when the execution confirmation is received and as a result, the device does not first display an outline at the respective location.

In some embodiments, on the other hand, the user is optionally able to determine, from portions of the voice command, as the voice command is being received, that the user desires to launch an application and/or display a user interface, and the device is able to display an outline at the respective location. For example, in response to receiving a first portion of a voice command saying "display", the device is optionally able to determine that the command is likely a request to launch an application and/or display a user interface. Thus, in response to receiving the command "display" (e.g., or any other similar command), an outline can be displayed at the respective location (e.g., before the full voice command is received, which optionally causes the user interface to be placed at the respective location). In such embodiments, the respective location can be determined based on the location of gaze 412 when the first portion of the voice command is received.

Figure 5A:
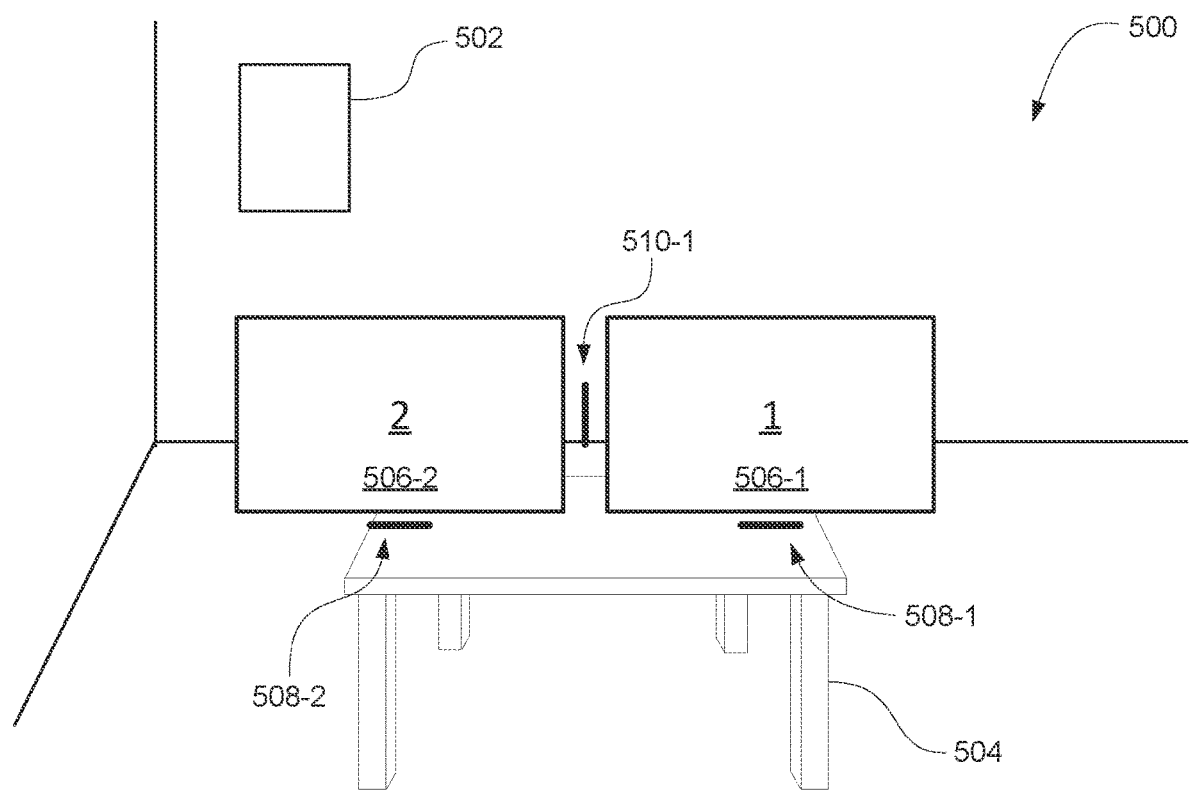
FIGS. 5A-5G illustrate a method of inserting a user interface into a container in a three-dimensional environment according to some embodiments of the disclosure.

FIGS. 5A-5G illustrate a method of inserting a user interface into a container in a three-dimensional environment 500 according to some embodiments of the disclosure. FIG. 5A illustrates three-dimensional environment 500 that includes elements similar to those described above with respect to FIGS. 3A-3C and FIGS. 4A-4B, the details of which are not repeated here.

While displaying three-dimensional environment 500 that includes one or more user interfaces that are members of a container, such as in FIG. 5A, the device receives a user input corresponding to a request to display an application launching user interface. In some embodiments, the request to display the application launching user interface is a predetermined gesture by a hand of the user, a voice command uttered by the user, a selection of an affordance or button by the user, etc. In some embodiments, in response to receiving the user input, the device displays application launcher element 514, as shown in FIG. 5B.

In some embodiments, application launcher element 514 includes a text field in which a user is able to enter text to launch an application or otherwise cause a user interface for an application to be displayed. Application launcher element 514 can be used to perform a plurality of functions including searching for documents, opening documents, searching for applications, launching applications, performing mathematical calculations, navigating to web pages, etc. For example, a user is able to enter text into application launcher element 514 via a physical keyboard, a virtual keyboard, a voice command, etc., and the device is able to identify one or more documents and/or applications that match or partially match the text entered into application launcher element 514 (e.g., document and/or application search results). In some embodiments, the device displays the results of the search as a list. In some embodiments, the search results can be labeled and/or categorized as either documents or applications (or other types of search results). The user is optionally able to select the desired document or application from the list of search results to cause the respective document or application to be displayed. For example, a user is able to use a voice command to indicate which search result to actuate and/or use a hand to perform a selection gesture directed to a respective search result. In some embodiments, a user is able to execute the top search result by performing a user input corresponding to a confirmation or execution user input. For example, if the top search result is a document, then in response to the selection of an "enter" key from a soft keyboard, the document is displayed (e.g., an application for displaying the document is launched and the document is opened using the application) and if the top search result is an application, then in response to the selection of the "enter" key from the soft keyboard, the application is launched (or a user interface of the application is displayed).

Figure 5B:
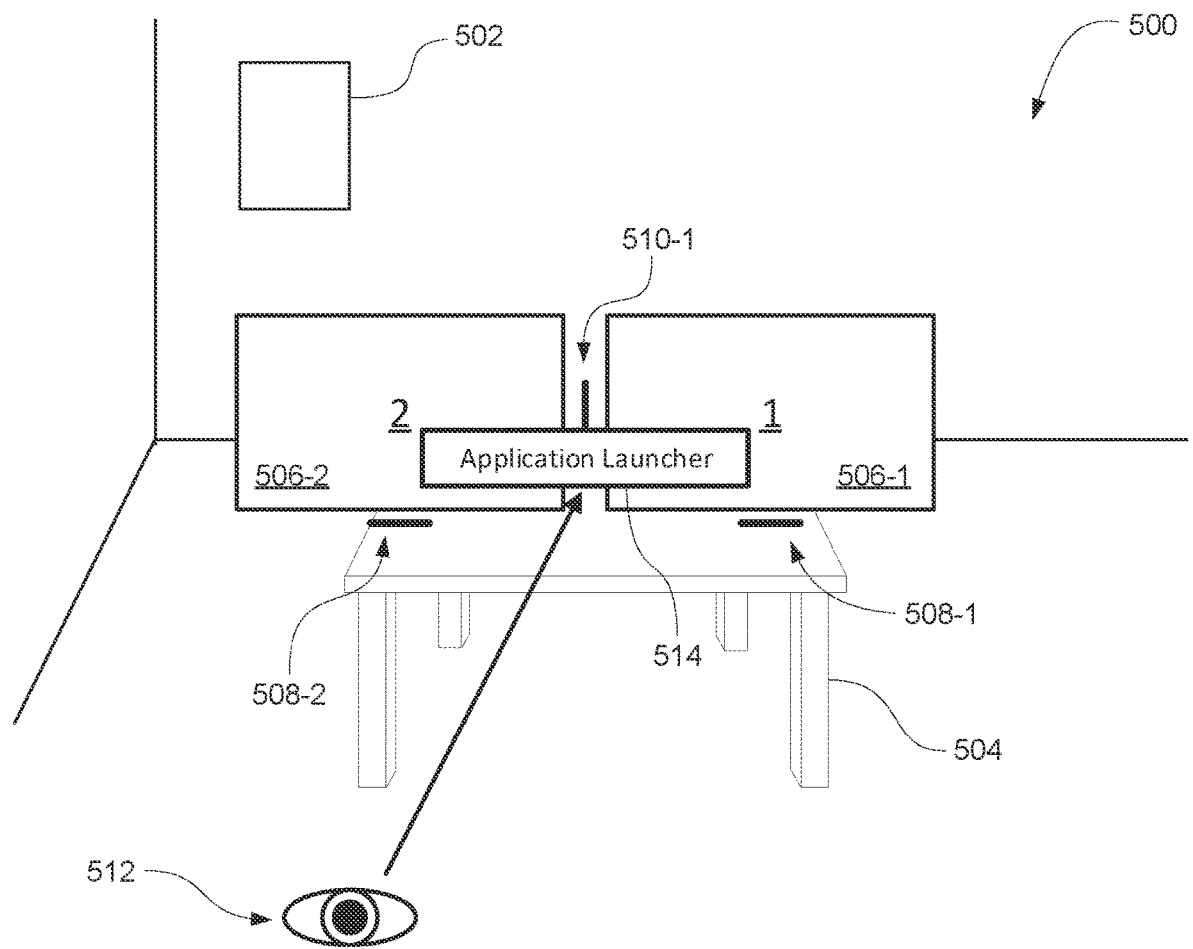

As shown in FIG. 5B, in some embodiments, application launcher element 514 is displayed in three-dimensional environment 500 at or near the location that gaze 512 of the user was looking at when the user input corresponding to a request to display an application launching element was received (e.g., the location at which gaze 512 was looking when application launcher element 514 was displayed). In some embodiments, the location that application launcher element 514 is displayed is directly in front of the user (e.g., optionally the environment rotates such that the location of gaze 512 is directly in front of the user).

In some embodiments, if a user interface will be displayed via application launcher element 514, then three-dimensional environment 500 is updated to indicate that a user interface will be displayed at a respective position. In some embodiments, updating three-dimensional environment 500 can include displaying an outline (e.g., such as outline 310 described above with respect to FIG. 3B) and/or moving one or more existing user interfaces to make room for the user interface to be displayed). For example, if the top search result is an application, and/or if the user moves a current focus to an application in the list of search results, then three-dimensional environment 500 is updated. In some embodiments, a user is able to move the current focus among the list of search results using the user's gaze (e.g., looking at the item optionally causes the item to be highlighted) or by moving one or more hands of the user (e.g., from a respective "ready" position, moving a hand up or down to move a focus indicator up or down, respectively, among the items in the search results).

Figure 5C:
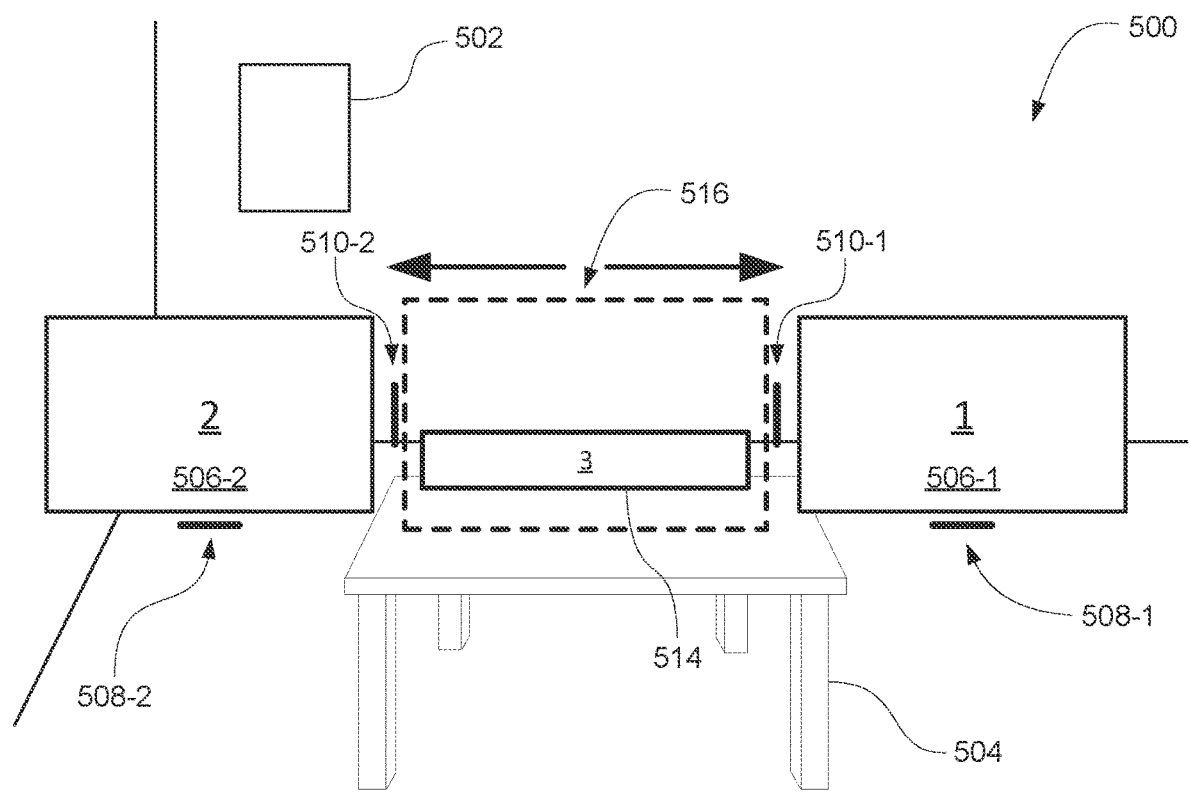

In FIG. 5C, a user input is received providing a text input into application launcher element 514. In some embodiments, the text inserted into application launcher element 514 is associated with Application 3. For example, the text is the name of Application 3, the first several characters of the name of Application 3, and/or any other text input associated with Application 3 such that Application 3 satisfies one or more search criteria based on the entered text (e.g., is the top search result).

In some embodiments, in accordance with a determination that the device identified Application 3 as matching a search criteria based on the text entered in application launcher element 514, the device determines that Application 3 will be launched and/or a user interface associated with Application 3 will be displayed in response to a user input confirming the launch. In some embodiments, in response to determining that Application 3 will be launched and/or a user interface associated with Application 3 will be displayed, user interface 506-1 moves to the right and user interface 506-2 moves to the left to make room for the user interface associated with Application 3 (e.g., before Application 3 is launched), as shown in FIG. 5C (e.g., in a manner similar to that described above with respect to FIGS. 4A-4B). In some embodiments, if an application will not be launched, then user interface 506-1 and user interface 506-2 optionally does not expand to provide space. For example, if the text inserted into application launcher element 514 is a command to perform a mathematical calculation, then a user interface will optionally not be launched, and user interface 506-1 and user interface 506-2 optionally does not expand to provide space.

In some embodiments, additionally or alternatively to moving user interfaces 506-1 and 506-2, outline 516 is displayed at the location where the user interface associated with Application 3 will be displayed (e.g., in response to a user input confirming the launch). Outline 516 optionally has characteristics and/or behaviors similar to outline 310 described above with respect to FIG. 3B, the details of which will not be repeated here. In some embodiments, outline 516 has a size and/or shape that is based on the size and/or shape of the user interface associated with Application 3 that will be displayed at the respective location. As shown in FIG. 5C, outline 516 is displayed at or near the location of application launcher element 514. For example, outline 516 optionally surrounds application launcher element 514 and/or application launcher element 514 overlays outline 516. In some embodiments, outline 516 is displayed at the same distance from the user as user interface 506-1 and user interface 506-2. In some embodiments, if an application will not be launched, then the system optionally does not display outline 516.

In some embodiments, application launcher element 514 continues to be displayed while user interface 506-1 and user interface 506-2 move to the left and right, respectively, and before launching the respective user interface, the user is able to change the text in application launcher element 514 to change the search results and/or change whether outline 516 is displayed and/or whether the existing user interfaces move. For example, if the user deletes the text in application launcher element 514, then Application 3 is no longer the application that will be launched, and user interfaces 506-1 and 506-2 are optionally moved back to their original positions and/or outline 516 is ceased to be displayed. Similarly, if the user changes the text in application launcher element 514 such that a search result that is not associated with any application is the top search result (e.g., an application will not be launched), then user interfaces 506-1 and 506-2 are optionally moved back to their original positions and/or outline 516 is ceased to be displayed.

On the other hand, if the user changes the text in application launcher element 514 such that a different application is now the top search result (for example, Application 4, instead of Application 3), then in some embodiments, outline 516 may be updated and/or adjusted based on the size and/or shape of the user interface for Application 4 and/or user interfaces 506-1 and 506-2 may move closer or farther apart based on the size and/or shape of the user interface for Application 4. For example, if the landing page for Application 4 is larger than the landing page for Application 3, then the user interfaces are optionally moved farther apart to provide additional space for the larger landing page. If the user interface that will be displayed for Application 4 is the same size and shape as the user interface that will be displayed for Application 3, then outline 516 optionally does not change size and/or shape.

In some embodiments, three-dimensional environment 500 may exhibit similar behavior based on the current focus within the search results of application launcher element 514 (e.g., as opposed to the top search result described above). For example, if the search results of application launcher element 514 include multiple matches, the user is able to move the focus within the search results. If the current focus is a document, then in response to a confirmation user input, an application associated with the document will be launched and user interfaces 506-1 and 506-2 move apart and/or outline 516 is displayed, as shown in FIG. 5C. Additionally or alternatively, if the current focus is on an application, then in response to a confirmation user input, the respective application will be launched and user interfaces 506-1 and 506-2 move apart and outline 516 is displayed, as shown in FIG. 5C. Similarly, if the user moves the focus from a first search result that is associated with an application to a second search result that is not associated with an application, then user interfaces 506-1 and 506-2 are optionally moved back to their original positions and/or outline 516 is ceased to be displayed.

In some embodiments, the location that the application will be launched (e.g., the location that the user interface associated with the application to be launched will be displayed) is at least partially based on the location of the user's gaze at the time when the user input to display application launcher element 514 is received and/or is based on the position of application launcher element 514 (e.g., which optionally is based on the location of the user's gaze at the time when the user input to display application launcher element 514). For example, in FIG. 5B, gaze 512 of the user is looking at or near a location between user interface 506-1 and user interface 506-2 (e.g., optionally including looking past the location between user interface 506-1 and user interface 506-2 at an object behind the location between user interface 506-1 and user interface 506-2) when the user input was received requesting display of application launcher element 514. In response to the user input and in accordance with a determination that gaze 512 is looking at the location between user interface 506-1 and user interface 506-2, application launcher element 514 is optionally displayed at the location between user interface 506-1 and user interface 506-2 and overlaid on top of user interface 506-1 and user interface 506-2 and when the respective application is launched (e.g., Application 3), a user interface associated with the respective application will be displayed at or near the location of application launcher element 514.

Similarly, if gaze 512 is looking at a respective location to the left or to the right of the left-most and right-most user interface in the container, application launcher element 514 (e.g., and optionally outline 516) is displayed at the respective location to the left or right of the container, respectively, and an application that is launched via application launcher element 514 is optionally launched at the respective location to the left or right of the container, respectively (e.g., and added to the container at the left-most or right-most position, respectively).

In some embodiments, if the top search result is a document and/or if the user moves a current focus to a document in the list of search results (e.g., as opposed to an application, as described above), then the behavior described above (e.g., with respect to displaying an outline, moving existing user interfaces, and/or launching a user interface in response to a user input confirming the launch) is not performed. In some embodiments, if the top search result is a document and/or if the user moves a current focus to a document in the list of search results, then the behavior described is performed and the user interface to be launched is a user interface of the application used to open and/or view the respective document. For example, if the document is a text document, then the application that will be launched is a text editing and/or viewer application.

Figure 5D:
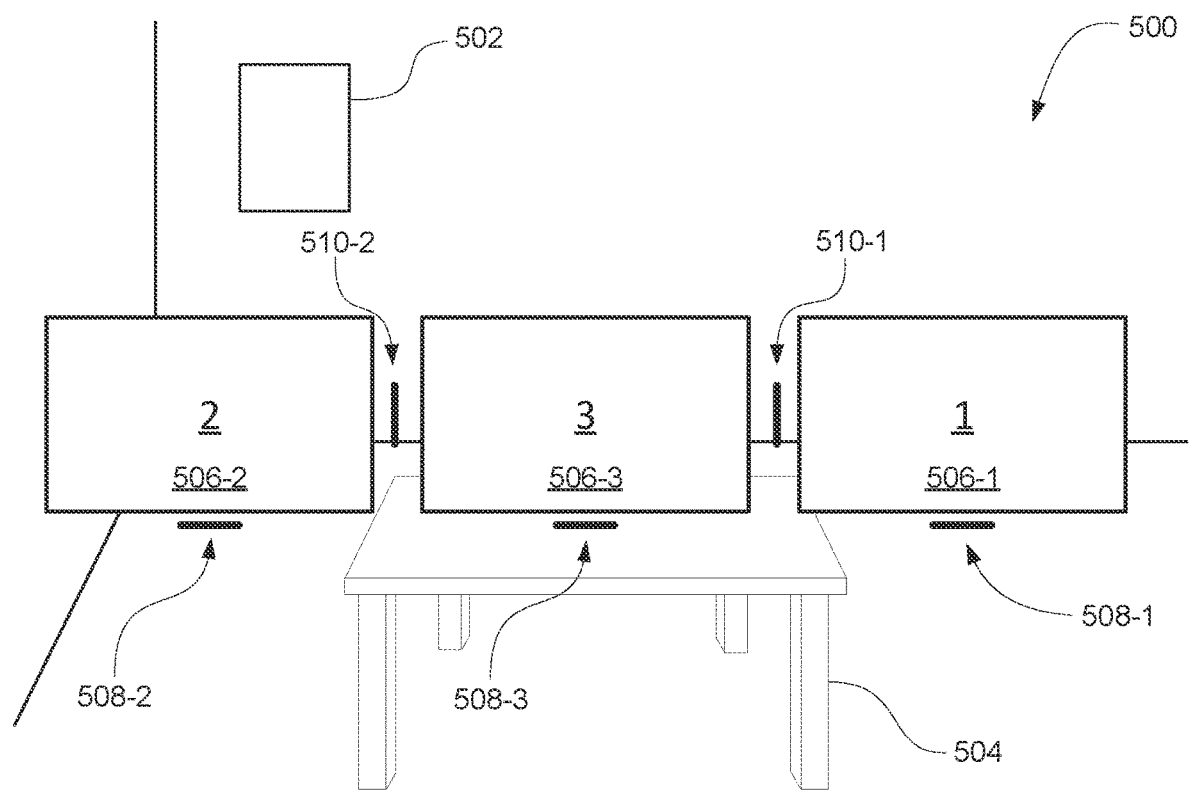

In FIG. 5D, a user input is received to launch Application 3. In some embodiments, the user input to launch Application 3 is a selection input while the current focus is on Application 3 in the list of search results (e.g., selecting "enter" on a soft keyboard or detecting a pinch input while the current focus is on Application 3 in the list of search results). In some embodiments, the user input to launch Application 3 is a confirmation or execution input while Application 3 is the top search result (e.g., selecting "enter" on a soft keyboard or detecting a pinch input while Application 3 is the top search result).

In some embodiments, in response to receiving a user input to launch Application 3, outline 516 ceases to be displayed and user interface 506-3 associated with Application 3 is displayed at a location based on the location of outline 516 and added to the container that includes user interface 506-1 and user interface 506-2.

As shown in FIG. 5D, user interface 506-3 is displayed at the location that is vacated when user interface 506-1 and user interface 506-2 moved apart. In some embodiments, in response to the user input, Application 3 is launched. User interface 506-3 is optionally the landing page for Application 3 (e.g., the user interface that is displayed when Application 3 is first opened). In some embodiments, user interface 506-3 is the user interface that was displayed during a previous runtime session of Application 3. In some embodiments, Application 3 was already running on the device when the user input was received (e.g., minimized, running as a background process, or at another location), and in response to the user input, Application 3 is updated to become an active process (e.g., no longer a background or inactive process) if Application 3 was an inactive or background process and user interface 506-3 is the user interface of Application 3 from the previous active runtime session of Application 3 or if Application 3 is currently running, user interface 506-3 is the currently displayed user interface associated with Application 3 (e.g., but now moved to the location between user interfaces 506-1 and 506-2, as shown in FIG. 5D).

In some embodiments, while application launcher element 514 is displayed, user interface 506-1 and user interface 506-2, which are shown partially overlapping with application launcher element 514 in FIG. 5B, can be darkened and/or partially faded out and pushed back in z-depth (and thereby appear slightly smaller within the environment). User interface 506-1 and user interface 506-2 can return to the appearance (can be lightened and/or faded back in) and/or position (pushed forward in z-depth) when the application launcher element 514 ceases to be displayed (e.g., after launching (or canceling the launch of) an application via the application launcher element). Additionally or alternatively, when application launcher element 514 is displayed as shown in FIG. 5B, user interface 506-1 and user interface 506-2 can move apart (e.g., increasing the space between user interface 506-1 and user interface 506-2 of the container). In some embodiments, the amount that user interfaces 506-1 and 506-2 move apart is independent of the size of the application to be launched and can be less than the size of an application to be launched.

Figure 5E:
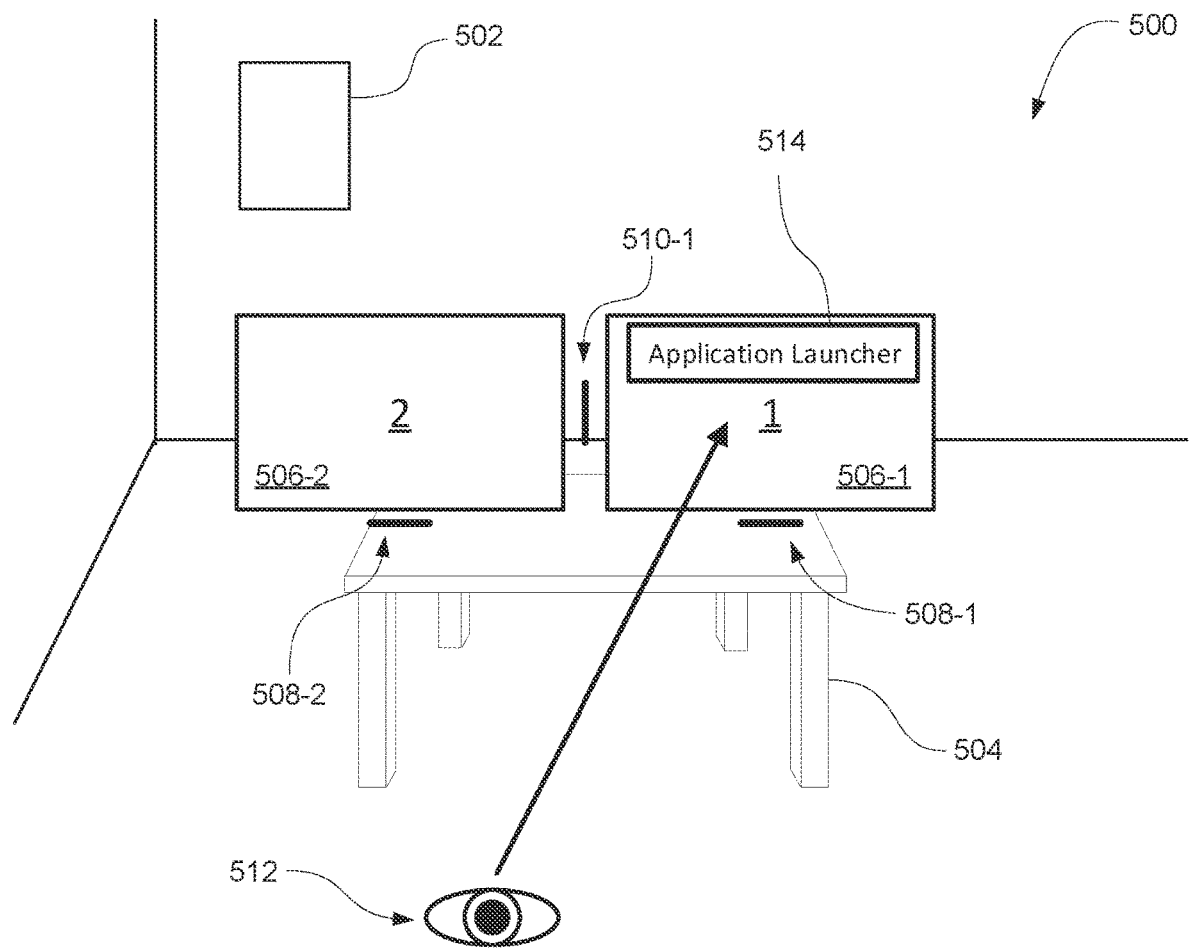
Figure 5F:
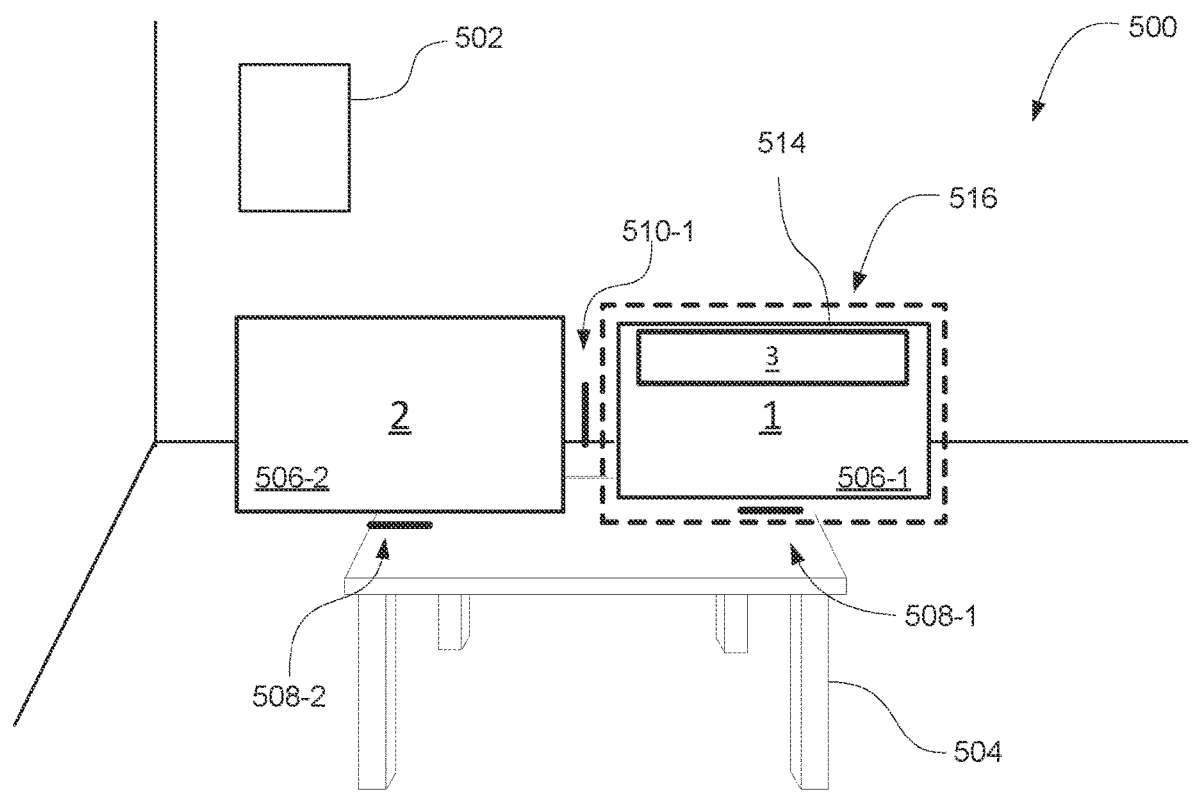
Figure 5G:
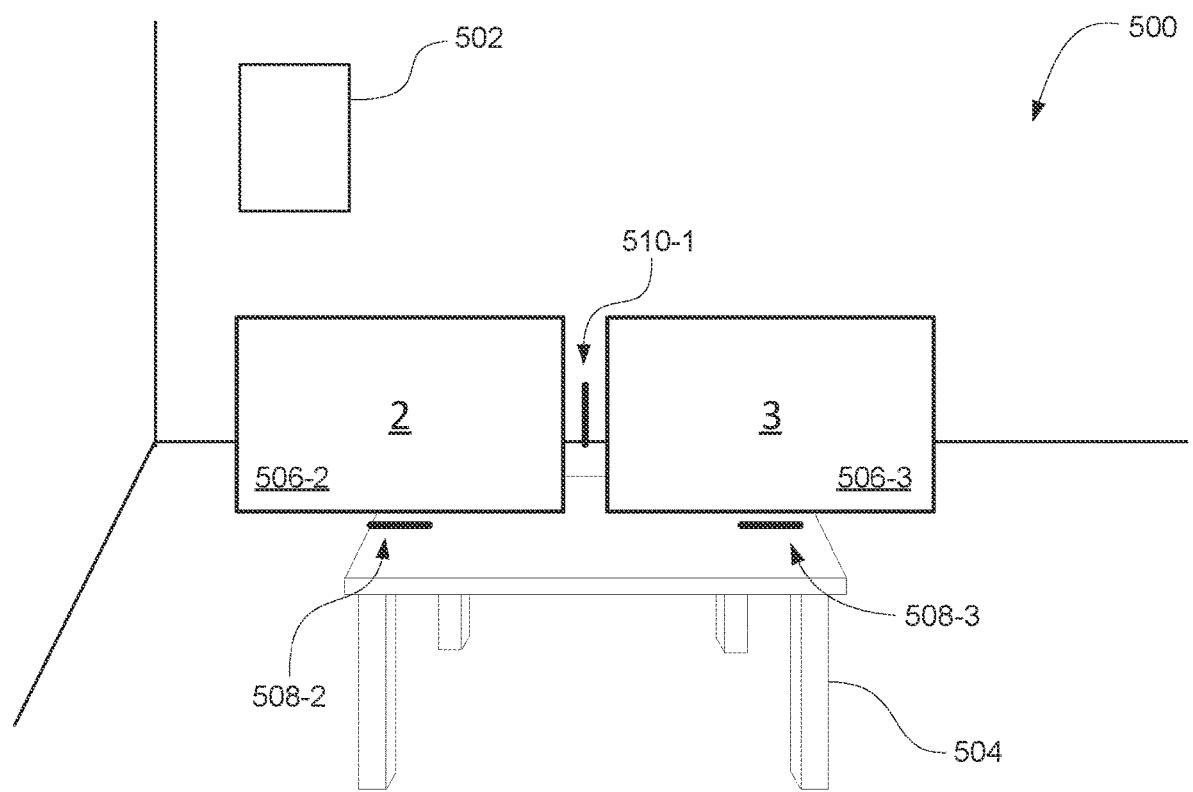

Although the description of FIGS. 5B-5D primarily focuses on gaze 512 between user interfaces 506-1 and 506-2, a corresponding application launcher element 514 at or near the location of gaze 512, and displaying user interface 506-3 associated with Application 3 between user interfaces 506-1 and 506-2, it is understood that an application launcher element 514 can be used to insert a user interface into a container and thereby replace another user interface within the container (e.g., displacing a user interface of the container). FIGS. 5E-5G illustrate a method of inserting a user interface into a container in a three-dimensional environment 500 according to some embodiments of the disclosure. Beginning from the three-dimensional environment of FIG. 5A, in some embodiments, when gaze 512 shown in FIG. 5E is directed at a respective user interface (e.g., user interface 506-1), application launcher element 514 is optionally displayed in three-dimensional environment 500 at or near the location that gaze 512 of the user was looking at when the user input corresponding to a request to display an application launching element was received. In some embodiments, while application launcher element 514 is displayed, the respective user interface (e.g., user interface 506-1) can be darkened and/or partially faded out and pushed back in z-depth (and thereby appear slightly smaller within the environment), similar to the description above. The darkening and pushing back of the respective user interface can provide an indication that the respective user interface will be replaced with the completion of launching using application launcher element 514.

Additionally, as shown in FIG. 5F, an outline 516 (e.g., such as outline 310 described above with respect to FIG. 3B) is optionally displayed at a respective predetermined position to indicate that the user interface to be launched (e.g., corresponding to Application 3) using application launcher element 514 can and/or will replace the respective user interface (e.g., user interface 506-1) that was the location of gaze 512 when requesting the application launcher element 514. In some examples, the respective predetermined position is at the position of the respective user interface (e.g., user interface 506-1) before the respective user interface is darkened and/or pushed back in z-depth.

In some such embodiments, a user input is received to launch Application 3 (e.g., in a similar manner as described above). In some such embodiments, in response to receiving a user input to launch Application 3, the outline 516 ceases to be displayed and user interface 506-3 associated with Application replaces user interface 506-1 and is added to the container that now includes user interface 506-2 and user interface 506-3. For example, as shown in FIG. 5G, user interface 506-3 replaces user interface 506-1 and is displayed at the location vacated by user interface 506-1. In some embodiments, user interface 506-1 is removed from the container and ceases to be displayed (e.g., the application associated with user interface 506-1 is optionally closed, made inactive, or becomes a background process) and user interface 506-3 is added to the container at the location in the container that was previously occupied by user interface 606-3.

In some embodiments, replacing an application in a container using application launcher element 514 as described with respect to FIGS. 5E-5G can include an animation. In some embodiments, the animation can include fading out the replaced application (e.g., user interface 506-1) while continuing to move the replaced application further from the user (farther z-depth) and/or fading in the replacing application (e.g., user interface 506-3) while continuing to move the replacing application closer to the user (shallower z-depth). In some embodiments, the animation of the replaced application and the animation of the replacing application are sequential (e.g., fading in the replacing application begins from the position in z-depth or near the position in z-depth of the replaced application at the conclusion of fading out the replaced application). In some embodiments, the animation of the replaced application and the animation of the replacing application are partially or fully parallel in time. In some embodiments, outline 516 can fade out in parallel with fading out the replaced application (e.g., user interface 506-1).

Thus, as shown in FIGS. 5A-5G, launching an application via an application launcher element, such as application launcher element 514, includes a "setup" stage and "confirmation" stage. In some embodiments, the "setup" stage includes entering text into application launcher element 514 that matches an application (or voice input), and the "confirmation" stage (e.g., execution stage) includes a confirmation or execution input (e.g., selecting "enter" on a soft keyboard or voice input). As a result of having a "setup" stage and a "confirmation" stage, in some embodiments, outline 516 is displayed at the respective location and/or existing user interfaces optionally move in response to the "setup" stage and before a user interface is added to three-dimensional environment 500.

Figure 6A:
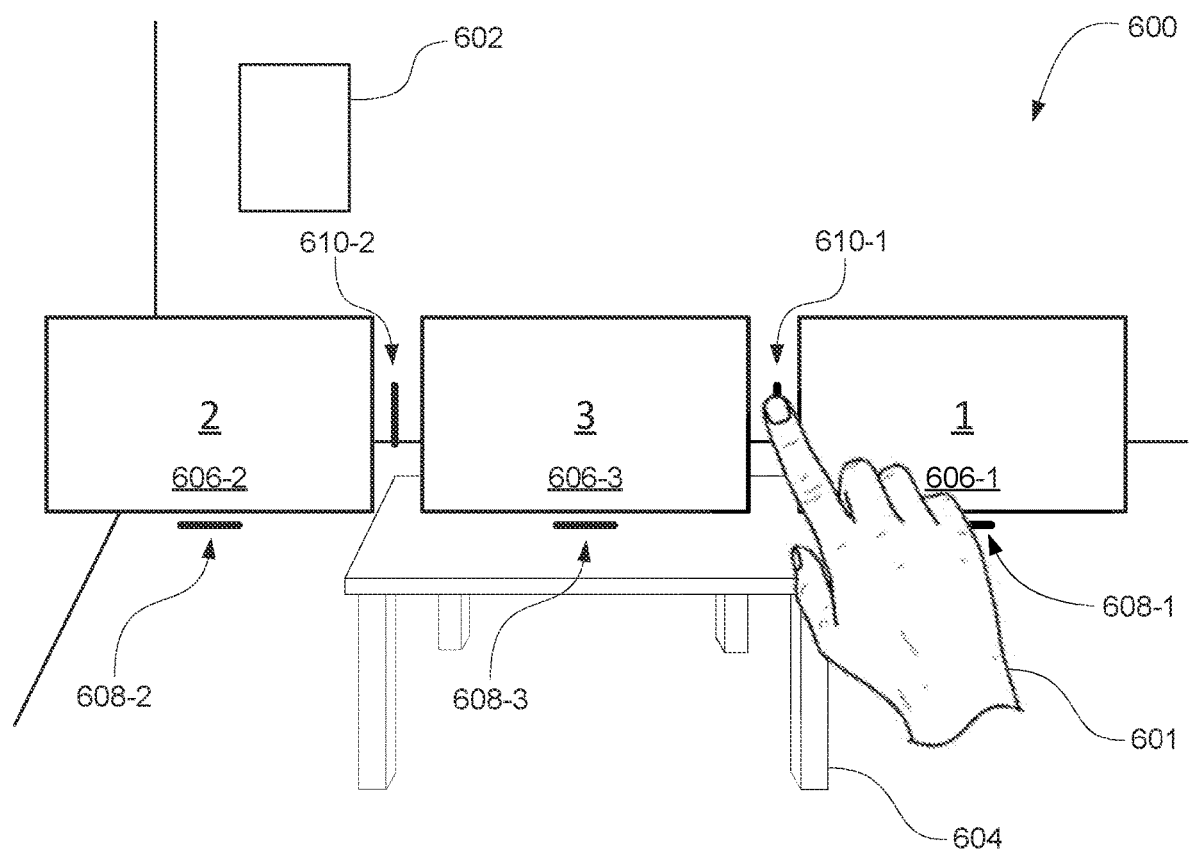
FIGS. 6A-6D illustrate a method of moving and removing user interfaces from a container in a three-dimensional environment according to some embodiments of the disclosure.

FIGS. 6A-6D illustrate a method of moving and removing user interfaces from a container in a three-dimensional environment 600 according to some embodiments of the disclosure. FIG. 6A illustrates three-dimensional environment 600 that includes elements similar to those described above with respect to FIGS. 3A-3C, FIGS. 4A-4B, and FIGS. 5A-5G, the details of which are not repeated here.

In FIG. 6A, while displaying user interfaces 601-1, 601-2, 601-3 and affordances 610-1 and 610-2 (e.g., which are optionally similar to affordance 312 described above with respect to FIG. 3C), a user input is detected from hand 601 selecting affordance 610-1. In some embodiments, the selection input can be a pointing gesture by a finger of hand 601 or a pinch gesture that is pinching a location associated with affordance 610-1. In some embodiments, in response to detecting a selection input directed to affordance 610-1, user interface 606-1 and user interface 606-3 are optionally disassociated. For example, in FIG. 6A, user interfaces 606-1, 606-2, and 606-3 are members of the same container and in response to the user input selecting affordance 610-1, user interface 606-1 is removed from the container while user interfaces 606-2 and 606-3 remain part of the same container. In some embodiments, because user interface 606-1 is removed from the container, affordance 610-1 ceases to be displayed in three-dimensional environment 600.

Thus, in some embodiments, performing a selection input on an affordance between user interfaces in the same container causes one or more user interfaces to be separated from the container. In some embodiments, if the user selected a vertical affordance that is in the center of four user interfaces in the same container, then the two user interfaces on each side of the selected affordance are disassociated from each other and optionally two containers are generated, each including the two user interfaces to the left and right of the selected affordance. For example, the container that includes the four user interfaces are optionally dissolved and two new containers are generated. Alternatively, two of the user interfaces remain in the original container while a new container is generated for the other two user interfaces.

In some embodiments, a container cannot have only a single user interface and thus, in response to selecting a vertical affordance between the left-most or right-most user interface and the next adjacent user interface, the left-most or right-most user interface (as the case may be) is removed from the container and is no longer a member of any container. In some embodiments, if the container includes only two user interfaces, then in response to selecting the vertical affordance between the two user interfaces, the container that includes the two user interfaces is dissolved and neither user interface is a member of any container.

Figure 6B:
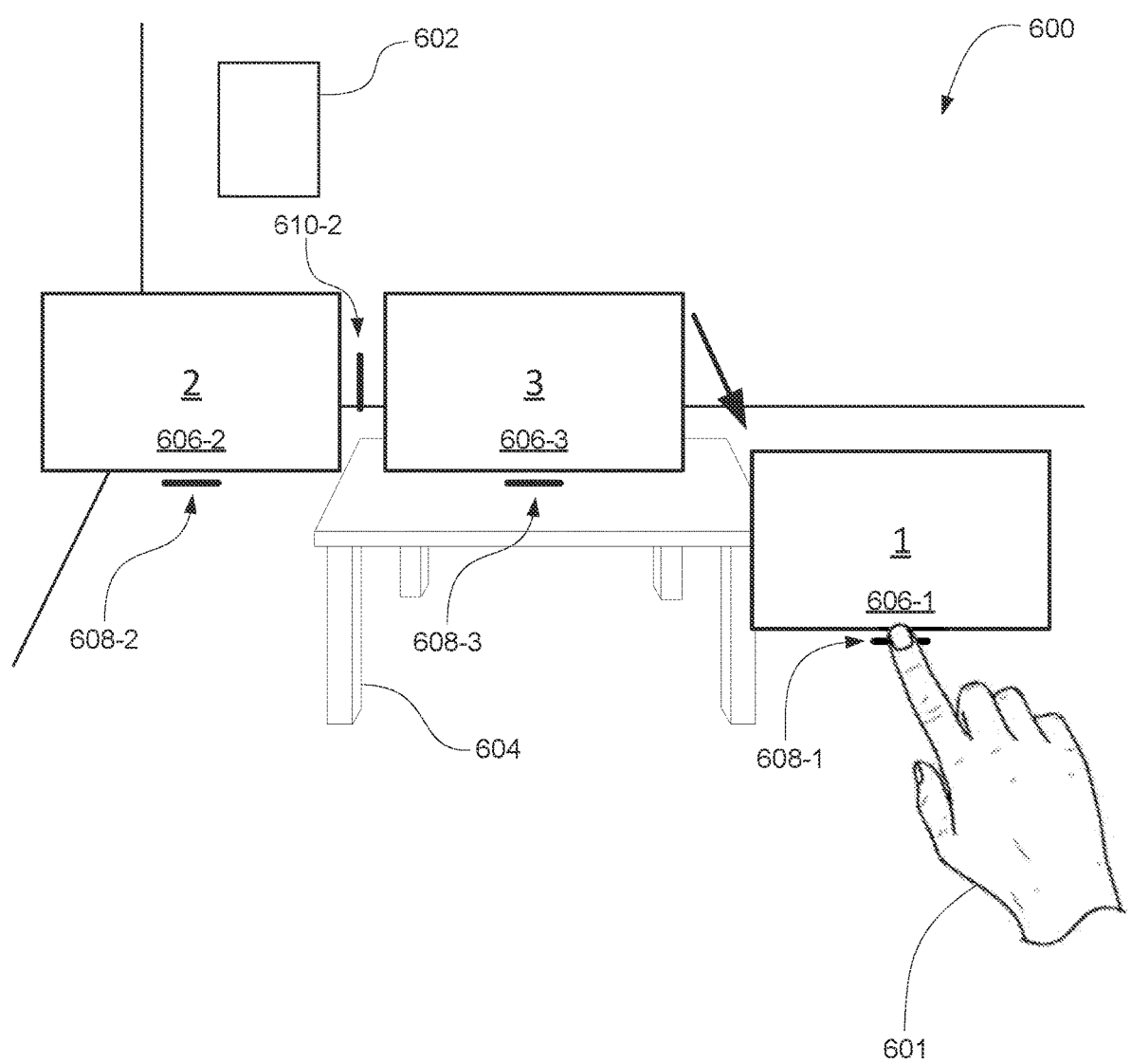

In some embodiments, after a user interface is removed from a container, the respective user interface is able to be manipulated without automatically manipulating the other user interfaces in the same container. For example, a user is able to interact with affordance 608-1 to move user interface 606-1 without causing user interface 606-2 and/or user interface 606-3 to also move with user interface 606-1. For example, in FIG. 6B, a sequence of user inputs is detected by hand 601 selecting affordance 608-1 and while maintaining selection of affordance 608-1, moving hand 601. In some embodiments, in response to detecting the movement of hand 601 while maintaining selection of affordance 608-1, user interface 606-1 moves in accordance with the movement of hand 601. For example, if hand 601 moved to the left, then affordance 608-1 and user interface 606-1 moves to the left in accordance with the movement of hand 601 and if hand 601 moved farther away from the user, then affordance 608-1 and user interface 606-1 moves farther away from the user in accordance with the movement of hand 601. Thus, the user is able to move user interface 606-1 around three-dimensional environment 600 in any direction by moving affordance 608-1, as shown in FIG. 6B. In some embodiments, user interface 606-2 and user interface 606-3 maintain their positions, even though user interface 606-1 moves in response to the movement of hand 601.

In some embodiments, a user need not first select affordance 610-1 to remove user interface 606-1 from the container that included user interfaces 606-1, 606-2, and 606-3, as described above with respect to FIG. 6A. For example, in some embodiments, while user interfaces 606-1, 606-2, and 606-3 are members of the same container, a user is able to select affordance 608-1 and move affordance 608-1 to move user interface 606-1 and automatically remove user interface 606-1 from the container, in a similar manner as described in FIG. 6B. In some embodiments, user interface 606-1 is removed from the container in response to detecting that hand 601 moved by more than a threshold amount (e.g., more than 1 inch, 3 inches, 6 inches, etc.) while selecting affordance 608-1. In some embodiments, after removing a user interface from a container, the user interface can be added back to the container by moving the user interface to within a threshold distance from one or more predetermined positions (e.g., in a manner similar to described above with respect to FIGS. 3B-3C), as will be described in more detail below.

Figure 6C:
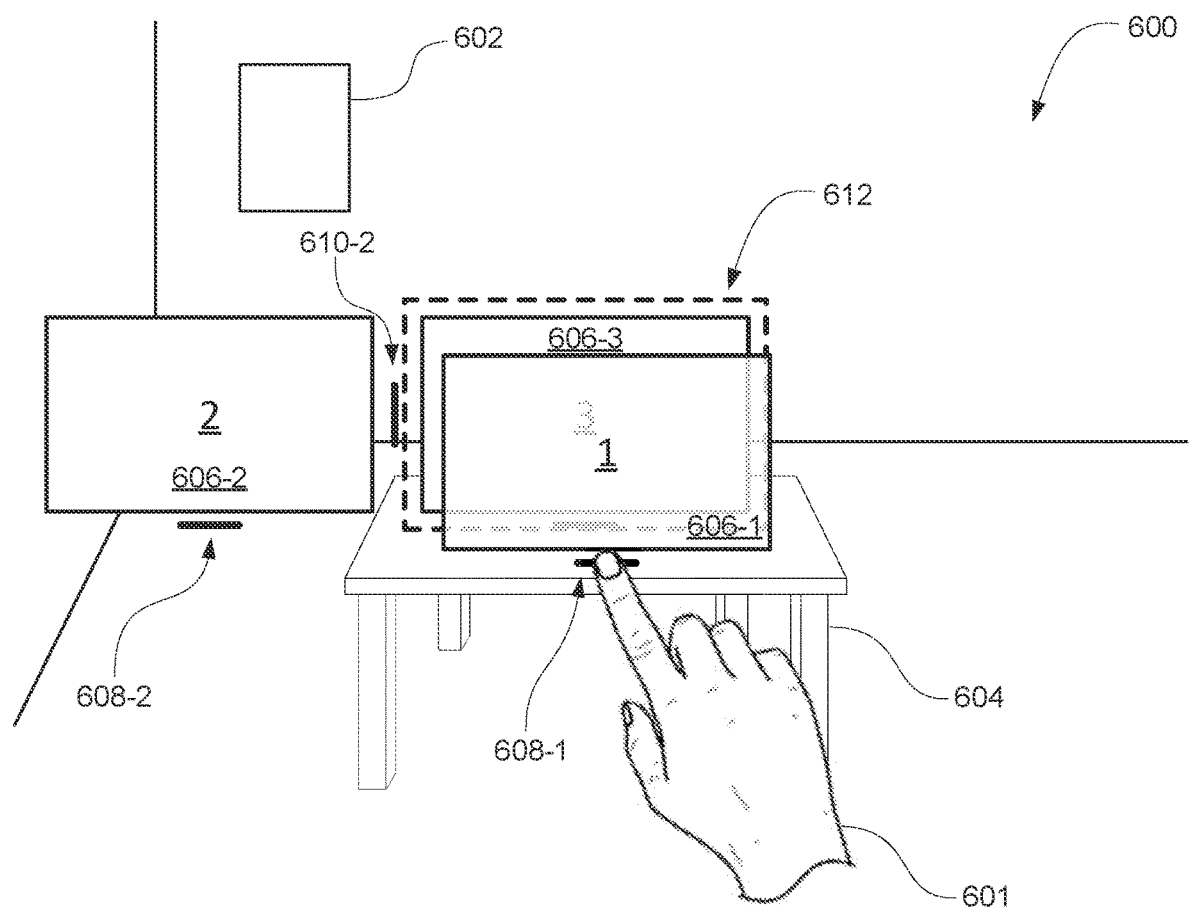

In FIG. 6C, while maintaining selection of affordance 608-1, the device detects hand 601 moving towards user interface 606-3. In some embodiments, in response to detecting hand 601 moving towards user interface 606-3, affordance 608-1 and user interface 606-1 moves in accordance with the movement of hand 601, as shown in FIG. 6C. In some embodiments, in response to detecting that user interface 606-1 has moved to within a threshold distance of user interface 606-3 (e.g., within 1 inch, 3 inches, 6 inches, 1 foot of user interface 606-3) and/or has moved to overlap with user interface 606-3 by a threshold amount (e.g., 30% overlap, 50% overlap, 60% overlap, 90% overlap, etc.), outline 612 is displayed, as shown in FIG. 6C. In some embodiments, outline 612 is similar to and shares similar behavior as outline 310 described above with respect to FIG. 3B. For example, outline 612 has a size and/or shape based on the size and/or shape, respectively, of user interface 606-1 and outline 612 indicates that upon release of the selection input, user interface 606-1 will be placed (e.g., displayed) at the location indicated by outline 612.

In FIG. 6C, because user interface 606-1 has been moved to within a threshold distance of a location currently occupied by user interface 606-3, upon release of the selection input, user interface 606-3 is replaced with user interface 606-1, as will be described in more detail below with respect to FIG. 6D. In some embodiments, while user interface 606-1 is being moved in three-dimensional environment 600 (e.g., in accordance with the movement of hand 601), in accordance with a determination that a threshold amount of a respective user interface is obscured (e.g., 25% obscured, 50% obscured, 75% obscured, 90% obscured, 100% obscured, etc.), the user interface that is obscuring the respective user interface is optionally made at least partially transparent. For example, in FIG. 6C, if user interface 606-1 is at a distance that is closer than user interface 606-3 (e.g., at a shallower z-depth), then in accordance with a determination that user interface 606-1 is obscuring a threshold amount of user interface 606-3 (e.g., because user interface 606-1 is in front of user interface 606-3), user interface 606-1 is made at least partially transparent (e.g., 10% transparency, 30% transparency, 50% transparency, 90% transparency, etc.), for example, so that user interface 606-3 is at least partially visible. In some embodiments, modifying user interface 606-3 to be at least partially visible allows the user to see the user interface being replaced.

In some embodiments, if user interface 606-1 is at a distance that is farther than user interface 606-3 (e.g., at a farther z-depth), then in accordance with a determination that user interface 606-3 is obscuring a threshold amount of user interface 606-1 (e.g., because user interface 606-3 is in front of user interface 606-1), user interface 606-3 is made at least partially transparent (e.g., 10% transparency, 30% transparency, 50% transparency, 90% transparency, etc.), for example, so that user interface 606-1 is at least partially visible. In some embodiments, modifying user interface 606-1 to be at least partially visible allows the user to see the user interface that is replacing the existing user interface.

In some embodiments, the transparency feature described above is only performed if the user interface that is obscuring the user interface being obscured is a larger size than the user interface being obscured (e.g., larger in both width and height dimensions, larger in surface area, etc.). In some embodiments, the transparency feature described above is performed without regard to the relative sizes of the user interfaces.

In some embodiments, the transparency feature described above is only performed if the user interface being moved by hand 601 is at least a threshold distance from the location of an existing user interface such that the user interface being moved will replace the existing user interface upon release of the selection input. For example, if user interface 606-1 is moved in three-dimensional environment 600 such that it overlaps with a portion of user interface 606-3, but is not within the threshold distance from user interface 606-3 (e.g., threshold distance from the center of user interface 606-3), then user interface 606-1 is optionally not made at least partially transparent. If, on the other hand, if user interface 606-1 is moved to overlap with a portion of user interface 606-3, upon user interface 606-1 moving to overlap more of user interface 606-3 and reaching the threshold distance from the location occupied by user interface 606-3 (e.g., the center of user interface 606-3), then user interface 606-1 is optionally made at least partially transparent (e.g., and outline 612 is displayed). In some embodiments, the transparency feature described above is performed without regard to whether an existing user interface will be replaced by the user interface being moved.

Figure 6D:
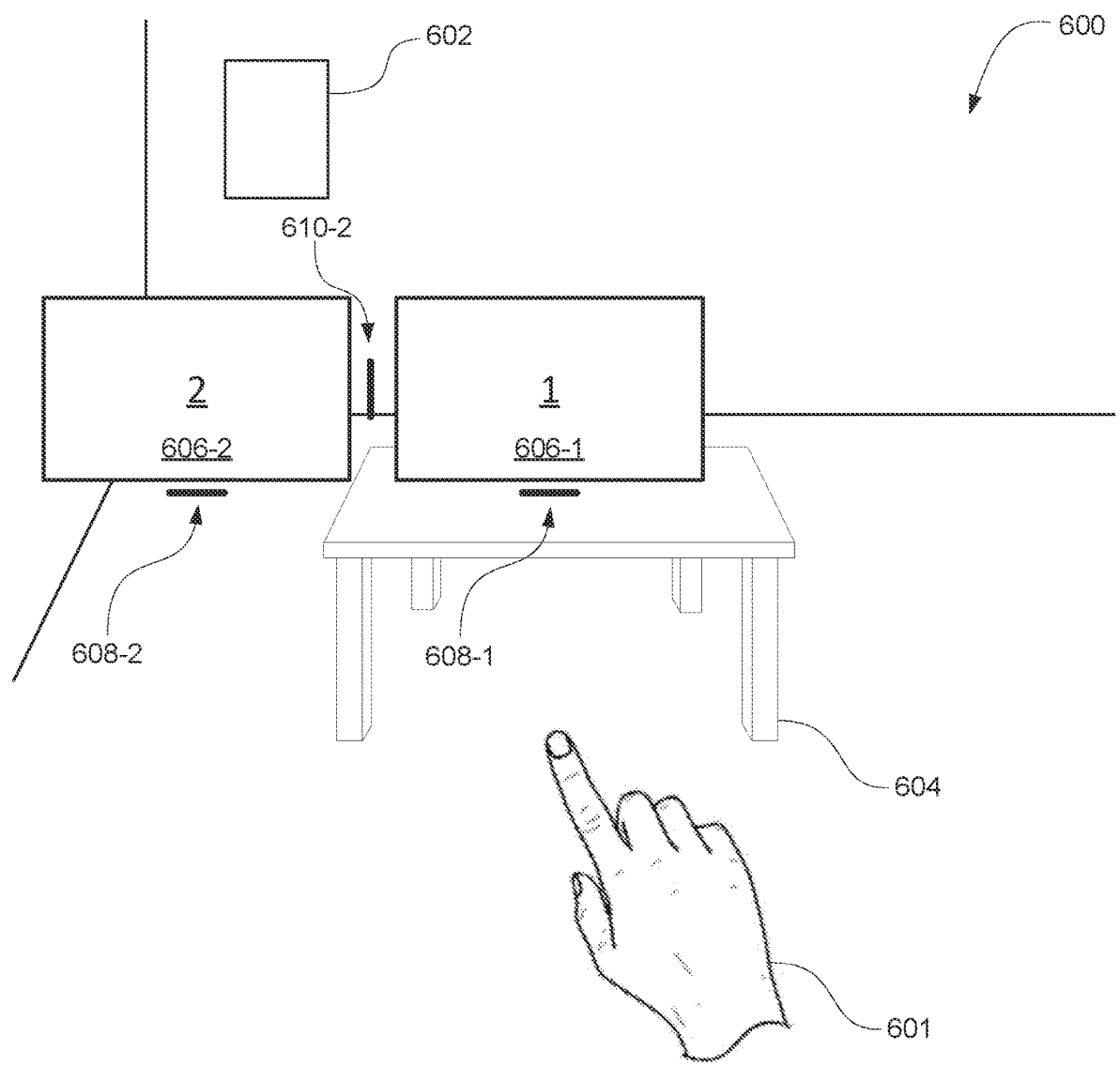

In FIG. 6D, the device detects the termination of the selection input while user interface 606-1 was within the threshold distance of the location occupied by user interface 606-3. A termination of the selection input can include the release of a pinch gesture performed by two or more fingers of hand 601, the retraction of a pointing gesture performed by a finger of hand 601, the retraction of hand 601, etc. In response to detecting the termination of the selection input while user interface 606-1 was within the threshold distance of the location occupied by user interface 606-3, user interface 606-1 optionally replaces user interface 606-3. In some embodiments, user interface 606-3 is removed from the container and ceases to be displayed (e.g., the application associated with user interface 606-3 is optionally closed, made inactive, or becomes a background process) and user interface 606-1 is added to the container at the location in the container that was previously occupied by user interface 606-3.

Thus, as described above, a user is able to replace an existing user interface in a container with another user interface by moving the other user interface to within a threshold distance of the location occupied by the existing user interface, such as described in FIGS. 6A-6D. In some embodiments, a user is able to attach a user interface to the left or right sides of a container or insert a user interface between existing user interfaces of a container (e.g., without replacing an existing user interface) by moving the user interface to be added within a threshold distance of the respective location at which the user interface is added, such as described in FIGS. 3A-3C. For example, the user interface to be added can be moved to within a threshold distance of a respective location to the left or right of the container or between existing user interfaces in the container. In some embodiments, when a user interface is to be added to a container, an outline is optionally displayed at the location that the user interface will be added.

In some embodiments, a user is able to add a user interface to a container (e.g., to either end or between user interfaces) via a user input (or sequence of user inputs) that does not involve moving and/or dragging a user interface to a respective location and/or does not include a "setup" stage and a "confirmation" or "execution" stage. In such embodiments, the gaze of the user can be used to determine the location that the user interface will be inserted. In some embodiments, an outline can be displayed at the respective location. For example, in FIGS. 4A-4B, a user is able to add a user interface into the container via a voice command and in FIGS. 5A-5G, a user is able to add a user interface into the container via an application launcher element. In some embodiments, other non-drag-and-drop methods of adding a user interface are possible, such as a selection input on an application icon from an application launching user interface (e.g., a discrete selection input, as opposed to a select-and-hold input).

It is understood that although the figures illustrate user interfaces in a container aligned horizontally, user interfaces in a container can be arranged in any orientation. For example, user interfaces can be oriented vertically, horizontally, or in a grid (e.g., 2×2 grid, 3×3 grid, 2×4 grid, etc.). In such embodiments, user interfaces can be added or inserted anywhere within the container (e.g., above, below, to the left or right, etc.).

Figure 7:
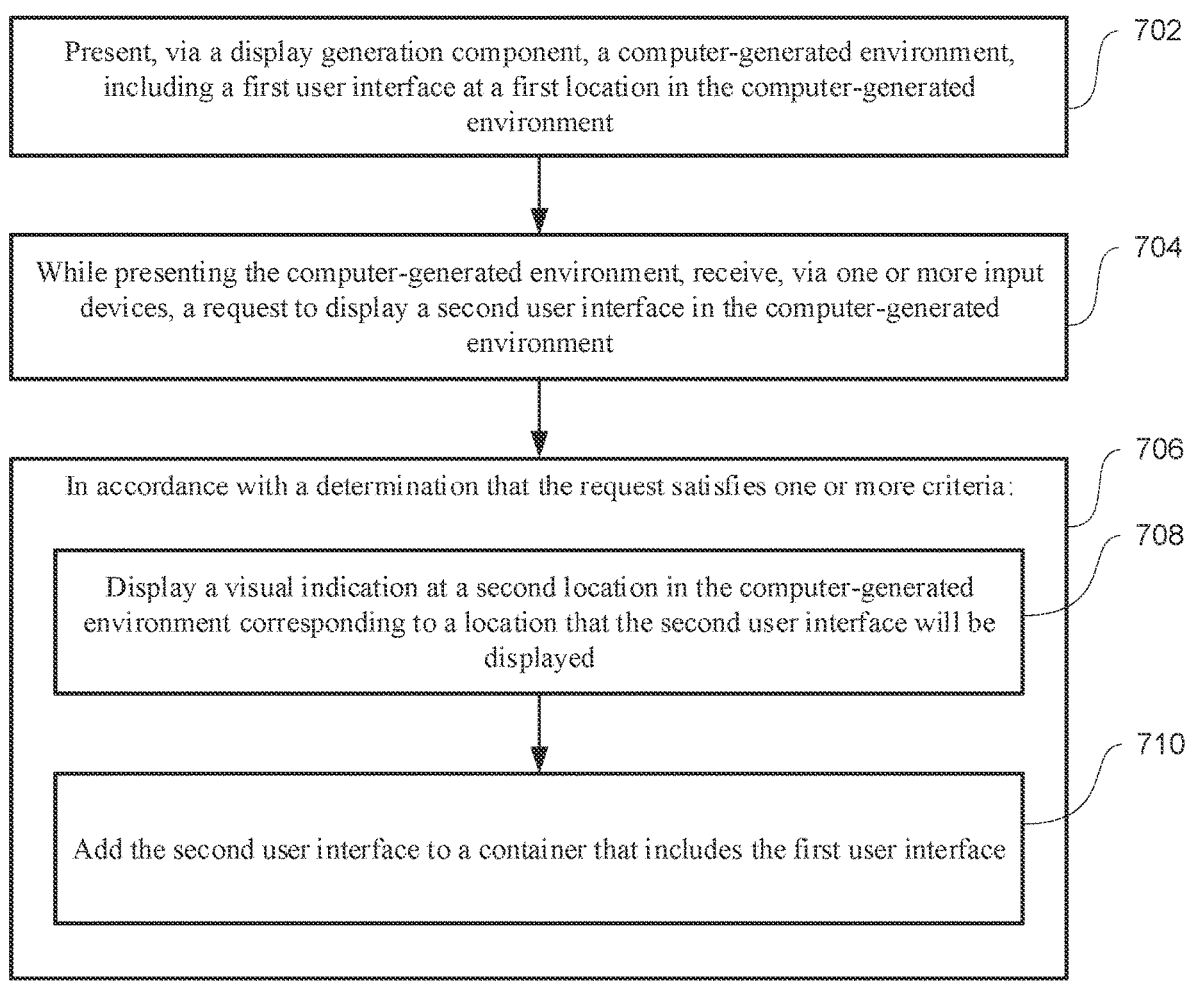
FIG. 7 is a flow diagram illustrating a method of adding user interfaces to a container in a three-dimensional environment according to some embodiments of the disclosure.

FIG. 7 is a flow diagram illustrating a method 700 of adding user interfaces to a container in a three-dimensional environment according to some embodiments of the disclosure. The method 700 is optionally performed at an electronic device such as device 100 and device 200, when displaying environments and containers described above with reference to FIGS. 3A-3C, 4A-4B, 5A-5G, and 6A-6D. Some operations in method 700 are optionally combined (e.g., with each other and/or with method 800 and/or with method 900) and/or the order of some operations is optionally changed. As described below, the method 700 provides methods of adding user interfaces to a container in a three-dimensional environment in accordance with embodiments of the disclosure (e.g., as discussed above with respect to FIGS. 3A-6D).

In some embodiments, an electronic device (e.g., a mobile device (e.g., a tablet, a smartphone, a media player, or a wearable device), a computer, etc. such as device 100 and/or device 200) in communication with a display generation component (e.g., a display integrated with the electronic device (e.g., a touch screen display, a head mounted display, etc.) and/or an external display such as a monitor, projector, television, etc.) and one or more input devices (e.g., a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera (e.g., visible light camera), a depth sensor and/or a motion sensor (e.g., a hand tracking sensor, a hand motion sensor), etc.) presents (702), via the display generation, a computer-generated environment, including a first user interface at a first location in the computer-generated environment, such as three-dimensional environment 300 including user interface 306-1 in FIG. 3A.

In some embodiments, while presenting the computer-generated environment, the electronic device receives (704), via the one or more input devices, a request to display a second user interface in the computer-generated environment, such as a user input moving user interface 306-2 in FIG. 3B, voice command 414 in FIG. 4B, providing text input into application launcher element 514 and confirming execution in FIGS. 5C and 5D, and a user input moving user interface 606-1 in FIG. 6C. In some embodiments, in accordance with a determination that the request satisfies one or more criteria (706), the electronic device displays (708) a visual indication at a second location in the computer-generated environment corresponding to a location that the second user interface will be displayed, such as outline 310 in FIG. 3B, and adds (710) the second user interface to a container that includes the first user interface, such as adding user interface 306-2 to a container that includes user interface 306-1 in FIG. 3C.

In some embodiments, in accordance with the determination that the request satisfies the one or more criteria, the electronic device displays the second user interface at the second location, such as displaying user interface 306-2 at a location adjacent to user interface 306-1 in FIG. 3C. In some embodiments, in accordance with a determination that the request does not satisfy the one or more criteria, the electronic device forgoes displaying the visual indication at the second location in the computer-generated environment, and forgoes adding the second user interface to the container that includes the first user interface, such as if outline 310 were not displayed in FIG. 3B, and user interface 306-2 is not added to a container including user interface 306-1 in FIG. 3C.

In some embodiments, in accordance with a determination that the request does not satisfy the one or more criteria, the electronic device displays the second user interface at a respective location in the computer-generated environment other than the second location, such as if user interface 306-2 were displayed at a location other than the location associated with outline 310 in FIGS. 3B and 3C. In some embodiments, the one or more criteria includes a criterion that is satisfied when the request includes a sequence of user inputs moving the second user interface to within a threshold distance from the second location, such as moving user interface 306-2 to within a threshold distance of the location associated with outline 310 in FIG. 3B. In some embodiments, the second location is a predetermined location in the computer-generated environment relative to the first user interface, such as a location that is adjacent to user interface 306-1 in FIG. 3B, optionally separated by a predetermined distance.

In some embodiments, the one or more criteria includes a requirement that the request includes a user input for displaying the second user interface that does not include a movement component moving the second user interface, such as voice command 414 in FIG. 4A, and a requirement that a gaze of the user is directed at the second location when the user input for displaying the second user interface was received, such as gaze 412 being directed at a location between user interface 406-1 and user interface 406-2 in FIG. 4A.

In some embodiments, before adding the second user interface to the container that includes the first user interface, the electronic device displays an animation of the second user interface moving to the second location, such as displaying an animation of user interface 306-2 moving into the location indicated by outline 310 in FIG. 3B.

In some embodiments, before receiving the request to display the second user interface in the computer-generated environment, the computer-generated environment included a third user interface, and the container that includes the first user interface included the third user interface, such as three-dimensional environment 500 including user interfaces 506-1 and user interface 506-2 in FIG. 5A. In some embodiments, the second location is a location that is between the first user interface and third user interface and was at least partially occupied by the first user interface or the third user interface, such as in FIG. 5C.

In some embodiments, in accordance with the determination that the request satisfies the one or more criteria, the electronic device moves at least one of the first user interface or the third user interface to provide space for the second user interface, such as in FIG. 5C. In some embodiments, the visual indication includes a bounding box that has a size based on the size of the second user interface, such as outline 310 in FIG. 3B.

In some embodiments, after adding the second user interface to the container that includes the first user interface, the electronic device receives a user input corresponding to a request to move one of the first user interface or the second user interface, such as if the device receives a user input to move user interface 306-1 or 306-2 in FIG. 3C. In some embodiments, in response to receiving the user input, the electronic device moves the first user interface in accordance with the user input, and moves the second user interface in accordance with the user input, such as if in response to the user input to move user interface 306-1 or 306-2 in FIG. 3C, both user interfaces 306-1 and 306-2 move as a group.

In some embodiments, the visual indication is displayed while receiving the request to display the second user interface in the computer-generated environment, such as in FIG. 3B. In some embodiments, the visual indication ceases to be displayed in response to detecting a termination of the request to display the second user interface in the computer-generated environment, such as in FIG. 3C.

In some embodiments, receiving the request to display the second user interface in the computer-generated environment includes detecting a predetermined gesture performed by a hand of the user of the electronic device, such as detecting a pinch or pointing gesture by hand 301 in FIG. 3B. In some embodiments, detecting a termination of the request to display the second user interface in the computer-generated environment includes detecting a termination of the predetermined gesture by the hand of the user, such as detecting the end of the pinch or pointing gesture by hand 301 in FIG. 3C.

Figure 8:
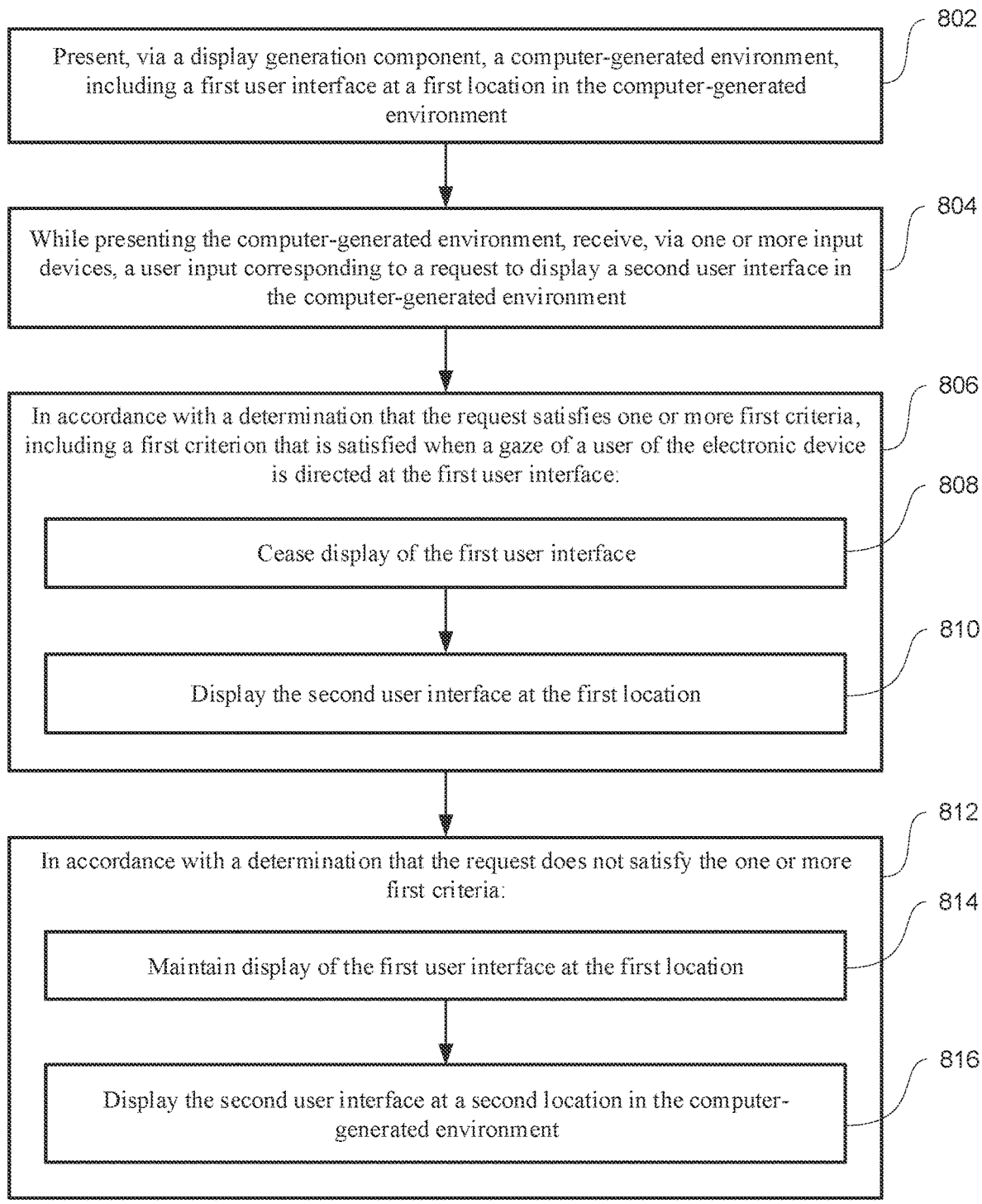
FIG. 8 is a flow diagram illustrating a method of adding and/or replacing user interfaces in a container in a three-dimensional environment according to some embodiments of the disclosure.

FIG. 8 is a flow diagram illustrating a method 800 of adding and/or replacing user interfaces in a container in a three-dimensional environment according to some embodiments of the disclosure. The method 800 is optionally performed at an electronic device such as device 100 and device 200, when displaying environments and containers described above with reference to FIGS. 3A-3C, 4A-4B, 5A-5G, and 6A-6D. Some operations in method 800 are optionally combined (e.g., with each other and/or with method 700 and/or with method 900) and/or the order of some operations is optionally changed. As described below, the method 800 provides methods of replacing user interfaces in a container in a three-dimensional environment in accordance with embodiments of the disclosure (e.g., as discussed above with respect to FIGS. 3A-6D).

In some embodiments, an electronic device (e.g., a mobile device (e.g., a tablet, a smartphone, a media player, or a wearable device), a computer, etc. such as device 100 and/or device 200) in communication with a display generation component (e.g., a display integrated with the electronic device (e.g., a touch screen display, a head mounted display, etc.) and/or an external display such as a monitor, projector, television, etc.) and one or more input devices (e.g., a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera (e.g., visible light camera), a depth sensor and/or a motion sensor (e.g., a hand tracking sensor, a hand motion sensor), etc.) presents (802), via the display generation, a computer-generated environment, including a first user interface at a first location in the computer-generated environment, such as three-dimensional environment 400 in FIG. 4A (or three-dimensional environment 500 in FIG. 5A).

In some embodiments, while presenting the computer-generated environment, the electronic device receives (804), via the one or more input devices, a user input corresponding to a request to display a second user interface in the computer-generated environment, such as voice command 414 requesting the device open App 3 in FIG. 4A (or requesting the device open App 3 using application launcher element 514 described with reference to FIG. 5B or 5E, for example). In some embodiments, in accordance with a determination that the request satisfies one or more first criteria, including a first criterion that is satisfied when a gaze of a user of the electronic device is directed at the first user interface (806), such as if gaze 412 were directed at user interface 406-1 or user interface 406-2 in FIG. 4A (or if gaze 512 were directed at user interface 506-1, as shown in the example of FIG. 5E, or at user interface 506-2), the electronic device ceases (808) display of the first user interface, and displays (810) the second user interface at the first location, such as if user interface 406-2 replaced the user interface at which the gaze was looking in FIG. 4B (or if user interface 506-3 replaced user interface 506-1 at which the gaze was looking in FIG. 5G).

In some embodiments, in accordance with a determination that the request does not satisfy the one or more first criteria (812), the electronic device maintains (814) display of the first user interface at the first location, and displays (816) the second user interface at a second location in the computer-generated environment, such as if user interface 406-3 were added to the container at a new location or user interface 406-3 is displayed in three-dimensional environment 400 outside of the container in FIG. 4B (or if user interface 506-3 were added to the container at a new location or user interface 506-3 is displayed in three-dimensional environment 500 outside of the container in FIG. 5G).

In some embodiments, the second location is a location at which the gaze of the user was directed when the user input was received, such as the location between user interfaces 406-1 and 406-2 in FIG. 4B (or between user interfaces 506-1 and 506-2 in FIG. 5B).

In some embodiments, before receiving the user input, the computer-generated environment includes a first container that includes the first user interface, such as the container that includes user interface 406-1 and user interface 406-2 in FIG. 4A (or the container that includes user interface 506-1 and user interface 506-2 in FIG. 5A).

In some embodiments, in accordance with the determination that the request satisfies the one or more first criteria, the electronic device removes the first user interface from the first container, and adds the second user interface to the first container, such as if user interface 406-3 is added to the container and the first user interface is removed from the container in FIG. 4B (or if user interface 506-3 were added to the container and the user interface 506-1 is removed from the container in FIG. 5G).

In some embodiments, the three-dimensional environment includes a third user interface, and the first container includes the third user interface, such as in FIG. 4A (or as in FIG. 5A). In some embodiments, the three-dimensional environment includes a first container that includes the first user interface and a third user interface, adjacent to the first user interface, such as in FIG. 4A (or as in FIG. 5A). In some embodiments, in accordance with a determination that the request satisfies one or more second criteria, including a second criterion that is satisfied when a gaze of a user of the electronic device is directed at a location between the first user interface and the third user interface, the electronic device displays the second user interface at the location between the first user interface and the third user interface, and adds the second user interface to the first container, such as when gaze 412 is directed at a location between user interface 406-1 and user interface 406-2 in FIG. 4A and user interface 406-3 is added to the location between user interface 406-1 and user interface 406-2 in FIG. 4B (or when gaze 512 is directed at a location between user interface 506-1 and user interface 506-2 in FIG. 5B and user interface 506-3 is added to the location between user interface 506-1 and user interface 506-2 in FIG. 5D).

In some embodiments, before displaying the second user interface at the location between the first user interface and the third user interface, the electronic device moves at least one of the first user interface or the third user interface to provide space for the second user interface, such as user interface 406-1 moving to the right and user interface 406-2 moving to the left in FIG. 4B (or moving user interface 506-1 to the right and user interface 506-2 to the left in FIG. 5B-5C). In some embodiments, an animation of the user interfaces moving is displayed before the new user interface is displayed. In some embodiments, an animation of the new user interface appearing is displayed concurrently with the animation of the user interfaces moving.

Figure 9:
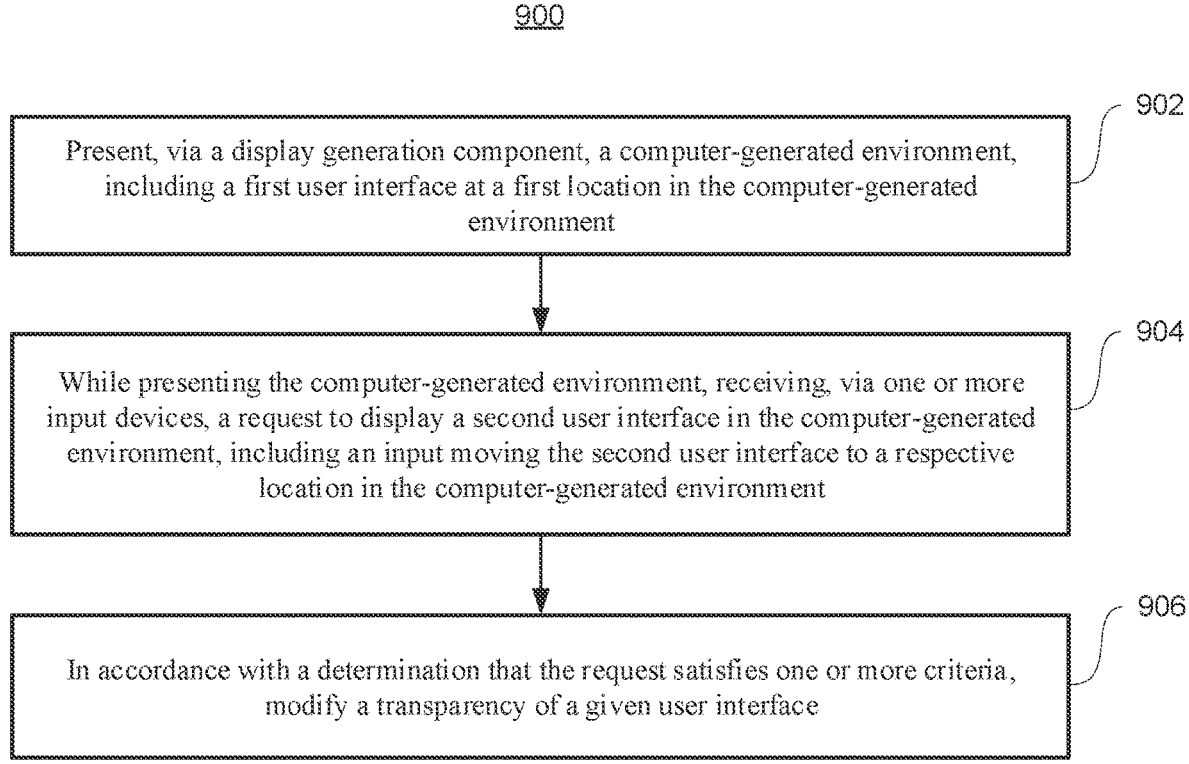
FIG. 9 is a flow diagram illustrating a method of displaying user interfaces in a container in a three-dimensional environment according to some embodiments of the disclosure.

FIG. 9 is a flow diagram illustrating a method 900 of displaying user interfaces in a container in a three-dimensional environment according to some embodiments of the disclosure. The method 900 is optionally performed at an electronic device such as device 100 and device 200, when displaying environments and containers described above with reference to FIGS. 3A-3C, 4A-4B, 5A-5G, and 6A-6D. Some operations in method 900 are optionally combined (e.g., with each other and/or with method 700 and/or with method 800) and/or the order of some operations is optionally changed. As described below, the method 900 provides methods of displaying user interfaces in a container in a three-dimensional environment in accordance with embodiments of the disclosure (e.g., as discussed above with respect to FIGS. 3A-6D).

In some embodiments, an electronic device (e.g., a mobile device (e.g., a tablet, a smartphone, a media player, or a wearable device), a computer, etc. such as device 100 and/or device 200) in communication with a display generation component (e.g., a display integrated with the electronic device (e.g., a touch screen display, a head mounted display, etc.) and/or an external display such as a monitor, projector, television, etc.) and one or more input devices (e.g., a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera (e.g., visible light camera), a depth sensor and/or a motion sensor (e.g., a hand tracking sensor, a hand motion sensor), etc.) presents (902) a computer-generated environment, including a first user interface at a first location in the computer-generated environment, such as three-dimensional environment 600 in FIG. 6A.

In some embodiments, while presenting the computer-generated environment, the electronic device receives (904), via the one or more input devices, a request to display a second user interface in the computer-generated environment, including an input moving the second user interface to a respective location in the computer-generated environment, such as in FIG. 6C.

In some embodiments, in accordance with a determination that the request satisfies one or more criteria, the electronic device modifies (906) a transparency of a given user interface, such as user interface 606-1 obscuring a threshold amount of user interface 606-3 in FIG. 6C. In some embodiments, in accordance with a determination that the request satisfies one or more criteria, the electronic device modifies one or more visual characteristics of a given user interface. In some embodiments, modifying one or more visual characteristics can include highlighting, changing color, displaying a border, displaying a glow, changing a size, changing a transparency amount, changing a shading, any other visual change, and/or any combination of aforementioned. In some embodiments, the given user interface is the user interface being moved. In some embodiments, the given user interface is an existing user interface that isn't the user interface being moved. In some embodiments, the given user interface is the user interface that is causing the obscuring of another user interface (e.g., either the user interface being moved, which is in front of an existing user interface, or an existing user interface, which is in front of the user interface being moved, as the case may be). In some embodiments, the user interface being moved is an existing user interface that the user is moving to a new location. In some embodiments, the user interface being moved is a new user interface that the user interface is moving around in the computer generated environment for the purpose of instantiating the user interface (e.g., launching the application associated with the user interface). In some embodiments, the device modifies the visual characteristics of a given user interface only if the user interface being moved will replace an existing user interface. In some embodiments, the device modifies the visual characteristic of a given user interface without regard to whether a user interface will be replaced by the user interface being moved. In some embodiments, the device modifies the visual characteristic of a given user interface only if the existing user interface is a member of a container (e.g., the feature is only performed for user interfaces in a container). In some embodiments, the device modifies the visual characteristic of a given user interface without regard to whether the existing user interface is a member of a container (e.g., the feature is performed for user interfaces that are in a container and user interfaces that are not in a container). In some embodiments, the one or more criteria includes a requirement that the given user interface is obscured by a threshold amount (e.g., 30%, 50%, 75%, etc.). In some embodiments, the threshold amount of obscuring is aligned with the threshold distance required to cause the existing user interface to be replaced (e.g., when the user interface being moved is moved to within the threshold distance of a predetermined location that would cause an existing user interface to be replaced by the user interface being moved, the user interface being replaced also reaches the threshold amount of obscuring to cause the user interface being moved to become partially transparent).

In some embodiments, the one or more criteria includes a criterion that is satisfied when the second user interface obscures at least a threshold amount of the first user interface, such as in FIG. 6C. In some embodiments, modifying the transparency of the given user interface includes modifying a transparency of the second user interface, such as modifying the transparency of user interface 606-1 in FIG. 6C.

In some embodiments, the one or more criteria includes a second criterion that is satisfied when a size of the second user interface is less than a size of the first user interface by a threshold amount, such as if user interface 606-3 were smaller than user interface 606-1 in FIG. 6C.

In some embodiments, the one or more criteria includes a criterion that is satisfied when the first user interface obscures at least a threshold amount of the second user interface, such as if user interface 606-1 were at a farther z-depth than user interface 606-3 such that user interface 606-1 were obscured by user interface 606-3 by a threshold amount in FIG. 6C. In some embodiments, modifying the transparency of the given user interface includes modifying a transparency of the first user interface, such as modifying the transparency of user interface 606-3 in FIG. 6C if, for example, user interface 606-3 were obscuring user interface 606-1.

In some embodiments, the one or more criteria includes a criterion that is satisfied when at least a threshold amount of the given user interface is obscured for a threshold amount of time, such as if user interface 606-1 is hovered at location in FIG. 6C for a threshold amount of time (e.g., 1 second, 3 seconds, 5 seconds, etc.). In some embodiments, the one or more criteria includes a criterion that is satisfied when the respective location is within a threshold distance of a location associated with the first user interface, such as user interface 606-1 being within a threshold distance of the location occupied by user interface 606-3 in FIG. 6C. In some embodiments, the respective location is the entirety of the space occupied by user interface 606-3. In some embodiments, the respective location is the center of the space occupied by user interface 606-3.

In some embodiments, the first user interface is a user interface of a first application, such as user interface 606-3 being a user interface of a particular application in FIG. 6A. In some embodiments, the second user interface is a user interface of a second application, different from the first application, such as user interface 606-1 being a user interface of a different application in FIG. 6A. In some embodiments, the input moving the second user interface to the respective location in the computer-generated environment includes a movement by a hand of a user of the electronic device while maintaining a respective selection gesture, such as the movement of hand 601 moving user interface 606-1 in FIG. 6C.

In some embodiments, in accordance with a determination that the request does not satisfy the one or more criteria, the electronic device forgoes modifying the transparency of the given user interface, such as if user interface 606-1 were not made partially transparent in FIG. 6C. In some embodiments, after modifying the transparency of the given user interface, in accordance with a determination that the request no longer satisfies the one or more criteria, the electronic device modifies the transparency of the given user interface to restore a transparency value that the given user interface had before the request was received, such as if user interface 606-1 were moved away from user interface 606-3 in FIG. 6C and in response, the original transparency setting of user interface 606-1 is restored (e.g., optionally no transparency).

In some embodiments, after modifying the transparency of the given user interface to restore the transparency value that the given user interface had before the request was received and while displaying the given user interface with an unmodified transparency value, the electronic device detects a termination of the request to display the second user interface in the computer-generated environment, such as if the device detects a termination of the selection input after hand 601 moves user interface 606-1 away from user interface 606-3 in FIG. 6C. In some embodiments, in response to detecting the termination of the request to display the second user interface in the computer-generated environment, the electronic device displays the second user interface at a respective location, separate from the first location, while maintaining display of the first user interface at the first location, such as not replacing user interface 606-1 with user interface 606-1.

In some embodiments, after modifying the transparency of the given user interface and while displaying the given user interface with a modified transparency value, the electronic device detects a termination of the request to display the second user interface in the computer-generated environment, such as the release of the pointing or pinching gesture in FIG. 6C. In some embodiments, in response to detecting the termination of the request to display the second user interface in the computer-generated environment, the electronic device displays the second user interface at the first location, and ceases display of the first user interface, such as in FIG. 6D.

It should be understood that, as used herein, presenting an environment includes presenting a real-world environment, presenting a representation of a real-world environment (e.g., displaying via a display generation component), and/or presenting a virtual environment (e.g., displaying via a display generation component). Virtual content (e.g., user interfaces, content items, etc.) can also be presented with these environments (e.g., displayed via a display generation component). It is understood that as used herein the terms "presenting"/"presented" and "displaying"/"displayed" are often used interchangeably, but depending on the context it is understood that when a real world environment is visible to a user without being generated by the display generation component, such a real world environment is "presented" to the user (e.g., allowed to be viewable, for example, via a transparent or translucent material) and not necessarily technically "displayed" to the user. Additionally or alternatively, as used herein, the singular forms "a," "an," and "the" are intended to include the plural forms, unless the context clearly indicates otherwise. The term "and/or" as used herein refers to and encompasses any and all possible combinations of one or more of the associated listed items. The terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Further, although the above description uses terms "first," "second," etc. to describe various elements, these elements should not be limited by the terms. These terms are only used to distinguish one element from another. For example, a respective user interface could be referred to as a "first" or "second" user interface, without implying that the respective user interface has different characteristics based merely on the fact that the respective user interface is referred to as a "first" or "second" user interface. On the other hand, a user interface referred to as a "first" user interface and a user interface referred to as a "second" user interface are both user interface, but are not the same user interface, unless explicitly described as such.

Additionally or alternatively, as described herein, the term "if," optionally, means "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context. The terminology used in the description of the various described embodiments herein is for the purpose of describing particular embodiments only and is not intended to be limiting.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method, comprising:
   at an electronic device in communication with a display and one or more input devices:
   presenting, via the display, a three-dimensional environment, including a first user interface at a first location in the three-dimensional environment;
   while presenting the three-dimensional environment, receiving, via the one or more input devices, a request to display a second user interface in the three-dimensional environment;
   in accordance with a determination that the request satisfies one or more criteria:
   displaying a visual indication at a second location in the three-dimensional environment corresponding to a location at which the second user interface is to be displayed when added to a set of user interfaces; and
   adding the second user interface to the set of user interfaces that includes the first user interface, wherein the set of user interfaces move together in response to movement inputs.

2. The method of claim 1, further comprising:
   in accordance with the determination that the request satisfies the one or more criteria:
   displaying the second user interface at the second location.

3. The method of claim 1, further comprising:
   in accordance with a determination that the request does not satisfy the one or more criteria:
   forgoing displaying the visual indication at the second location in the three-dimensional environment; and
   forgoing adding the second user interface to the set of user interfaces that includes the first user interface.

4. The method of claim 3, further comprising:
   in accordance with a determination that the request does not satisfy the one or more criteria:
   displaying the second user interface at a respective location in the three-dimensional environment other than the second location.

5. The method of claim 1, wherein the one or more criteria include a criterion that is satisfied when the request includes a sequence of user inputs moving the second user interface to within a threshold distance from the second location.

6. The method of claim 1, wherein the one or more criteria include:
   a criterion that is satisfied when the request includes a user input for displaying the second user interface that does not include a movement component moving the second user interface; and
   a criterion that is satisfied when a gaze of a user is directed at the second location when the user input for displaying the second user interface was received.

7. The method of claim 1, further comprising:
   before adding the second user interface to the set of user interfaces that includes the first user interface, displaying an animation of the second user interface moving to the second location.

8. The method of claim 1, wherein:
   before receiving the request to display the second user interface in the three-dimensional environment:
   the three-dimensional environment included a third user interface; and
   the set of user interfaces that includes the first user interface included the third user interface;
   the second location is a location that is between the first user interface and the third user interface and was at least partially occupied by the first user interface or the third user interface; and the method further comprises:
in accordance with the determination that the request satisfies the one or more criteria:
moving at least one of the first user interface or the third user interface to provide space for the second user interface.

9. The method of claim 1, further comprising:
after adding the second user interface to the set of user interfaces that includes the first user interface, receiving a user input corresponding to a request to move one of the first user interface or the second user interface; and
in response to receiving the user input:
moving the first user interface in accordance with the user input; and
moving the second user interface in accordance with the user input.

10. The method of claim 1, wherein:
the visual indication is displayed while receiving the request to display the second user interface in the three-dimensional environment;
the visual indication ceases to be displayed in response to detecting a termination of the request to display the second user interface in the three-dimensional environment;
receiving the request to display the second user interface in the three-dimensional environment includes detecting a predetermined gesture performed by a hand of a user of the electronic device; and
detecting the termination of the request to display the second user interface in the three-dimensional environment includes detecting a termination of the predetermined gesture by the hand of the user.

11. An electronic device, comprising:
one or more processors;
memory; and
one or more programs, wherein the one or more programs are stored in the memory and configured to be executed by the one or more processors, the one or more programs including instructions for:
presenting, via a display, a three-dimensional environment, including a first user interface at a first location in the three-dimensional environment;
while presenting the three-dimensional environment, receiving, via one or more input devices, a request to display a second user interface in the three-dimensional environment;
in accordance with a determination that the request satisfies one or more criteria:
displaying a visual indication at a second location in the three-dimensional environment corresponding to a location at which the second user interface is to be displayed when added to a set of user interfaces; and
adding the second user interface to the set of user interfaces that includes the first user interface, wherein the set of user interfaces move together in response to movement inputs.

12. The electronic device of claim 11, the one or more programs including instructions for:
in accordance with the determination that the request satisfies the one or more criteria:
displaying the second user interface at the second location.

13. The electronic device of claim 11, the one or more programs including instructions for:
in accordance with a determination that the request does not satisfy the one or more criteria:
forgoing displaying the visual indication at the second location in the three-dimensional environment; and
forgoing adding the second user interface to the set of user interfaces that includes the first user interface.

14. The electronic device of claim 13, the one or more programs including instructions for:
in accordance with a determination that the request does not satisfy the one or more criteria:
displaying the second user interface at a respective location in the three-dimensional environment other than the second location.

15. The electronic device of claim 11, wherein the one or more criteria include a criterion that is satisfied when the request includes a sequence of user inputs moving the second user interface to within a threshold distance from the second location.

16. The electronic device of claim 11, wherein the one or more criteria include:
a criterion that is satisfied when the request includes a user input for displaying the second user interface that does not include a movement component moving the second user interface; and
a criterion that is satisfied when a gaze of a user is directed at the second location when the user input for displaying the second user interface was received.

17. The electronic device of claim 11, the one or more programs including instructions for:
before adding the second user interface to the set of user interfaces that includes the first user interface, displaying an animation of the second user interface moving to the second location.

18. The electronic device of claim 11, wherein:
before receiving the request to display the second user interface in the three-dimensional environment:
the three-dimensional environment included a third user interface; and
the set of user interfaces that includes the first user interface included the third user interface;
the second location is a location that is between the first user interface and the third user interface and was at least partially occupied by the first user interface or the third user interface; and
the one or more programs include instructions for:
in accordance with the determination that the request satisfies the one or more criteria:
moving at least one of the first user interface or the third user interface to provide space for the second user interface.

19. The electronic device of claim 11, the one or more programs including instructions for:
after adding the second user interface to the set of user interfaces that includes the first user interface, receiving a user input corresponding to a request to move one of the first user interface or the second user interface; and
in response to receiving the user input:
moving the first user interface in accordance with the user input; and
moving the second user interface in accordance with the user input.

20. The electronic device of claim 11, wherein:
the visual indication is displayed while receiving the request to display the second user interface in the three-dimensional environment;

the visual indication ceases to be displayed in response to detecting a termination of the request to display the second user interface in the three-dimensional environment;

receiving the request to display the second user interface in the three-dimensional environment includes detecting a predetermined gesture performed by a hand of a user of the electronic device; and detecting the termination of the request to display the second user interface in the three-dimensional environment including detecting a termination of the predetermined gesture by the hand of the user.

21. A non-transitory computer readable storage medium storing one or more programs, the one or more programs comprising instructions, which when executed by one or more processors of an electronic device, cause the electronic device to:

present, via a display, a three-dimensional environment, including a first user interface at a first location in the three-dimensional environment;

while presenting the three-dimensional environment, receive, via one or more input devices, a request to display a second user interface in the three-dimensional environment;

in accordance with a determination that the request satisfies one or more criteria:
display a visual indication at a second location in the three-dimensional environment corresponding to a location at which the second user interface is to be displayed when added to a set of user interfaces; and
add the second user interface to the set of user interfaces that includes the first user interface, wherein the set of user interfaces move together in response to movement inputs.

22. The non-transitory computer readable storage medium of claim 21, the instructions, when executed by the one or more processors of the electronic device, further cause the electronic device to:
in accordance with the determination that the request satisfies the one or more criteria:
display the second user interface at the second location.

23. The non-transitory computer readable storage medium of claim 21, the instructions, when executed by the one or more processors of the electronic device, further cause the electronic device to:
in accordance with a determination that the request does not satisfy the one or more criteria:
forgo displaying the visual indication at the second location in the three-dimensional environment; and
forgo adding the second user interface to the set of user interfaces that includes the first user interface.

24. The non-transitory computer readable storage medium of claim 23, the instructions, when executed by the one or more processors of the electronic device, further cause the electronic device to:
in accordance with a determination that the request does not satisfy the one or more criteria:
display the second user interface at a respective location in the three-dimensional environment other than the second location.

25. The non-transitory computer readable storage medium of claim 21, wherein the one or more criteria include a criterion that is satisfied when the request includes a sequence of user inputs moving the second user interface to within a threshold distance from the second location.

26. The non-transitory computer readable storage medium of claim 21, wherein the one or more criteria include:

a criterion that is satisfied when the request includes a user input for displaying the second user interface that does not include a movement component moving the second user interface; and a criterion that is satisfied when a gaze of a user is directed at the second location when the user input for displaying the second user interface was received.

27. The non-transitory computer readable storage medium of claim 21, the instructions, when executed by the one or more processors of the electronic device, further cause the electronic device to:
before adding the second user interface to the set of user interfaces that includes the first user interface, display an animation of the second user interface moving to the second location.

28. The non-transitory computer readable storage medium of claim 21, wherein:
before receiving the request to display the second user interface in the three-dimensional environment:
the three-dimensional environment included a third user interface; and
the set of user interfaces that includes the first user interface included the third user interface;
the second location is a location that is between the first user interface and the third user interface and was at least partially occupied by the first user interface or the third user interface; and
the instructions, when executed by the one or more processors of the electronic device, further cause the electronic device to:
in accordance with the determination that the request satisfies the one or more criteria:
move at least one of the first user interface or the third user interface to provide space for the second user interface.

29. The non-transitory computer readable storage medium of claim 21, the instructions, when executed by the one or more processors of the electronic device, further cause the electronic device to:
after adding the second user interface to the set of user interfaces that includes the first user interface, receive a user input corresponding to a request to move one of the first user interface or the second user interface; and
in response to receiving the user input:
move the first user interface in accordance with the user input; and
move the second user interface in accordance with the user input.

30. The non-transitory computer readable storage medium of claim 21, wherein:
the visual indication is displayed while receiving the request to display the second user interface in the three-dimensional environment;
the visual indication ceases to be displayed in response to detecting a termination of the request to display the second user interface in the three-dimensional environment;
receiving the request to display the second user interface in the three-dimensional environment includes detecting a predetermined gesture performed by a hand of a user of the electronic device; and
detecting the termination of the request to display the second user interface in the three-dimensional environment includes detecting a termination of the predetermined gesture by the hand of the user.

* * * * *